US011017630B2

(12) United States Patent
Williams et al.

(10) Patent No.: US 11,017,630 B2
(45) Date of Patent: May 25, 2021

(54) GAMING THROUGH MOBILE OR OTHER DEVICES

(71) Applicant: CFPH, LLC, New York, NY (US)

(72) Inventors: Paul Williams, New York, NY (US); Matthew Morrissette, Las Vegas, NV (US); Stephane Minisini, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 45 days.

(21) Appl. No.: 15/342,660

(22) Filed: Nov. 3, 2016

(65) Prior Publication Data

US 2017/0069162 A1    Mar. 9, 2017

Related U.S. Application Data

(63) Continuation of application No. 13/780,157, filed on Feb. 28, 2013, now Pat. No. 9,489,793.

(60) Provisional application No. 61/604,115, filed on Feb. 28, 2012, provisional application No. 61/680,168, filed on Aug. 6, 2012, provisional application No. 61/736,087, filed on Dec. 12, 2012.

(51) Int. Cl.
| | |
|---|---|
| *A63F 13/00* | (2014.01) |
| *G07F 17/32* | (2006.01) |
| *A63F 13/216* | (2014.01) |
| *A63F 13/332* | (2014.01) |

(52) U.S. Cl.
CPC ........ *G07F 17/3241* (2013.01); *A63F 13/216* (2014.09); *A63F 13/332* (2014.09); *G07F 17/32* (2013.01); *G07F 17/3218* (2013.01); *G07F 17/3223* (2013.01); *G07F 17/3225* (2013.01); *G07F 17/3237* (2013.01)

(58) Field of Classification Search
CPC ............ G07F 17/3241; G07F 17/3223; G07F 17/3237; A63F 13/216; A63F 13/332; A63F 2300/205
See application file for complete search history.

(56) References Cited

U.S. PATENT DOCUMENTS

| | | | |
|---|---|---|---|
| 828,548 | A | 8/1906 | Helmond |
| 4,882,473 | A | 11/1989 | Bergeron et al. |
| 5,001,632 | A | 3/1991 | Hall-Tipping |
| 5,599,231 | A | 2/1997 | Hibino et al. |
| 5,618,045 | A | 4/1997 | Kagan et al. |
| 5,618,232 | A | 4/1997 | Martin |
| 5,645,277 | A | 7/1997 | Cheng |

(Continued)

FOREIGN PATENT DOCUMENTS

| | | |
|---|---|---|
| AU | 2004100722 | 10/2004 |
| GB | 2394675 | 5/2004 |

(Continued)

OTHER PUBLICATIONS

Petitioners' Reply to Patent Owner's Response for IPR2017-01333, U.S. Pat. No. 9,306,952 dated May 1, 2018.

(Continued)

*Primary Examiner* — David L Lewis
*Assistant Examiner* — Eric M Thomas

(57) ABSTRACT

Various embodiments that may generally relate to mobile gaming, location determination, mobile devices, authentication, and so on are described. Various methods are described. Various apparatus are described. Further embodiments are described.

9 Claims, 11 Drawing Sheets

(56) References Cited

U.S. PATENT DOCUMENTS

| | | |
|---|---|---|
| 5,738,583 A | 4/1998 | Comas et al. |
| 5,772,508 A | 6/1998 | Sugita et al. |
| 5,779,549 A | 7/1998 | Walker |
| 5,787,156 A | 7/1998 | K atz |
| 5,806,849 A | 9/1998 | Rutkowski |
| 5,816,918 A | 10/1998 | Kelly et al. |
| 5,881,366 A | 3/1999 | Bodernmann et al. |
| 5,977,957 A | 11/1999 | Miller et al. |
| 5,999,808 A | 12/1999 | LaDue |
| 6,001,015 A | 12/1999 | Nishiumi et al. |
| 6,022,294 A | 2/2000 | Takeda et al. |
| 6,044,062 A | 3/2000 | Brownrigg et al. |
| 6,117,011 A | 9/2000 | Lvov |
| 6,177,905 B1 | 1/2001 | Welch |
| 6,178,510 B1 | 1/2001 | O'Connor et al. |
| 6,251,014 B1 | 6/2001 | Stockdale et al. |
| 6,320,495 B1 | 11/2001 | Sporgis |
| 6,359,661 B1 | 3/2002 | Nickum |
| 6,441,752 B1 | 8/2002 | Fomukong |
| 6,508,710 B1 | 1/2003 | Paravia |
| 6,520,853 B2 | 2/2003 | Suzuki |
| 6,524,189 B1 | 2/2003 | Rautila |
| 6,527,641 B1 | 3/2003 | Sinclair et al. |
| 6,542,750 B2 | 4/2003 | Hendrey et al. |
| 6,582,302 B2 | 6/2003 | Romero |
| 6,645,077 B2 | 11/2003 | Rowe |
| 6,680,675 B1 | 1/2004 | Suzuki |
| 6,682,421 B1 | 1/2004 | Rowe et al. |
| 6,691,032 B1 | 2/2004 | Irish et al. |
| 6,721,542 B1 | 4/2004 | Anttila et al. |
| 6,756,882 B2 | 6/2004 | Benes |
| 6,761,638 B1 | 7/2004 | Narita |
| 6,778,820 B2 | 8/2004 | Tendler |
| 6,806,889 B1 | 10/2004 | Malaure |
| 6,811,488 B2 | 11/2004 | Paravia et al. |
| 6,839,560 B1 | 1/2005 | Bahl et al. |
| 6,843,725 B2 | 1/2005 | Nelson |
| 6,846,238 B2 | 1/2005 | Wells |
| 6,857,959 B1 | 2/2005 | Nguyen et al. |
| 6,884,166 B2 | 4/2005 | Leen et al. |
| 6,896,618 B2 | 5/2005 | Benoy et al. |
| 6,935,958 B2 | 8/2005 | Nelson |
| 6,942,574 B1 | 9/2005 | Lemay et al. |
| 7,027,820 B2 | 4/2006 | Spratt |
| 7,042,391 B2 | 5/2006 | Meunier et al. |
| 7,047,197 B1 | 5/2006 | Bennett |
| 7,056,217 B1 | 6/2006 | Pelkey et al. |
| 7,158,798 B2 | 1/2007 | Lee et al. |
| 7,288,028 B2 | 10/2007 | Rodriquez et al. |
| 7,311,605 B2 | 12/2007 | Moser |
| 7,311,608 B1 | 12/2007 | Danieli |
| 7,316,619 B2 | 1/2008 | Nelson |
| 7,367,049 B1 | 4/2008 | Robinson |
| 7,394,405 B2 | 7/2008 | Godden |
| 7,431,650 B2 | 10/2008 | Kessman |
| 7,435,179 B1 | 10/2008 | Ford |
| 7,458,894 B2 | 12/2008 | Danieli |
| 7,470,191 B2 | 12/2008 | Xidos |
| 7,493,211 B2 | 2/2009 | Breen |
| 7,510,474 B2 | 3/2009 | Carter, Sr. |
| 7,534,169 B2 | 5/2009 | Amaitis et al. |
| 7,577,847 B2 | 8/2009 | Nguyen |
| 7,637,810 B2 | 12/2009 | Amaitis et al. |
| 7,736,221 B2 | 6/2010 | Black et al. |
| 7,819,749 B1 | 10/2010 | Fish et al. |
| 7,828,652 B2 | 11/2010 | Nguyen et al. |
| 7,828,654 B2 | 11/2010 | Carter, Sr. |
| 7,828,661 B1 | 11/2010 | Fish et al. |
| 7,937,336 B1 | 5/2011 | Maynard-Zhang et al. |
| 8,047,914 B2 | 11/2011 | Morrow |
| 8,221,225 B2 | 7/2012 | Laut |
| 8,267,789 B2 | 9/2012 | Nelson |
| 8,287,380 B2 | 10/2012 | Nguyen |
| 8,292,741 B2 | 10/2012 | Burman et al. |
| 8,298,078 B2 | 10/2012 | Sutton et al. |
| 8,393,948 B2 | 3/2013 | Allen |
| 8,504,617 B2 | 8/2013 | Amaitis et al. |
| 8,506,400 B2 | 8/2013 | Amaitis et al. |
| 8,510,567 B2 | 8/2013 | Alderucci et al. |
| 8,536,999 B2 | 9/2013 | Holeman |
| 8,613,658 B2 | 12/2013 | Amaitis et al. |
| 8,645,709 B2 | 2/2014 | Alderucci et al. |
| 8,708,805 B2 | 4/2014 | Amaitis et al. |
| 8,764,566 B2 | 7/2014 | Miltenberger |
| 8,784,197 B2 | 7/2014 | Alderucci et al. |
| 8,858,323 B2 | 10/2014 | Nguyen et al. |
| 8,956,231 B2 | 2/2015 | Amaitis et al. |
| 8,974,302 B2 | 3/2015 | Amaitis et al. |
| 8,977,296 B1 * | 3/2015 | Briggs .................. H04W 4/021 455/456.1 |
| 9,280,648 B2 | 3/2016 | Alderucci et al. |
| 9,306,952 B2 | 4/2016 | Burman et al. |
| 9,355,518 B2 | 5/2016 | Amaitis et al. |
| 9,363,251 B2 | 6/2016 | Morikuni |
| 9,411,944 B2 | 8/2016 | Alderucci et al. |
| 9,430,901 B2 | 8/2016 | Amaitis et al. |
| 9,430,909 B2 | 8/2016 | Shore |
| 9,489,793 B2 | 11/2016 | Williams et al. |
| 10,535,221 B2 | 1/2020 | Burman et al. |
| 2001/0027130 A1 | 10/2001 | Namba et al. |
| 2001/0031663 A1 | 10/2001 | Johnson |
| 2001/0036858 A1 | 11/2001 | McNutt et al. |
| 2001/0049275 A1 | 12/2001 | Pierry et al. |
| 2002/0013153 A1* | 1/2002 | Wilcock .................. G01S 5/0226 455/456.3 |
| 2002/0028674 A1 | 3/2002 | Slettengren |
| 2002/0037767 A1 | 3/2002 | Ebin |
| 2002/0086732 A1 | 7/2002 | Kirmse et al. |
| 2002/0123377 A1 | 9/2002 | Shulman |
| 2002/0132663 A1 | 9/2002 | Cumbers |
| 2002/0142846 A1 | 10/2002 | Paulson |
| 2002/0147049 A1 | 10/2002 | Carter |
| 2002/0184653 A1 | 12/2002 | Pierce et al. |
| 2002/0198051 A1 | 12/2002 | Lobel et al. |
| 2003/0001882 A1 | 1/2003 | Macer |
| 2003/0003997 A1 | 1/2003 | Vuong et al. |
| 2003/0006931 A1 | 1/2003 | Mages |
| 2003/0014639 A1 | 1/2003 | Jackson et al. |
| 2003/0017871 A1 | 1/2003 | Urie et al. |
| 2003/0027634 A1 | 2/2003 | Matthews, III |
| 2003/0032407 A1 | 2/2003 | Mages |
| 2003/0032474 A1 | 2/2003 | Kaminkow |
| 2003/0036425 A1 | 2/2003 | Kaminkow et al. |
| 2003/0036428 A1 | 2/2003 | Aasland |
| 2003/0038805 A1 | 2/2003 | Wong et al. |
| 2003/0040324 A1 | 2/2003 | Eldering et al. |
| 2003/0045354 A1 | 3/2003 | Giobbi |
| 2003/0050115 A1 | 3/2003 | Leen et al. |
| 2003/0054878 A1 | 3/2003 | Benoy et al. |
| 2003/0064798 A1 | 4/2003 | Grauzer et al. |
| 2003/0065805 A1 | 4/2003 | Barnes, Jr. |
| 2003/0069071 A1 | 4/2003 | Britt et al. |
| 2003/0087652 A1 | 5/2003 | Simon et al. |
| 2003/0087701 A1 | 5/2003 | Paravia et al. |
| 2003/0104860 A1 | 6/2003 | Cannon |
| 2003/0125973 A1 | 7/2003 | Mathews |
| 2003/0139190 A1 | 7/2003 | Steelberg et al. |
| 2003/0144047 A1 | 7/2003 | Sprogis |
| 2003/0148809 A1 | 8/2003 | Nelson |
| 2003/0148812 A1 | 8/2003 | Paulsen |
| 2003/0157976 A1 | 8/2003 | Simon |
| 2003/0176218 A1 | 9/2003 | LeMay et al. |
| 2003/0177347 A1 | 9/2003 | Schneier et al. |
| 2003/0199313 A1 | 10/2003 | Gonen |
| 2003/0224855 A1 | 12/2003 | Cunningham |
| 2003/0228901 A1 | 12/2003 | Walker |
| 2003/0233650 A1 | 12/2003 | Zaner |
| 2004/0005919 A1 | 1/2004 | Walker |
| 2004/0029638 A1 | 2/2004 | Hytcheson |
| 2004/0044774 A1 | 3/2004 | Mangalik et al. |
| 2004/0061646 A1 | 4/2004 | Andrews et al. |
| 2004/0067760 A1 | 4/2004 | Menjo et al. |
| 2004/0082383 A1 | 4/2004 | Muncaster |
| 2004/0083394 A1 | 4/2004 | Brebner et al. |

(56) References Cited

U.S. PATENT DOCUMENTS

| | | |
|---|---|---|
| 2004/0110565 A1 | 6/2004 | Levesque |
| 2004/0111515 A1 | 6/2004 | Manion |
| 2004/0127277 A1 | 7/2004 | Walker et al. |
| 2004/0129787 A1 | 7/2004 | Saito |
| 2004/0137983 A1 | 7/2004 | Kerr et al. |
| 2004/0137987 A1 | 7/2004 | Nguyen |
| 2004/0152511 A1 | 8/2004 | Nicely |
| 2004/0162124 A1 | 8/2004 | Barton |
| 2004/0162144 A1 | 8/2004 | Loose et al. |
| 2004/0185881 A1 | 9/2004 | Lee et al. |
| 2004/0192442 A1 | 9/2004 | Wells et al. |
| 2004/0198398 A1 | 10/2004 | Amir et al. |
| 2004/0242297 A1 | 12/2004 | Walker |
| 2004/0242322 A1 | 12/2004 | Montagna |
| 2004/0242332 A1 | 12/2004 | Walker et al. |
| 2004/0248637 A1 | 12/2004 | Liebenberg et al. |
| 2004/0248653 A1 | 12/2004 | Barros et al. |
| 2004/0259631 A1 | 12/2004 | Katz et al. |
| 2004/0259642 A1 | 12/2004 | Tanaka |
| 2004/0266533 A1 | 12/2004 | Gentles et al. |
| 2005/0003881 A1 | 1/2005 | Byng |
| 2005/0049022 A1 | 3/2005 | Mullen |
| 2005/0049731 A1 | 3/2005 | Dell |
| 2005/0071481 A1 | 3/2005 | Danieli |
| 2005/0073443 A1* | 4/2005 | Sheha ............... G01C 21/36 340/995.1 |
| 2005/0086301 A1 | 4/2005 | Eichler et al. |
| 2005/0090294 A1 | 4/2005 | Narasimhan |
| 2005/0091529 A1 | 4/2005 | Manion |
| 2005/0096109 A1 | 5/2005 | McNutt et al. |
| 2005/0101383 A1 | 5/2005 | Wells |
| 2005/0113172 A1 | 5/2005 | Gong |
| 2005/0130677 A1 | 6/2005 | Meunier et al. |
| 2005/0130728 A1 | 6/2005 | Ngyuen |
| 2005/0144484 A1 | 6/2005 | Wakayama |
| 2005/0170845 A1 | 8/2005 | Moran |
| 2005/0181870 A1 | 8/2005 | Nguyen |
| 2005/0187020 A1 | 8/2005 | Amaitis et al. |
| 2005/0193118 A1 | 9/2005 | Le et al. |
| 2005/0193209 A1 | 9/2005 | Saunders et al. |
| 2005/0197190 A1 | 9/2005 | Amaitis et al. |
| 2005/0209002 A1 | 9/2005 | Blythe et al. |
| 2005/0227676 A1 | 10/2005 | De Vries |
| 2005/0261061 A1 | 11/2005 | Nguyen et al. |
| 2005/0273845 A1 | 12/2005 | Urano |
| 2005/0277471 A1 | 12/2005 | Russell et al. |
| 2006/0020558 A1 | 1/2006 | Bonalle |
| 2006/0035707 A1 | 2/2006 | Nguyen et al. |
| 2006/0040717 A1 | 2/2006 | Lind et al. |
| 2006/0058102 A1 | 3/2006 | Nguyen et al. |
| 2006/0058103 A1 | 3/2006 | Danieli |
| 2006/0068917 A1 | 3/2006 | Snoddy |
| 2006/0079244 A1* | 4/2006 | Posner ............... H04W 60/04 455/456.1 |
| 2006/0093142 A1 | 5/2006 | Schneier et al. |
| 2006/0095790 A1 | 5/2006 | Nguyen et al. |
| 2006/0100019 A1 | 5/2006 | Hornik et al. |
| 2006/0105838 A1 | 5/2006 | Mullen |
| 2006/0112279 A1 | 5/2006 | Cohen |
| 2006/0128397 A1* | 6/2006 | Choti ............... G06Q 30/0261 455/456.1 |
| 2006/0136584 A1 | 6/2006 | Decker |
| 2006/0161750 A1 | 7/2006 | Perkins |
| 2006/0240856 A1 | 10/2006 | Counts |
| 2006/0242234 A1 | 10/2006 | Counts |
| 2006/0242237 A1 | 10/2006 | Manion |
| 2006/0242639 A1 | 10/2006 | Manion |
| 2006/0247053 A1 | 11/2006 | Mattila |
| 2006/0248584 A1 | 11/2006 | Kelly |
| 2006/0277413 A1 | 12/2006 | Drews |
| 2006/0281541 A1 | 12/2006 | Nguyen et al. |
| 2006/0287092 A1 | 12/2006 | Walker et al. |
| 2007/0008987 A1 | 1/2007 | Manion |
| 2007/0026871 A1 | 2/2007 | Wager |
| 2007/0054739 A1 | 3/2007 | Amaitis et al. |
| 2007/0055440 A1 | 3/2007 | Denker |
| 2007/0060355 A1 | 3/2007 | Amaitis et al. |
| 2007/0060358 A1* | 3/2007 | Amaitis ............... G07F 17/3239 463/42 |
| 2007/0155489 A1 | 7/2007 | Beckley et al. |
| 2007/0168570 A1 | 7/2007 | Martin et al. |
| 2007/0265089 A1 | 11/2007 | Robarts |
| 2007/0281689 A1 | 12/2007 | Altman |
| 2008/0039196 A1 | 2/2008 | Walther et al. |
| 2008/0076505 A1 | 3/2008 | Nguyen et al. |
| 2008/0076572 A1 | 3/2008 | Nguyen et al. |
| 2008/0085752 A1 | 4/2008 | Okada |
| 2008/0096628 A1 | 4/2008 | Czyzewski et al. |
| 2008/0102956 A1 | 5/2008 | Burman et al. |
| 2008/0108423 A1 | 5/2008 | Benbrahim et al. |
| 2008/0113785 A1 | 5/2008 | Alderucci |
| 2008/0132251 A1 | 6/2008 | Altman et al. |
| 2008/0182644 A1 | 7/2008 | Lutnick et al. |
| 2009/0005061 A1 | 1/2009 | Ward et al. |
| 2009/0049542 A1 | 2/2009 | DeYonker et al. |
| 2009/0077645 A1 | 3/2009 | Kottahachchi |
| 2009/0088180 A1 | 4/2009 | Lamance et al. |
| 2009/0167554 A1 | 7/2009 | Munje |
| 2009/0170519 A1 | 7/2009 | Wilhoite et al. |
| 2009/0197684 A1 | 8/2009 | Arezina et al. |
| 2009/0204905 A1 | 8/2009 | Toghia |
| 2009/0247285 A1 | 10/2009 | Gagner |
| 2009/0309709 A1* | 12/2009 | Bevacqua ............... B60R 25/102 340/426.18 |
| 2009/0312032 A1 | 12/2009 | Bornstein et al. |
| 2009/0312095 A1 | 12/2009 | Durham |
| 2009/0325708 A9 | 12/2009 | Kerr |
| 2010/0062834 A1 | 3/2010 | Ryan |
| 2010/0069144 A1 | 3/2010 | Curtis |
| 2010/0075760 A1 | 3/2010 | Shimabukuro et al. |
| 2010/0125673 A1 | 5/2010 | Richardson et al. |
| 2010/0127919 A1 | 5/2010 | Curran et al. |
| 2010/0227691 A1 | 9/2010 | Karsten |
| 2010/0323715 A1 | 12/2010 | Winters |
| 2011/0029359 A1 | 2/2011 | Roeding et al. |
| 2011/0035431 A1 | 2/2011 | Geary |
| 2011/0098059 A1 | 4/2011 | Qiu |
| 2011/0105213 A1* | 5/2011 | Irwin, Jr. ............... G07F 17/329 463/17 |
| 2011/0269520 A1 | 11/2011 | Amaitis et al. |
| 2012/0015735 A1 | 1/2012 | Abouchar et al. |
| 2012/0046110 A1* | 2/2012 | Amaitis ............... G07F 17/3237 463/42 |
| 2012/0094769 A1 | 4/2012 | Nguyen et al. |
| 2012/0115505 A1 | 5/2012 | Miyake |
| 2012/0167180 A1 | 6/2012 | Lee et al. |
| 2012/0184349 A1 | 7/2012 | Barclay |
| 2012/0191407 A1 | 7/2012 | Kim |
| 2012/0230486 A1 | 9/2012 | Guerrero |
| 2012/0244945 A1 | 9/2012 | Kolo |
| 2013/0072295 A1 | 3/2013 | Alderucci et al. |
| 2013/0084933 A1 | 4/2013 | Amaitis et al. |
| 2013/0093627 A1 | 4/2013 | Cosman |
| 2013/0141275 A1 | 6/2013 | Abraham |
| 2013/0157638 A1 | 6/2013 | Malmbak et al. |
| 2013/0165212 A1 | 6/2013 | Amaitis et al. |
| 2013/0178277 A1 | 7/2013 | Burman et al. |
| 2013/0244742 A1 | 9/2013 | Amaitis et al. |
| 2013/0260878 A1 | 10/2013 | Saunders et al. |
| 2013/0344932 A1 | 12/2013 | Adams et al. |
| 2015/0157947 A1 | 6/2015 | Amaitis et al. |
| 2015/0238857 A1 | 8/2015 | Amaitis et al. |
| 2016/0054838 A1 | 2/2016 | Amaitis et al. |
| 2016/0321864 A1 | 11/2016 | Burman et al. |
| 2017/0039806 A1 | 2/2017 | Alderucci et al. |
| 2017/0069162 A1 | 3/2017 | Williams et al. |
| 2017/0091435 A1 | 3/2017 | Alderucci et al. |

(56) References Cited

U.S. PATENT DOCUMENTS

| | | | |
|---|---|---|---|
| 2017/0144065 | A1 | 5/2017 | Amaitis et al. |
| 2020/0066092 | A1 | 2/2020 | Amaitis et al. |

FOREIGN PATENT DOCUMENTS

| | | |
|---|---|---|
| JP | H11-220766 | 1/1988 |
| JP | H09-182143 | 7/1997 |
| JP | 2000-69540 | 8/1998 |
| JP | 2001-070658 | 3/2001 |
| JP | 2001-204971 | 7/2001 |
| JP | 2001-514909 | 9/2001 |
| JP | 2002-123642 | 4/2002 |
| JP | 2002-175296 | 6/2002 |
| JP | 2002-279157 | 9/2002 |
| JP | 2003-062353 | 3/2003 |
| JP | 2004-38911 | 2/2004 |
| JP | 2004-86441 | 3/2004 |
| JP | 2004-136009 | 4/2004 |
| JP | 2004-512865 | 4/2004 |
| JP | 2004-261202 | 9/2004 |
| JP | 2004-329948 | 11/2004 |
| JP | 2004-536638 | 12/2004 |
| JP | 2005-027853 | 2/2005 |
| WO | WO 95/24689 | 9/1995 |
| WO | WO 97/44750 | 11/1997 |
| WO | WO 99/12135 | 3/1999 |
| WO | WO 01/48713 | 7/2001 |
| WO | WO 01/77861 | 10/2001 |
| WO | WO 02/31739 | 4/2002 |
| WO | WO 02/101486 | 12/2002 |
| WO | WO 2004/013820 | 2/2004 |
| WO | WO 2004/023253 | 3/2004 |
| WO | WO 2004/034223 | 4/2004 |
| WO | WO 2004/109321 | 12/2004 |
| WO | WO 2005/001651 | 1/2005 |
| WO | WO 2005/082011 | 2/2005 |
| WO | WO 2005/098650 | 10/2005 |
| WO | WO 2007/008714 | 1/2007 |
| WO | WO 2008/005264 | 1/2008 |
| WO | WO 2008/016610 | 2/2008 |
| WO | WO 2008/024705 | 2/2008 |
| WO | WO 2012/021806 | 8/2010 |

OTHER PUBLICATIONS

Patent Owner's Submission Regarding Petitioner's Waived Challenges for IPR2017-01333, U.S. Pat. No. 9,306,952, filed May 22, 2018.
Patent Owner's Response for IPR2017-01333, U.S. Pat. No. 9,306,952, filed Jan. 29, 2018.
Patent Owner's Submission Regarding Petitioner's Waived Challenges for IPR2017-01532, U.S. Pat. No. 9,355,518, filed May 22, 2018.
Patent Owner's Response for IPR2017-01532, U.S. Pat. No. 9,355,518, filed Mar. 9, 2018.
Deposition of Garry Kitchen for IPR2017-01333, U.S. Pat. No. 9,306,952 dated Jan. 17, 2018.
Deposition of Dr. Robert Akl for IPR2017-01532, U.S. Pat. No. 9,355,518 dated Mar. 9, 2018.
Glossary of probability and statistics, Wikipedia, dated Mar. 5, 2018.
Van Nostrand's Scientific Encyclopedia, 3$^{rd}$ Edition, published Jan. 1958.
Roman V. Yampolsky & Venu Govindarayu, "Use of Behavorial Biometrics in Intrusion Dection and Online Gaming", Proc. of SPIE vol. 6202, Apr. 17, 2006, pp. 62020U-1-62020U-10.
"An experimental comparison of secret-based user authentication technologies", Irakdeous et al.—Information Management & Computer Security, 2002, 1, 2/3 ABI/INFORM Global, pp. 100-108.
Front Mission Online playing manual 2005, Square Enix, accepted by the Japanese Patent Office dated May 13, 2005, p. 017.
Final Fantasy XI phantom of JIRART for Windows playing manual 2005, Square Enix, accepted by the Japan Patent Office dated Mar. 31, 2005, p. 029.
Personal authentication through biometric technologies, Podio et al, IEEE 2002.
Digital chips for an on-line casino, Castell'a-Roca et al, IEEE 2005.
Defendants' Joint Unenforceability and Invalidity Contentions dated Mar. 21, 2017 (51 pages).
IPR Decision for U.S. Pat. No. 9,306,952, Case IPR2017-01333, Nov. 13, 2017 (30 pages).
Patent Owner's Preliminary Response for U.S. Pat. No. 9,306,952, Case IPR2017-01333, Aug. 16, 2017 (49 pages).
Petition for Inter Partes Review of U.S. Pat. No. 9,306,952, Case IPR2017-01333, May 1, 2017 (74 pages).
IPR Decision for U.S. Pat. No. 9,355,518, Case IPR2017-01532, Dec. 13, 2017 (29 pages).
Patent Owner's Preliminary Response for U.S. Pat. No. 9,355,518, Case IPR2017-01532, Sep. 19, 2017 (27 pages).
Petition for Inter Partes Review of U.S. Pat. No. 9,355,518, Case IPR2017-01532, Jun. 8, 2017 (74 pages).
ImagiNation—OnLine Games, 1995, 58 pages.
ImagiNation, 1993 ImagiNation Network—A Quick Guide to Using Your Imagination, 16 pages.
ImagiNation Network [R] General Documentation (INN), 27 pages.
BYTE Magazine, Mar. 1984, vol. 9, No. 3 (552 pages).
IBM Technical Reference, 1$^{st}$ Ed. Revised, Nov. 1983 (572 pages).
IBM PC Jr. Advertising Booklet, 1983, 14 pages.
IBM PC Jr. Order Form, Nov. 1983, 2 pages.
Sierra 3-D Animated Adventure Game Reference Card for MS DOS, 1987 (4 pages).
Leisure Suit Larry in the Land of the Lounge Lizards Manual, Jun. 4, 1987, 13 pages.
Electronic Gaming Monthly, No. 89, Dec. 1996 (352 pages).
Wireless Pro Fighter 8 Box Cover (1 page), Dec. 1996.
Naki Wireless Pro Fighter 8 controller (1 page), Dec. 1996.
Sega Saturn Instruction Manual (24 pages), May 11, 1995.
Sega Saturn Overview Manual (67 pages), Jun. 27, 1995.
Sega Saturn Overview Manual unlocked (67 pages), Jun. 27, 1995.
Sega Saturn Introduction Manual (10 pages), Jun. 27, 1995.
Game FAQs: Tokimeki Memorial: Forever With You, Dec. 13, 1996 (17 pages).
How to get the most out of CompuServe, Charles Bowen and David Peyton, 1986 (58 pages).
Alfred Glossbrenner's Master Guide to Compuserve, 1987 (25 pages).
CompuServe Information Service Users Guide, Sep. 1986 (42 pages).
The Official Guide to the Prodigy Service, John L. Vierscas, 1998 (77 pages).
Wireless Gaming Makes Strides in Nevada by Libe Goad, PCMag.com, Jun. 9, 2005 (3 pages).
Guinn gives OK to wireless gaming devices in casinos by Elizabeth White, Las Vegas Sun, Jun. 2, 2005 (8 pages).
Welcome to Cantor Casino, Wayback machine, Oct. 2005 (1 page).
Hand-held devices next wave in gaming, The Times, Aug. 12, 2005 (1 page).
Rolling the dice, Casinos ready to put their money on wireless gaming devices, The Journal News, Nov. 14, 2005 (2 pages).
Nevada Oks gambling on the go, The Courier Journal, Apr. 2, 2006 (1 page).
Devices could bring mobile gaming to casinos, Reno Gazette-Journal, Mar. 24, 2006 (2 pages).
Regulators approve wireless device by Ryan Randazzo, Reno Gazette Journal, Aug. 25, 2006.
Nevada Gaming Commission Mobile Gaming Policies, May 18, 2006 (5 pages).
Handheld gambling devices will show up soon in casinos by the Associated Press in the Florida Today Newspaper Aug. 3, 2005 (1 page).
Cantor Fitzgerald Press Release—Cantor Fitzgerald Launches Cantor Casino and Cantor Gaming, Sep. 29, 2005 (2 pages).

(56) References Cited

OTHER PUBLICATIONS

Coming to a Nevada casino soon: Playing the slots wirelessly, by the New York Times in the Arizona Republic Newspaper—Fox Butterfield, Jul. 4, 2005 (1 page).
Minutes of the Meeting on the Assembly Committee on Judiciary, Seventy-Third Session, Apr. 8, 2005 (42 pages).
O2 and Cantor Index bring gambling to PDAs by Jo Best of ZDNet, Sep. 3, 2003 (6 pages).
Stocking fillers by Ashley Norton of the Guardian, Sep. 20, 2003 (5 pages).
O2 XDA II Coming November by Fabrizio Pilato of Mobile Mag, Oct. 23, 2003 (6 pages).
Securities and Exchange Commission—The XDA II from O2 Corners a Third of the Market in First Six Months Jul. 15, 2004 (3 pages).
Final Notice to Cantor Index Limited from the Financial Services Authority, Dec. 30, 2004 (13 pages).
Handheld devices can be used for games in Casino public areas by the Associated Press in NBC News, Mar. 24, 2006 (2 pages).
Nevada approves new mobile gambling rules, GMA News Online, Mar. 24, 2006 (5 pages).
Legalized Gambling as a Strategy for Economic Development by Robert Goodman Mar. 1994 (225 pages.
New York Times—Two inventors contend that the V-chip is an idea they've seen before—in their own patent.—By Teresa Riordan Oct. 28, 1996 (4 pages).
Wireless ATM & Ad-Hoc Networks by C-K Toh, Dec. 31, 1996 (23 pages).
PC Mag—Wireless Gaming Makes Strides in Nevada, Jun. 9, 2005 (3 pages).
The Times Money, HanId-held devices next wave in gaming, Aug. 12, 2005 (1 page).
AOL—The Official America Online Tour Guide for Windows 3.1, 1996 Tom Lichty, Jul. 1996 (14 pages).
Business Wire—Diamond I Opens Online Interactive Demo of its WifiCasino GS Gaming System, Apr. 27, 2005 (3 pages).
Diamond I PRN Wire Diamond I Comments on Future of Hand-held Gambling Devices in Nevada, Jun. 2, 2005 (4 pages).
Diamond I Rolls the Dice by Naomi Graychase, Feb. 23, 2005 (3 pages).
Diamond I Opens Online Interactive Demo of its WifiCasino GS Gaming System, Business Wire, Apr. 27, 2005 (3 pages).
Diamond I Responds to Inquiries: What is "WifiCasino GS"?, Business Wire, Jan. 27, 2005 (3 pages).
Diamond I Technologies—Products, Wayback Machine, Apr. 29, 2005-Aug. 12, 2007, (2 pages).
Diamond I Technologies—Products, Wayback Machine, Apr. 29, 2005-Jan. 6, 2010, (2 pages).
Kidnet, Kid's Guide to Surfing through Cyberspace by Brad and Debra Schepp—Nov. 1995 (9 pages).
The New York Times—Nintendo and Minnesota Set a Living-Room Lottery Test, Sep. 27, 1991, (4 pages).
The New York Times—Minnesota Cancels Plan to Play Lottery on Nintendo, Oct. 19, 1991 (3 pages).
Case 2:16-cv-00856-RCJ-VCF, Document 1, "Plaintiffs' Complaint for Patent Infringement" filed Apr. 14, 2016 (39 pages).
Case 2:16-cv-00856-RCJ-VCF, Document 19, "Plaintiffs' First Amended Complaint for Patent Infringement", filed Jul. 11, 2016 (57 pages).
Case 2:16-cv-00856-RCJ-VCF, Document 23, "Defendant 888's Motion to Dismiss Plaintiffs First Amended Complaint Under Fed. R. Civ. P. 12(B)(6)", filed Aug. 12, 2016 (22 pages).
Case 2:16-cv-00856-RCJ-VCF, Document 26, "Defendant's Notice of Joinder to Motions to Dismiss in Related Cases", filed Aug. 12, 2016 (4 pages).
Case 2:16-cv-00856-RCJ-VCF, Document 36, "Plaintiffs' Opposition to 888 Holdings PLC's Motion to Dismiss", filed Sep. 8, 2016 (32 pages).

Case 2:16-cv-00856-RCJ-VCF, Document 37, "Index of Exhibits to Plaintiffs' Opposition to Defendant's Motion to Dismiss" filed Sep. 8, 2016 (3 pages).
Case 2:16-cv-00856-RCJ-VCF, Document 45, Defendant 888's Reply in Support to Dismiss Plaintiffs' First Amended Complaint Under Fed. R. Civ. P. 12(B)(6), filed Sep. 26, 2016 (19 pages).
Case 2:16-cv-00856-RCJ-VCF, Document 46, Defendant 888's Reply in Support of Motion to Dismiss Plaintiffs' First Amended Complaint Under Fed. R. Civ. P. 12(B)(6), filed Sep. 26, 2016 (19 pages).
Case 2:16-cv-00856-RCJ-VCF, Document 54, "Order", filed Dec. 6, 2016 (8 pages).
Case 2:16-cv-00856-RCJ-VCF, Document 57, "Defendant 888's Holdings PLC's Answer to Plaintiffs'First Amended Complaint", filed Jan. 18, 2017 (67 pages).
Case 2:16-cv-00857-APG-VCF, Document 1, "Plaintiffs' Complaint for Patent Infringement" filed Apr. 14, 2016 (29 pages).
Case 2:16-cv-00857-RCJ-VCF, Document 27, "Defendant Big Fish Games, Inc.'s Motion to Dismiss", filed Jun. 17, 2016 (30 pages).
Case 2:16-cv-00857-RCJ-VCF, Document 32, "[Corrected] Defendant Big Fish Games, Inc.'s Motion to Dismiss", filed Jul. 8, 2016 (30 pages).
Case 2:16-cv-00857-RCJ-VCF, Document 33, "Plaintiffs' Opposition to Big Fish Games, Inc.'s Motion to Dismiss", filed Jul. 25, 2016 (32 pages).
Case 2:16-cv-00857-RCJ-VCF, Document 34, "Reply in Support of Defendant Big Fish Games, Inc.'s Motion to Dismiss", filed. Aug. 4, 2016 (17 pages).
Case 2:16-cv-00857-RCJ-VCF, Document 36, "Order" filed Aug. 29, 2016 (29 pages).
Case 2:16-cv-00857-RCJ-VCF, Document 37, "Plaintiffs' First Amended Complaint for Patent Infringement", filed Sep. 28, 2016 (38 pages).
Case 2:16-cv-00857-RCJ-VCF, Document 39, "Defendant Big Fish Games, Inc.'s Motion to Dismiss Plaintiffs' First Amended Complaint", filed Oct. 12, 2016 (17 pages).
Case 2:16-cv-00857-RCJ-VCF, Document 45, "Plaintiffs' Opposition to Big Fish Games, Inc.'s Motion to Dismiss", filed Oct. 31, 2016 (22 pages).
Case 2:16-cv-00857-RCJ-VCF, Document 49, "Reply in Support of Defendant Big Fish Games, Inc.'s Motion to Dismiss", filed Nov. 10, 2016 (16 pages).
Case 2:16-cv-00857-RCJ-VCF, Document 59, "Order", filed Jan. 4, 2017 (9 pages).
Case 2:16-cv-00857-RCJ-VCF, Document 60, "Defendant Big Fish Games, Inc.'s Answer to First Amended Complaint", filed Jan. 19, 2017 (17 pages).
Case 2:16-cv-00871-JAD-VCF, Document 1, "Plaintiffs' Complaint for Patent Infringement" filed Apr. 15, 2016 (39 pages).
Case 2:16-cv-00871-JAD-VCF, Document 23, "Plaintiffs' First Amended Complaint for Patent Infringement" filed Jul. 11, 2016 (57 pages).
Case 2:16-cv-00871-JAD-VCF, Document 31, "Motion to Dismiss Under 35 U.S.C. §101" filed Aug. 12, 2016 (16 pages).
Case 2:16-cv-00871-RCJ-VCF, Document 35, "Plaintiffs' Opposition to Defendants' Motion to Dismiss" filed Sep. 8, 2016 (25 pages).
Case 2:16-cv-00871-RCJ-VCF, Document 40, "Reply in Support of Motion to Dismiss Under 35 U.S.C. §101" filed Sep. 26, 2016 (14 pages).
Case 2:16-cv-00871-RCJ-VCF, Document 42, "Order" filed Oct. 18, 2016 (15 pages).
Case 2:16-cv-00871-RCJ-VCF, Document 46, "Motion for Reconsideration" filed Oct. 31, 2016 (7 pages).
Case 2:16-cv-00871-RCJ-VCF, Document 47, Motion to Dismiss Under Fed. R. Civ. P. 12(B)(6) filed Nov. 1, 2016 (7 pages).
Case 2:16-cv-00871-RCJ-VCF, Document 49, "Plaintiffs' Opposition to Defendants' Motion for Reconsideration", filed Nov. 17, 2016 (11 pages).
Case 2:16-cv-00871-RCJ-VCF, Document 50, "Plaintiffs' Opposition to Defendants' Motion to Dismiss", filed Nov. 17, 2016 (12 pages).

(56) References Cited

OTHER PUBLICATIONS

Case 2:16-cv-00871-RCJ-VCF, Document 55, Reply in Support of Defendants' Motion to Dismiss Under Fed. R. Civ. P. 12(B)(6), filed Nov. 30, 2016 (6 pages).
Case 2:16-cv-00871-RCJ-VCF, Document 56, "Reply in Support of Motion for Reconsideration" filed Nov. 30, 2016 (7 pages).
Case 2:16-cv-00871-RCJ-VCF, Document 63, "Order" filed Jan. 4, 2017 (10 pages).
Case 2:16-cv-00871-RCJ-VCF, Document 64, "Bwin's Answer to Plaintiffs' First Amended Complaint" filed Jan. 6, 2017 (15 pages).
Case 2:16-cv-00858-MMD-GWF, Document 1, "Plaintiffs' Complaint for Patent Infringement" filed Apr. 14, 2016 (30 pages).
Case 2:16-cv-00858-RCJ-VCF, Document 19, "Defendant Double Down Interactive LLC's Motion to Dismiss", filed Jun. 7, 2016 (32 pages).
Case 2:16-cv-00858-RCJ-VCF, Document 30, "Plaintiffs' Opposition to Double Down's Motion to Dismiss", filed Jul. 8, 2016. (31 pages).
Case 2:16-cv-00858-RCJ-VCF, Document 51, "Reply in Support of Defendant Double Down Interactive LLC's Motion to Dismiss", filed Jul. 18, 2016 (14 pages).
Case 2:16-cv-00858-RCJ-VCF, Document 58, "Plaintiffs' First Amended Complaint for Patent Infringement", filed Sep. 28, 2016 (38 pages).
Case 2:16-cv-00858-RCJ-VCF, Document 63, "Defendant Double Down Interactive LLC's Motion to Dismiss' Plaintiffs' First Amended Complaint for Patent Infringement", Oct. 17, 2016 (31 pages).
Case 2:16-cv-00858-RCJ-VCF, Document 69, "Plaintiffs' Opposition to Double Down Interactive, Inc.'s Motion to Dismiss", filed Nov. 3, 2016 (24 pages).
Case 2:16-cv-00858-RCJ-VCF, Document 76, "Defendant Double Down Interactive LLC's Reply in Support of Motion to Dismiss Plaintiffs' First Amended Complaint for Patent Infringement", filed. Nov. 14, 2016 (18 pages).
Case 2:16-cv-00858-RCJ-VCF, Document 83, "Defendant Double Down Interactive LLC's Answer, Defenses, and Counterclaims to Plaintiffs' First Amended Complaint for Patent Infringement", filed Jan. 18, 2017 (19 pages).
Case 2:16-cv-00858-RCJ-VCF, Document 84, "Plaintiffs' Answer to Double Down Interactive LLC's Counterclaims Against CG Technology Development, LLC", filed Feb. 8, 2017 (4 pages).
Case 2:16-cv-00781-RFB-CWH, Document 1, "Plaintiffs' Complaint for Patent Infringement" filed Apr. 7, 2016 (33 pages).
Case 2:16-cv-00781-MMD-CWH, Document 29, "Plaintiffs' First Amended Complaint for Patent Infringement" filed Jun. 13, 2016 (42 pages).
Case 2:16-cv-00781-MMD-CWH, Document 37, "Defendant's Motion to Dismiss Plaintiffs' Amended Complaint Under Fed.R. Civ. P. 12(B)(6)" filed Jul. 29, 2016 (38 pages).
Case 2:16-cv-00781-MMD-CWH, Document 44, "Defendant's Motion for Protective Order Staying Discovery Pending Ruling on Motion to Dismiss" filed Aug. 22, 2016 (12 pages).
Case 2:16-cv-00781-MMD-CWH, Document 45, "Plaintiffs' Opposition to DraftKings, Inc.'s Motion to Dismiss" filed Aug. 24, 2016 (38 pages).
Case 2:16-cv-00781-MMD-CWH, Document 50, "Plaintiffs' Opposition to DraftKings, Inc.'s Motion to Stay" filed Sep. 8, 2016 (12 pages).
Case 2:16-cv-00781-MMD-CWH, Document 57, "Defendant's Reply in Support of it's Motion to Dismiss Plaintiffs' Amended Complaint Under Fed. R. Civ. P. 12(B)(6)" filed Sep. 26, 2016 (19 pages).
Case 2:16-cv-00781-MMD-CWH, Document 59, "Order" filed Sep. 27, 2016 (3 pages).
Case 2:16-cv-00781-RCJ-VCF, Document 64, "Plaintiffs" Motion to Lift Stay filed Nov. 23, 2016 (6 pages).
Case 2:16-cv-00781-RCJ-VCF, Document 69, "Order" filed Dec. 12, 2016 (11 pages).
Case 2:16-cv-00781-RCJ-VCF, Document 72, "DraftKings' Answer to Plaintiffs' First Amended Complaint and Affirmative Defenses" filed Dec. 27, 2016 (29 pages).
Case 2:16-cv-00801-JCM-VCF, Document 1, "Plaintiffs' Complaint for Patent Infringement" filed Apr. 8, 2016 (31 pages).
Case 2:16-cv-00801-RCJ-VCF, Document 31, "Plaintiffs' First Amended Complaint for Patent Infringement" filed Jun. 13, 2016 (48 pages).
Case 2:16-cv-00801-RCJ-VCF, Document 32, "Index of Exhibits to Plaintiffs' First Amended Complaint for Patent Infringement" filed Jun. 13, 2016 (3 pages).
Case 2:16-cv-00801-RCJ-VCF Document 44, "Defendant Fanduel, Inc's. Motion to Dismiss for Failure to State a Claim Upon Which Relief Can be Granted" filed Jul. 14, 2016 (18 pages).
Case 2:16-cv-00801-RCJ-VCF Document 75, "Defendant Fanduel, Inc's Motion for Leave to Supplement Briefing Under LR 7-2(g)" filed Sep. 22, 2016 (3 pages).
Case 2:16-cv-00801-RCJ-VCF Document 77, "Plaintiffs' Opposition to Defendant Fanduel, Inc.'s. Motion for Leave [ECF No. 75]" filed Oct. 11, 2016 (4 pages).
Case 2:16-cv-00801-RCJ-VCF Document 81, "Defendant Fanduel Inc.'s Notice of Withdrawal of Motion Seeking Leave to File Supplemental Briefing" filed Oct. 20, 2016 (3 pages).
Case 2:16-cv-00801-RCJ-VCF Document 86, "Plaintiffs' Second Amended. Complaint for Patent Infringement" filed Nov. 16, 2016 (70 pages).
Case 2:16-cv-00801-RCJ-VCF Document 87, "Defendant Fanduel's Answer to Plaintiffs' Second Amended Complaint and Affirmative Defenses" filed Nov. 30, 2016 (19 pages).
Case 2:16-cv-00801-RCJ-VCF Document 88, "Defendant's Partial Motion to Dismiss CGT's Second Amended Complaint for Failure to State a Claim Upon Which Relief Can Be Granted" filed Nov. 30, 2016 (14 pages).
Case 2:16-cv-00801-RCJ-VCF Document 94, "Plaintiffs' Opposition to Fanduel, Inc.'s Partial Motion to Dismiss" filed Dec. 19, 2016 (11 pages).
Case 2:16-cv-00801-RCJ-VCF Document 103, "Fanduel, Inc.'s Reply in Support of Partial Motion to Dismiss" filed Dec. 27, 2016 (7 pages).
Case 2:16-cv-00801-RCJ-VCF Document 113, "Order" filed Jan. 4, 2017 (11 pages).
Case 2: 16-cv-801-RCJ-VCF Document 114, "Transcript of Pretrial Conference" filed Dec. 2, 2016 (54 pages).

* cited by examiner

GAMING THROUGH MOBILE OR OTHER DEVICES

CROSS REFERENCE TO RELATED APPLICATIONS

This application is a continuation of U.S. patent application Ser. No. 13/780,157 filed Feb. 28, 2013 which claims priority to U.S. provisional application 61/604,115, filed Feb. 28, 2012; U.S. provisional application 61/680,168, filed Aug. 6, 2012; and U.S. provisional application 61/736,087 filed Dec. 12, 2012, all of which are hereby incorporated herein by reference.

FIELD

Some embodiments may generally relate to gaming and/or mobile devices.

BACKGROUND

Mobile devices, such as cellular telephones, PDAs, notebook computers, and/or various other devices may be used by individuals. Gaming, such as casino gaming, sports wagering, video gaming, and/or various other forms of gaming may be performed.

SUMMARY

The following should be understood as example embodiments, and not as claims.

A. A method comprising: determining, by a computing device, that a first cellular telephone is accessing a gaming service through a first network that is known to the gaming service as being in an approved location; in response to determining that the first cellular telephone is accessing the gaming service through the first network, allowing, by the computing device, the first cellular telephone to access gaming services of the gaming service; determining, by the computing device, that a second cellular telephone is accessing a gaming service through a second network that is not known to the gaming service as being in the approved location; in response to determining that the second cellular telephone is accessing the gaming service through the second network, determining, by the computing device, that a first confidence level that the second cellular telephone is in the approved location based on a first internet protocol address of the second cellular telephone is above a threshold confidence; in response to determining that the first confidence level is above the threshold confidence, allowing, by the computing device, the second cellular telephone to access gaming services of the gaming service; determining, by the computing device, that a third cellular telephone is accessing a gaming service through the second network that is not known to the gaming service as being in the approved location; in response to determining that the third cellular telephone is accessing the gaming service through the second network, determining, by the computing device, that a second confidence level that the third cellular telephone is in the approved location based on a second internet protocol address of the third cellular telephone is below the threshold confidence; in response to determining that the second confidence level is below the threshold confidence, querying, by the computing device, a secondary location determination service for a location of the third cellular telephone; receiving, by the computing device, an indication of the location of the third cellular telephone from a secondary location determination service; and allowing, by the computing device, the third cellular telephone to access gaming services of the gaming service based on the location of the third cellular telephone being in the approved location.

B. A method comprising: determining, by a computing device, which of a plurality of geofences a device is located in, wherein a first of the plurality of geofences includes therein at least a second geofence, and wherein one or more gaming activities are available to a user of the device when the device is located in any of the plurality of geofences; based on which of the plurality of geofences the device is located in, determining, by the computing device, a time at which a location of the device is to be re-determined, wherein when the device is located within the first geofence but not the second geofence, the time is a first value and wherein when the device is located within the first and second geofences, the time is a second value; and at the determined time, determining, by the computing device, a location of the device.

B.1 The method of claim B, wherein the second time is greater than the first time. B.2. The method of claim B, wherein the second time is less than the first time. B.3. The method of claim B, wherein the second time equals the first time. B.4. The method of claim B, wherein the second geofence includes therein at least a third geofence.

C. A method comprising: registering, by a computing device, an application on a device, wherein one or more gaming activities are available to a user of the device, and wherein the application is at least configured to determine a location of the device, that the device has changed location, and/or a distance the device has moved; receiving, by the computing device, from the application a report wherein the report includes at least one of a location of the device, an indication that the device has moved, and an indication of a distance the device has moved; and in response to the report, determining, by the computing device, through geofencing a location of the device.

C.1. The method of claim C, further comprising: determining which of a plurality of geofences the device is located in, wherein a first of the plurality of geofences includes therein at least a second geofence, and wherein one or more of the gaming activities are available to the user when the device is located in any of the plurality of geofences; and based on which of the plurality of geofences the device is located in, configuring the application to report location changes, wherein when the device is located within the first geofence but not the second geofence, the application is configured to report shorter distance movements of the device as compared to when the device is located within the first and second geofences.

D. A method comprising: responsive to a user using a device to access a gaming service to engage in at least one gaming activity, determining by a computing device whether the user's device is located within a pre-defined location, wherein the pre-defined location is defined by a non-circular geofence, and wherein determining whether the user's device is located within the pre-defined location includes making the determination through the use of geofencing; and allowing by the computing device the user to engage in the at least one gaming activity from the user's device based upon the determination that the user's device is located in the pre-defined location.

D.1. The method of claim D, wherein the non-circular geofence is a polygonal geofence.

E. A method comprising: determining, by a computing device, which of a plurality of geofences a device is located in, wherein a first of the plurality of geofences includes therein at least a second geofence, and wherein one or more gaming activities are available to a user of the device when the device is located in any of the plurality of geofences; based on which of the plurality of geofences the device is located in, determining, by the computing device, a time at which a location of the device is to be re-determined, wherein when the device is located within the first geofence but not the second geofence, the time is a first value and wherein when the device is located within the first and second geofences, the time is a second value; and at the determined time, determining, by the computing device, a location of the device.

E.1. The method of claim E, wherein the second time is greater than the first time. E.2. The method of claim E, wherein the second time is less than the first time. E.3. The method of claim E, wherein the second time equals the first time. E.4. The method of claim E, wherein the second geofence includes therein at least a third geofence.

F. A method comprising: registering, by a computing device, an application on a device, wherein one or more gaming activities are available to a user of the device, and wherein the application is at least configured to determine a location of the device, that the device has changed location, and/or a distance the device has moved; receiving, by the computing device, from the application a report wherein the report includes at least one of a location of the device, an indication that the device has moved, and an indication of a distance the device has moved; and response to the report, determining, by the computing device, through geofencing a location of the device.

F.1. The method of claim F, further comprising: determining which of a plurality of geofences the device is located in, wherein a first of the plurality of geofences includes therein at least a second geofence, and wherein one or more of the gaming activities are available to the user when the device is located in any of the plurality of geofences; and based on which of the plurality of geofences the device is located in, configuring the application to report location changes, wherein when the device is located within the first geofence but not the second geofence, the application is configured to report shorter distance movements of the device as compared to when the device is located within the first and second geofences.

G. A method comprising: responsive to a user using a device to access a gaming service to engage in at least one gaming activity, determining by a computing device whether the user's device is located within a pre-defined location, wherein the pre-defined location is defined by a non-circular geofence, and wherein determining whether the user's device is located within the pre-defined location includes making the determination through the use of geofencing; and allowing by the computing device the user to engage in the at least one gaming activity from the user's device based upon the determination that the user's device is located in the pre-defined location.

G.1. The method of claim G, wherein the non-circular geofence is a polygonal geofence.

DETAILED DESCRIPTION

I. Example Embodiments

Figure 1:
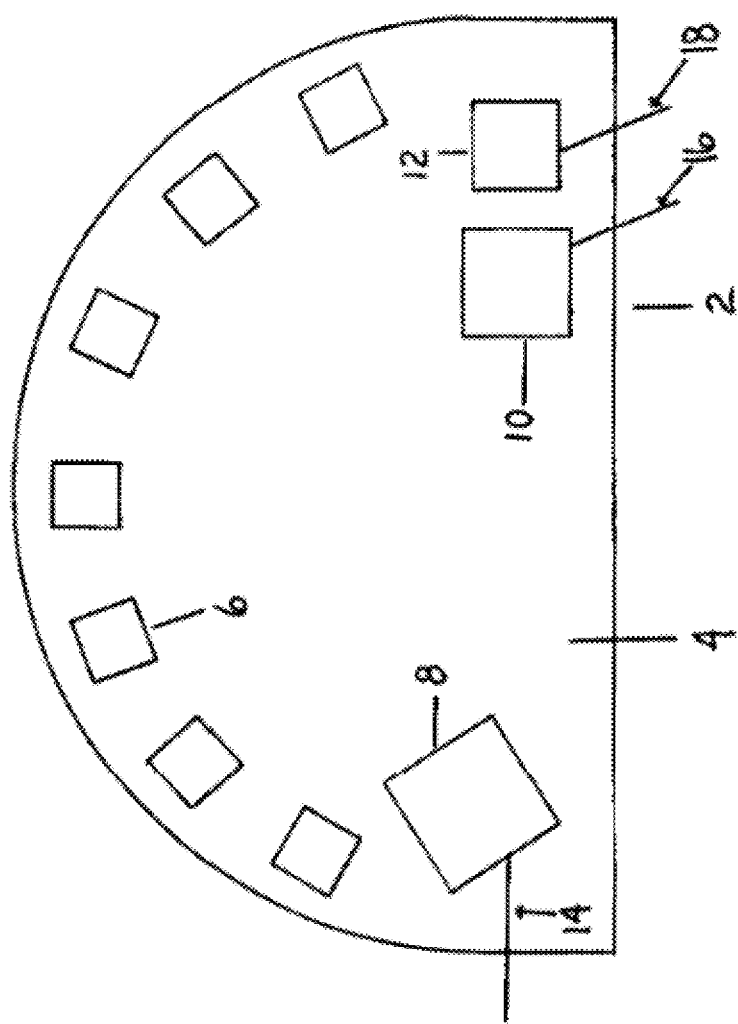
FIG. 1 shows a block diagram of a hand-reading system of some embodiments.

Colloquially, gaming may be referred to as wagering but it should be understood that embodiments are not limited to the statutory definition of wagering that is limited to games of chance but rather may include games of skill, fantasy games, games of chance, and/or any other type of games and therefore the term gaming is used when discussing some embodiments rather than the term wagering. Gaming may include a risk of an amount of money that some event will happen. Such risk may be skill and/or risk based, booked and/or pari-mutuel, and/or take any form desired. Gaming may include paying a fee to enter into a contest that is based on the occurrence of an event. The winner of such a contest may be provided with an award (e.g., money based on a sum of contest entry fees). Wagering may be used herein to refer to such skill or risk based gaming in some instances and should not be understood to be limited to one or the other type of gaming unless specified otherwise. Gaming may include wagering, betting, risking money, paying an entry fee to a contest, and/or any other form of gaming as desired. Various embodiments may apply to any type of gaming in any combination and/or arrangement.

Some example methods and systems that may relate to gaming are described in U.S. patent application Ser. Nos. 13/080,098 and 13/288,223. U.S. patent application Ser. No. 13/080,098 to Amaitis filed Apr. 5, 2011 is hereby incorporated herein by reference. U.S. patent application Ser. No. 13/288,223 to Amaitis filed Nov. 3, 2011 is hereby incorporated herein by reference.

Some embodiments may facilitate gaming on one of more mobile devices. Some embodiments may allow such gaming when a mobile device and/or customer is in a jurisdiction and/or area in which gaming (e.g., gambling, wagering, lottery, fantasy contests) is legal. Some embodiments may allow such gaming when a mobile device and/or customer is properly authorized and/or controlled. In some embodiments, various procedures and/or apparatus may be used to ensure security, authenticity, and/or locations of a customer and/or device. Gaming may be facilitated, in some embodiments, over a cellular network, a wireless communication network, and/or any desired communication network. In some embodiments, when in a location where such gaming is allowed, when a device is properly authorized and/or controlled, a customer may operate a mobile device to play one or more games (e.g., place one or more wagers, enter information that defines play of one or more games) from a gaming or other account over the communication network.

In some embodiments, gaming may include, for example, sports betting, casino betting, proposition betting, fantasy contest playing, sports lottery games, and/or other for of gaming. In some embodiments, gaming may include gaming from a gaming account, a credit card, using cash, on credit, and so on. In some embodiments, jurisdictions and/or areas in which gaming may be allowed may include, for example, casino floors, the state of Nevada, outside of hotel rooms, outside of residences, the city of Atlantic City, inside hotel rooms, and so on. It should be recognized that while some embodiments are described in terms of sports gaming, cellular networks, and/or particular areas, that these embodiments are given as examples only and that other embodiments may include any desired types of gaming, any desired types of communication networks, any desired area(s) and/or no such elements.

Some embodiments may include technology configured to facilitate a customer playing a game over a communication network using a mobile device if the customer is in a location where playing the game is legal and/or otherwise allowed (e.g., the state of Nevada). Some embodiments may include technology configured to prevent a customer from playing a game over a communication network using a mobile device if the customer is not in a location where playing the game is legal and/or otherwise allowed (e.g., may be prevented from placing a bet, may be prevented from logging into an account, may be logged out of an account when outside of a legal gaming area, and so on). In some embodiments, gaming related services may be provided and/or prevented outside of legal gaming areas as desired and/or as allowed in respective areas. Such gaming related services may include providing odds, score updates, account information, and so on. In some embodiments, a location of a mobile device may be used as a proxy for a location of a customer. References to a location may be understood as a location of a mobile device (e.g., a determined location, an approximate location).

IP Address-Based Location Examples

Some embodiments may include determining a location based on an IP (Internet Protocol) address. For example, a location of a user of a mobile device may be determined based on the IP address of the location. Such a location may be an estimated location based on received information about IP addresses. Such received information may include ISP providers identifying IP address ranges that are assigned to a particular location, user identification of a location from a particular IP address, and/or any information that may be useful in determining a location based on an IP address. A location may include a location with any desired granularity and/or a granularity based on available information. For example, a location may identify a city, a state, a zip code and/or so on. In some embodiments, a highest level of granularity that is available may be used (e.g., if state and city are both available, city may be used). It should be recognized that various embodiments may not be limited to a specific granularity and/or method location determination or identification. Rather than and/or in addition to a location where a device is, a location may include a location where something is not (e.g., a device may be anywhere except some places such as not in California and this may be useful if gaming is allowed in most locations but not a few locations).

Some embodiments may include and/or interact with a system that provides location information based on IP addresses. One example system that may perform such functionality includes IP Intelligence offered by Neustar, which is located at 401 Castro Street, Mountain View, Calif. Some embodiments may include interacting with such a system (e.g., requesting location information, transmitting IP addresses to, receiving location information from, and so on). For example, in response to receiving a request to access gaming services from a device, such a service may be queried with an indication of the IP address of the device requesting access to the gaming services. A location may be determined in response to the query (e.g., by accessing stored information about IP addresses such as ranges of IP addresses that ISPs assign to each location and comparing the IP address to such ranges) and transmitted from the service to a gaming service. A location may be received from such a service in response to such querying. Some embodiments may include a local copy of an IP-location database. The local copy may be stored by a gaming service provider and queried to make a location determination. The local copy may be updated with a master third party copy periodically (e.g., every week, every month, etc.) and/or as desired. When various embodiments are discussed and reference a third party IP location or other third party service, it should be recognized that a local copy of information or local service may be used instead of or in addition to a third party service and that a third party service is merely given as a non-limiting example.

Some embodiments may include purchasing and/or storing IP address information and determining location information based on such information. For example, instead of and/or in addition to using a third party service, some embodiments may include storing information about IP addresses and using such information instead of and/or in addition to querying a third party. For example, some embodiments may store specific IP addresses that have known locations (e.g., IP addresses associated with a particular property such as a specific casino, a partner, and so on). A location may be determined by comparing a received IP address with such stored information.

In some embodiments, a determination or and/or receipt of information about a location based on an IP address may include a confidence of such a location. For example, a IP based location determination service may identify that based on known information about locations of IP addresses, a particular IP address is 90%, 100%, 10%, 50%, 0% or any chance likely to be in a location. Any method of determining confidence may be used. For example, if an ISP provides information identifying where they assign a particular range of IP addresses, and the IP address whose location is being determined corresponds to the range, a 100% confidence may be assigned to that location. As another example, if other information, such as user, merchant, or other reported information is used to determine the location rather than ISP specified information, a lower confidence may be assigned (e.g., 50%). As another example, if observation (e.g., an indication that the IP addresses has been observed in a particular location) is used to determine a location, a lower confidence may be assigned (e.g., 50%).

In some embodiments, a determination and/or receipt of information about a location based on an IP address may include an identification of a type of network assigning the IP address. For example, mobile networks may be known to assign IP addresses in a certain range, so an address may be identified as a known mobile address. Other networks may similarly be known to assign addresses in a particular range, so an address may be identified as being from a network with whatever characteristic is known. It may be important to know if the network to which a particular client device is connected is a mobile network (e.g., cell phone network) or non-mobile network (e.g., Ethernet, Wi-Fi, etc.). A mobile network may be treated differently than a non-mobile network (e.g., IP address location verification may not be used for mobile network connections but may be used for non-mobile networks). In some embodiments, a type of network may influence a confidence level of an IP location.

Multi Level Location Determination

In some embodiments, a gaming service may limit access to gaming services to devices that are in particular locations. Such locations may include jurisdictions where gaming is legal. Such locations may include properties where gaming is legal. Different types of services may be made available based on a location where a device is located (e.g., which jurisdiction, which state, which casino, on a casino floor vs. outside, in a school, etc.).

Some embodiments may include a multi-level location determination to facilitate determining which if any gaming services to allow for a device accessing a gaming service. For example, in some embodiments, different methods of location determination may be used in different situations. Such different situations may include different statuses of an IP address of a device accessing a gaming service. For example, if an IP address is known by a gaming provider, a location of a device may be accepted as known; if an IP address is not known but has a high confidence of being in a location based on a third party determination, the third party determination may be accepted; if an IP address is not known and has a low confidence of being in a location based on a third party determination, a secondary location determination method may be used (e.g., geofencing, GPS, etc.). It should be recognized that various embodiments may include any methodologies in any combination for determining locations and that references to a third party are non-limiting and may not use such a third party at all (e.g., may use a local cache of an IP location system, a local geofencing system, etc.). Such multi-level determination may be performed by a component of a gaming provider (e.g., a server, a router, a computer system, etc. of a casino and/or third party gaming service provider) that may interact with one or more series and/or devices as desired to facilitate such location determination.

Trusted IP-Based Location or Known Network Location

Some embodiments may include providing gaming services to mobile device (e.g., cell phone, laptop) users that communicate with a gaming service through one or more known or trusted communication networks (e.g., wifi networks at a casino). For example, a gaming service provider may establish a relationship with one or more venues (e.g., casinos). A gaming service provider may provide or otherwise become associated with a communication network at the one or more venues (e.g., by establishing a wifi network that users at the venue may access and/or recording/accessing information about a wifi network established by the venue).

In some embodiments, devices may access a gaming service through the communication network. The gaming services may be off of the network and may be accessed through some router or other network interface that connects the network to the gaming service (e.g., through a public network such as the Internet). The network interface may have a known IP address by a gaming service provider (e.g., a static IP address that is provided by and/or registered with the gaming service provider to be a trusted source). Such an IP address may be visible to off network service accessed by devices on the network (e.g., by a component of the gaming provider from packets received from devices accessing the network). A gaming service provider may compare a list of trusted IP addresses to the IP address in packets (e.g., TCP/IP packets) received by the gaming service that identify a source of the transmission (i.e., the network interface of the network) to determine that the device is accessing the gaming service from a location covered by the network (e.g., through a router that connects the wifi network to the Internet).

In some embodiments, a gaming service may be on a network and/or devices on the network may be assigned IP addresses that are visible off of the network. Such assigned IP addresses may be of a known range available for the network to assign to devices on the network (e.g. assigned from an ISP or other IP address authority). Such a range of addresses may be recorded with a gaming service provider (e.g., stored in a known IP address database). Based on a gaming service being accessed from a device with an IP address in the trusted range, a component of the gaming service provider may determine that the location of the device is in a location covered by the network (e.g., by referencing a list of stored known IP address locations).

Various methods of assigning IP addresses and determining IP addresses are known in the art. For example, DHCP is a known protocol for assigning IP addresses to devices on a network. Static and Dynamic IP addresses are known in the art. For example, a network interface of a known network may be assigned a static IP address. A network interface may dynamically assign IP addresses to devices on a network in an assigned range. TCP/IP packets are a known format that may be used and may include an indication of a source IP address.

A gaming service may determine whether a device attempting to access a gaming service is assigned or otherwise associated with a trusted IP address associated with a known location and/or trusted network. If such a device is associated with such a known IP address, the gaming service may allow gaming to take place. Such allowance may include allowance without other location verification for as long as such access is occurring in association with the known IP address. Such location determination based on known IP addresses may be considered a first level of a multi-level location determination. In some embodiments, a gaming service may be accessed from a known network through a public network.

In some embodiments, a gaming service may be accessed through a trusted network directly, rather than from the network through a public network. For example, a gaming service may be coupled to the known network directly so that it may be accessed without access through a public network (e.g., the Internet). In some embodiments, the gaming service may also be accessed through the public network (e.g., from other unknown networks and/or locations). Some embodiments may include determining that the gaming service is being accessed through the known network rather than a public network (e.g., based on an IP address of a device being of a device in a range known to be on the network, based on an interface that is receiving a request to game being attached to the network rather than a public network). If a gaming service is being accessed through a known network by a device associated with the network, the gaming service may allow gaming to take palace. Such allowance may include allowance without other location verification for as long as such access is occurring from the known network. Such location determination based on access from a known network may be considered a first level of a multi-level location determination.

High Confidence IP-Based Location

As discussed herein, some embodiments may include determining a location of a device accessing a gaming service from a public network and associated with an IP address that is not familiar to and/or trusted by the gaming service based on an IP address of the device that may be available, for example, from a data packet received by the gaming service. For example, if an IP address of a device attempting to access a gaming service is not in a trusted range or from a trusted source (e.g., if the device is not accessing the gaming service from a wifi network that has been registered as a trusted network), a determination of a location of the device may be attempted and/or made based on the IP address of the device.

For example, a third party service that associates IP addresses with locations may be queried for a location with the IP address of the device. A location where gaming services are allowed may be received from such a service with a confidence level of the device being in the location. Some embodiments may include performing such a determination by the gaming service in addition to and/or as an alternative to some third party. Accordingly, some embodiments may first determine if a network through which a device is accessing a gaming service is trusted and if not may determine an IP-based location of the device before allowing the device to access gaming services.

A gaming service may perform different actions depending on the confidence of such a determination. For example, if such confidence is considered high that a device is in an approved location, then access to the gaming service may be allowed. Such allowance may include allowance without other location verification for as long as such access is occurring in association with the IP address. Such location determination based on an unknown IP address through a public network having a high confidence may be considered a second level of a multi-level location determination.

A threshold confidence that may allow for the second level to be used may include any desired level. An example level may include 90%, 75%, 100%, 50% and so on. Such a threshold may be set based on jurisdictional requirements, gaming service provider preference, user preference, casino preference, and so on. While discrete percentages are given as examples, other embodiments may include qualitative labels (e.g., a third party may return a label of high or low confidence rather than a percent confidence).

It should be recognized that although various examples of IP based and/or other location determination methodology are described in terms of wireless networks, wifi, and/or mobile devices, that any type of devices and/or networks may be used (e.g., laptops, wired networks, etc.). For example, an IP location determination may be used to determine a location of a desktop computer accessing a gaming service. Wired connections may be more likely to and/or may always result in a high confidence because it may be easier to track and/or report locations for wired connections.

In some embodiments, a device with an IP address known to be a mobile network IP address may be treated as low confidence regardless of a third party's or other IP location assessment of the confidence of a location of the device. Some embodiments may consider a mobile network IP address to be a low confidence address because it is assigned through a mobile network provider (e.g., a cell company). Because devices attached to mobile networks are more able to move than devices attached to wired networks, some embodiments may treat that ability to move as an indications of low confidence in the location of the device. Some embodiments may not include pother confidence indicators but may base confidence on the network type. Other embodiments may not use network type at all. Network type may be determined by an IP address, a third party service (such as a third party location determination service), by self report from a device, and/or in any manner.

Low Confidence IP-Based Location

As discussed herein, some embodiments may include determining a location of a device accessing a gaming service from a public network and associated with an untrusted network based on an IP address of the device. For example, if an IP address of a device attempting to access a gaming service is not part of a trusted network and the gaming service, a determination of a location of the device may be attempted and/or made based on the IP address of the device.

For example, a third party service that associates IP addresses with locations may be queried for a location with the IP address of the device. A location where gaming services are allowed may be received from such a service with a confidence level of the device being in the location. Some embodiments may include performing such a determination by the gaming service in addition to and/or as an alternative to some third party.

A gaming service may perform different actions depending on the confidence of such a determination. For example, if such confidence is considered low, then access to the gaming service may be contingent on a second location determination. Various examples of a secondary location determination are given herein. For example, a geofencing service may be used, a gps query may be used, and/or any desired location determination technique may be used as a secondary location determination method.

A threshold confidence that may allow for the second level to be used may include any desired level. An example level may include 90%, 75%, 100%, 50% and so on. Such a threshold may be set based on jurisdictional requirements, gaming service provider preference, user preference, casino preference, and so on.

In some embodiments, if a secondary location determination (e.g., querying a geofencing service) results in a location that matches the IP-based location or otherwise verifies that the device is in an approved gaming location, then gaming may be allowed. In some embodiments, a secondary location may be trusted if that location disagrees with the IP based location so that gaming services may be allowed as long as the secondary location shows that the device is in a location where gaming services are allowed. In some embodiments, if a secondary location service results in a location where gaming is not allowed, then gaming services may be prohibited regardless of what a prior IP based location determination may have shown. In some embodiments, if there is disagreement between the IP based location and the secondary location, gaming services may be prohibited.

In some embodiments, a secondary method of location determination may include a location that uses a telephone network to determine a location of a cellular telephone or other device having a telephone number (e.g., wireless broadband card) in at least some instances. Such a service may accept as input a telephone number and return a location (e.g., in response to a query from a gaming provider identifying the phone number). Some embodiments may include determining if the telephone number is available and if it is, using an appropriate location service that accepts the telephone number as input to determine a location of the device.

In some embodiments, a telephone number may be accessible by a gaming software that is executed by a mobile device to access a gaming service. For example, a gaming application running on a cellular telephone that accesses the gaming service to allow a user to play games may be able to determine the phone number of the cellular telephone on which it is running (e.g., by querying an operating system through an API). An Android-based phone, for example, may allow such functionality. One or more actions may be performed when such functionality is available to facilitate a secondary location determination method.

In some embodiments, a telephone number may not be accessible by a gaming software that is executed by a mobile device to access a gaming service. For example, a gaming application running on a cellular telephone that accesses the gaming service to allow a user to play games may not be able to determine the phone number of the cellular telephone on which it is running (e.g., may not be able to query the operating system through an API). An iOS based phone, for example, may not allow such functionality. Accordingly, one or more actions may be performed when such functionality is not available to facilitate a secondary location determination method.

For example, in some embodiments, a user may be asked to enter a telephone number and such entered telephone number may be used as a telephone number for the telephone. The telephone number may be entered upon registration and/or during access of the gaming service. In some embodiments, the user may be trusted to enter a correct telephone number. In some embodiments, some verification method may be used (e.g., call the phone randomly or sometimes or in response to a log in attempt, SMS to the phone with a code that must be entered, checking with a recorded set of information identifying the user's phone number, and so on). Any verification method may be used to so that the gaming service is confident that the entered telephone number is in fact the telephone number. Such an action may be taken in response to the gaming service determining that the device does not provide direct access to a telephone number of the device through an API.

As another example, in some embodiments, a telephone number may be determined based on information entered by the user at a sign up process. For example, when signing up to use the service, the user may be required to provide a phone number of the device. In some embodiments some verification of the phone number may be used. In some embodiments, as described herein, a particular device may be associated with a service before it is allowed to be used. During that process the device may be associated with a telephone number (e.g., the devices number may be given to a gaming service to sign the device up for the service and stored in a number database). A service may determine the device based on a MAC address and/or other authentication information (e.g., pin, password, security pattern, etc.) entered into the device. Such information may be used to determine the telephone number that was associated with that device at a signup processes. The number that was associated during the sign up process may then be used to determine a location.

Some embodiments may use a tertiary location verification method. Such a method may be used if the confidence of a location is low, if the telephone number is not available through an API, and/or in response to any possible doubt of a location. For example, a tertiary location verification method may include asking a device where it is located. For example, a gaming application running on a telephone may access a GPS location of the telephone and report that location to the gaming service provider as a tertiary location determination method. In some embodiments, if the location of the entered or otherwise determined telephone number and the phone-reported location match, the secondary location may be verified. In some embodiments, if the locations do not match, the secondary location may not be trusted. It may be assumed, for example, that a telephone number has been faked or entered incorrectly. Such tertiary verification may be useful, for example, when an iOS device is used because the telephone number of the iOS device may not always be verifiable so the tertiary GPS location may be used as a verification method. If the locations do not match, access to a gaming service may be denied.

In some embodiments, a client application may determine a least costly method of tertiary location determination and use that to verify location information if needed. For example, a device may support many different location determination methodologies from cell tower triangulation to GPS and may use the one that costs the least amount of system resources.

In some embodiments, a secondary method of location determination rather than a tertiary method of location determination may include a method that does not use a telephone number. For example, such a method may include a asking a device to determine a location of itself (e.g., through gps or other methods) and report that information. It should be recognized that any method of secondary location determination may be used that does or does not rely upon telephone numbers, self-reported and/or phone-reported information, and so on.

In some embodiments, an IP address change in a client device may result in a client losing connectivity to a gaming provider. In order to regain connectivity, the client may be required to verify location through some method such as those described herein. In some embodiments, this loss of connectivity may occur because a change is detected by a gaming provider. In some embodiments, such a change may occur because of a VPN connection established between a client and gaming provider a gateway that is established in response to a logon being severed because the client IP address changes. In embodiments that establish such a VPN, all data may be routed through the VPN that comes and goes to the client device while the client device is connected to perform gaming services (e.g., by adjusting routing table entries at the client device to route all traffic through the VPN to a gateway of the gaming provider). A gateway may thereby block unwanted data such as proxy connections, remote desktop connections, connections that may be attempting to circumvent security, play remotely, or perform other unwanted actions. In some embodiments, a VPN may only allow gaming related actions that are addressed to and/or from the gaming provider to reach the client while the client is engaged in gaming actions with the gaming provider. In some embodiments, to continue using a gaming service, a device location may be required to be verified (e.g., using one or more levels of a multi-level location verification protocol).

Non-Gaming Locations and Failed or Unsupported Checks

In some embodiments, if an IP location determination results in a location where gaming is not allowed, then various actions may be taken as desired. Such actions may depend on a confidence level of the location.

For example, in some embodiments, in all instances, a backup location determination method may be used (e.g., geofencing) and may be trusted over the IP-based location determination. Such a backup location determination may therefore override an IP location based determination in some embodiment in which it is used.

As another example, in some embodiments, if a confidence level that a location is in a non-gaming area is above a threshold, then gaming may be prohibited. Such prohibition may be made without consulting a backup location determination method. For example, such a threshold may include a 100%, 90%, 75%, 50%, etc., threshold.

As yet another example, in some embodiments, if a confidence level that a location is in a non-gaming area is below a threshold, then a secondary location determination method may be used. Such secondary location determination method may be trusted over the IP-based location determination method.

In some embodiments, an error may occur in location determination and/or a location determination method may not be supported by a device (e.g., a device may not include GPS). If a location determination policy requires a location to be determined but such a situation occurs, the device may be considered to have failed a location determination, access to a gaming service may be denied until a location is determined, some number of additional attempts at location determination may be made, some prior location may be assumed to be the location, some reported location from a different level of location determination may be used, and/or any desired action may be taken. A gaming service may take one or more such actions as desired.

Various examples of location determinations and reactions to such location determinations have been given. It should be recognized that such location determinations are given as examples only and that various embodiments may include any desired methodology of location determination, any desired levels, any desired threshold, and combination of elements, no elements, more elements, and so on as may or may not be described herein. It should be recognized that although some examples may have been described in terms of allowing gaming services or not allowing gaming services, similar and/or different examples may apply to determine which gaming services and/or other services to be allowed and/or offered (e.g., how to brand an interface, which games to allow, which log ins to present, etc.) based on a location determination (e.g., a multi level location determination method may result in a location determination that is used to determine to allow games and which games in which branding).

Various examples of location determination made when a user attempts to access a gaming service are given. It should be recognized that such location determination may occur as desired and/or in response to any trigger. For example, such location determination may be made when an application is running (e.g., started, periodically, randomly, based on distance to border, based on location, based on speed of movement, based on direction of movement, based on a change in a device IP address and/or network through which the device is accessing the gaming service), in response to a trigger (e.g., an attempted login, a wager request, periodically, randomly, based on location). In some embodiments, a component of a gaming service, such as a gateway or server, may detect an event or determine that a location determination is desired and facilitate such a location determination in response to such a determination.

Signal Strength Examples

Some embodiments may include preforming an action based on a signal strength of a known network. For example, in a multi-level location determination method, if a signal strength of a known network decreases below some threshold, some action may be taken (e.g., by a mobile device, by a gaming service, by a gaming service and device). A lower signal strength may, for example, be indicative that a border of an area covered by the known network is being reached.

In some embodiments, an application may report a signal strength to a gaming operator (e.g., periodically, in response to a signal strength changing, in response to a signal strength reaching a threshold, etc.). In some embodiments, a location determination method (e.g., one relied upon by a gaming operator) may change based on a signal strength reported being lower than some threshold (e.g., 50% of maximum). For example, a secondary method of location determination may be used in such instances until and/or unless the signal strength returns to a higher level. Accordingly, around an edge of an area covered by a known network, a secondary location method (e.g., geofencing, GPS, soft tag, etc.) may be used to verify that the device is still in the area that is supposed to be covered by the network and/or to allow for a smooth transition when an IP address changes. In some embodiments, a rate of use of a secondary location determination method may increase as a signal strength decreases so that as a user gets closer to an edge of a known network, the rate of polling increases.

Some embodiments may include using a secondary location determination method in some or all levels of a multi level location determination methodology. Such a secondary method may act as a verifier of another method. A frequency of use of such a verifier may depend on which level of determination is being used (e.g., more frequent for less confident levels), a level of confidence, a signal strength, a distance to a jurisdictional border, and so on.

In some embodiments, around a border of a jurisdiction, such as a state, and/or when crossing a border of a jurisdiction, such as a state, mobile devices, such as cell phones may be assigned new IP addresses. For example, in some embodiments, a 3G network may operate across state lines and a 4G network may be state specific. Accordingly, as a mobile device is brought across state lines the device may disconnect from one 4G network, connect to the 3G network, and then connect to the other 4G network. In other examples, a 3G network may differ per state, and/or there may be no 3G network that crosses state lines. Accordingly, a gaming service provider may rely upon an IP address to determine locations for a cellular telephone in some instances without reference to secondary location determination methods if such a cell phone is using a state specific mobile network that is known to the gaming operator to be state specific. Accordingly, although some embodiments as discussed above may treat mobile networks more harshly, if such a mobile network is a state specific mobile network that is known to the gaming operator, such harsh treatment may not be triggered.

In other methods, such secondary location determination methods may be used to verify other location determination methodology as discussed elsewhere.

In some embodiments, a gaming application may monitor a GPS and force an IP address change when a determination is made that a mobile device crosses a state line. In some embodiments, a GPS may be reported to a gaming operator and a gaming operator may require a new VPN tunnel to be formed if a GPS crosses a state line. In some embodiments, a GPS of a phone may be monitored by a gaming application and may be reported to a gaming service provider as a device nears a jurisdictional or other important boundary that may trigger some location determination action such as a different level or source of location determination to be used. In some embodiment, a rate of GPS reporting may increase as distance to a border decreases.

Further Alternative Location Determination Methods

It should be recognized that any methodology of alternative location determination may be used in various embodiments and that the examples of GPS, geofencing, soft tagging, IP location, and so on are non-limiting examples only. For example, rather than IP location being a top level of a multi-level location determination method, GPS may be such a top level. Any arrangement and combination of location determination may be used as desired.

As an example, some embodiments may include a location determination methodology that operates based on available networks (e.g., wifi networks that are detectable from a particular location). Such embodiments may include detecting and/or storing wifi networks and/or strengths at various locations (e.g., a plurality of users may transmit such information and GPS information for storage). Such information may be used as a map of an area defined by strengths of wifi networks at each spot in the area. At a later time, when a location is desired to be determined for a user, the available wifi network and/or strength of those networks may be compared to the stored information to determine a likely location. For example, an application may transmit a list of available wifi networks and signal strengths of those networks to a central server and/or third party that may determine the likely location of the device based on a mapping of location to wifi networks and/or signal strengths.

Example Methods and Apparatus

Figure 9:
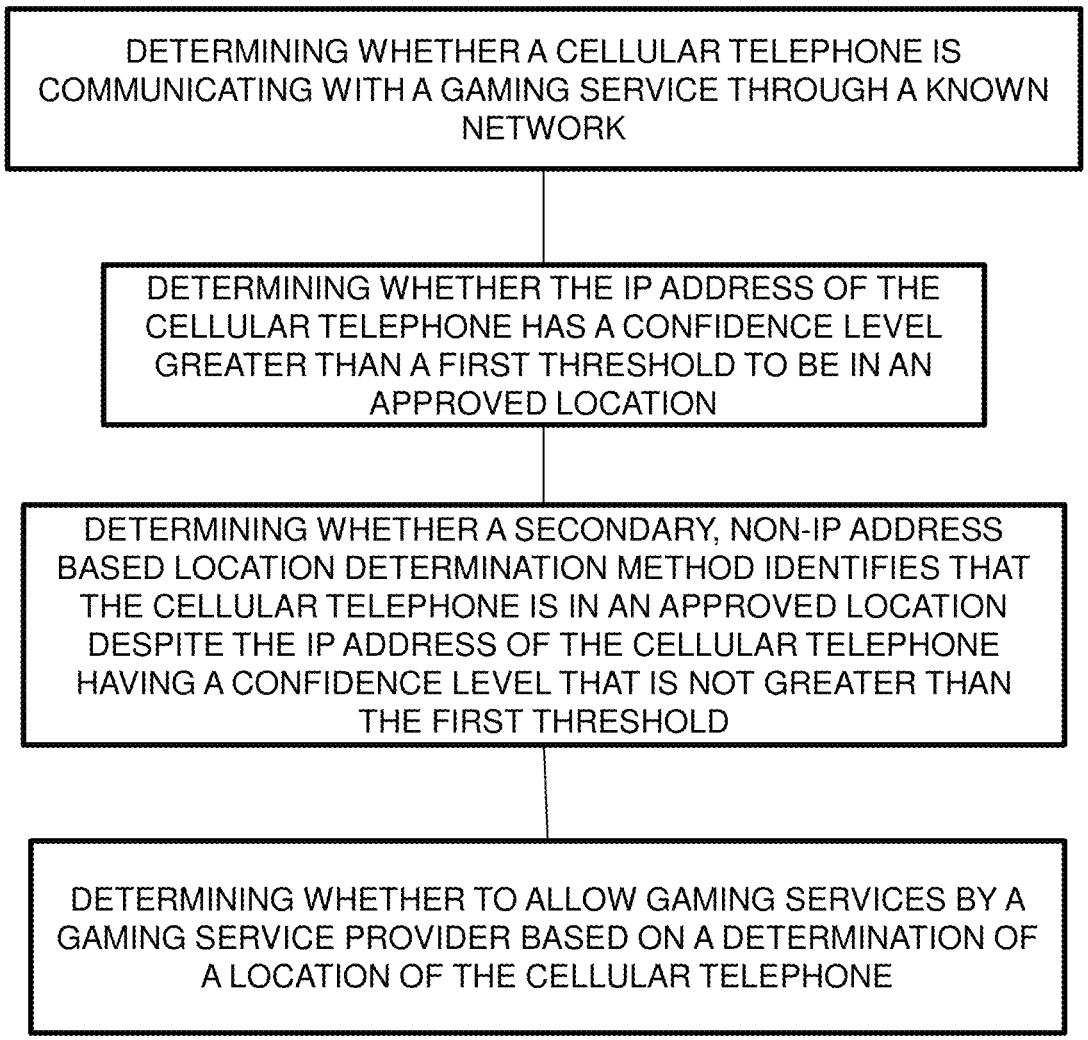
FIG. 9 shows an example method that may be performed in some embodiments.

FIG. 9 illustrates an example method that may be performed in some embodiments. Such a method may be performed, for example, by a component of a gaming service (e.g., a gateway, a service, etc.). Such a location determination may include a location determination for a particular stage of use. For example, such location determination may refer to a sign in stage of use. If the location determination succeeds and no further location determination is needed, some embodiments may still make further location determination checks in other use stages (e.g., in response to actions, after time has passed, etc.).

As illustrated, some embodiments may include determining whether a cellular telephone (or other device such as a laptop, desktop, augmented reality device, etc.) is communicating with a gaming service through a trusted or otherwise known network. A method may include allowing gaming services if the cellular telephone is determined to be communicating through the trusted or otherwise known network. Further location based determinations for a particular method may not be needed if such a first level of determination is successful in some embodiments. Further location determinations and/or backup determinations may be used in some embodiments even if such a primary level succeeds.

As illustrated, some embodiments may include determining whether the IP address of the cellular telephone has a confidence level greater than a first threshold of being in an approved location. A method may include allowing gaming services if the IP address is determined to have a confidence level above the first threshold of being in the approved location. Further location based determinations for a particular method may not be needed if such a second level of determination is successful in some embodiments. Further location determinations and/or backup determinations may be used in some embodiments even if such a secondary level succeeds.

As illustrated, some embodiments may include determining whether a secondary, non-IP address based location determination method identifies that the cellular telephone is in an approved location despite the IP address of the cellular telephone having a confidence level that is not greater than the first threshold. A method may include allowing gaming service if the non-IP address based location identifies that the cellular telephone is in the approved location.

As illustrated, some embodiments may include determining whether to allow gaming services by a gaming service provider based on a determination of a location of the cellular telephone. For example, if a level of location determination results in the cellular telephone being in an approved location, gaming may be allowed. Otherwise, gaming may be prevented. Such a method and/or determination may be made periodically, in response to a trigger, and so on and desired.

It should be recognized that FIG. 9 is given as a non-limiting example only. Various embodiments may include performing one or more methods to facilitate any desired functionality. For example, methods may include actions that allow users to perform actions as described with respect to any combination of embodiments described herein. Different ordering of actions may be used in different methods. For example, in methods that prefer IP location determination to network location determination, ordering of first and second blocks may be reversed.

Figure 10:
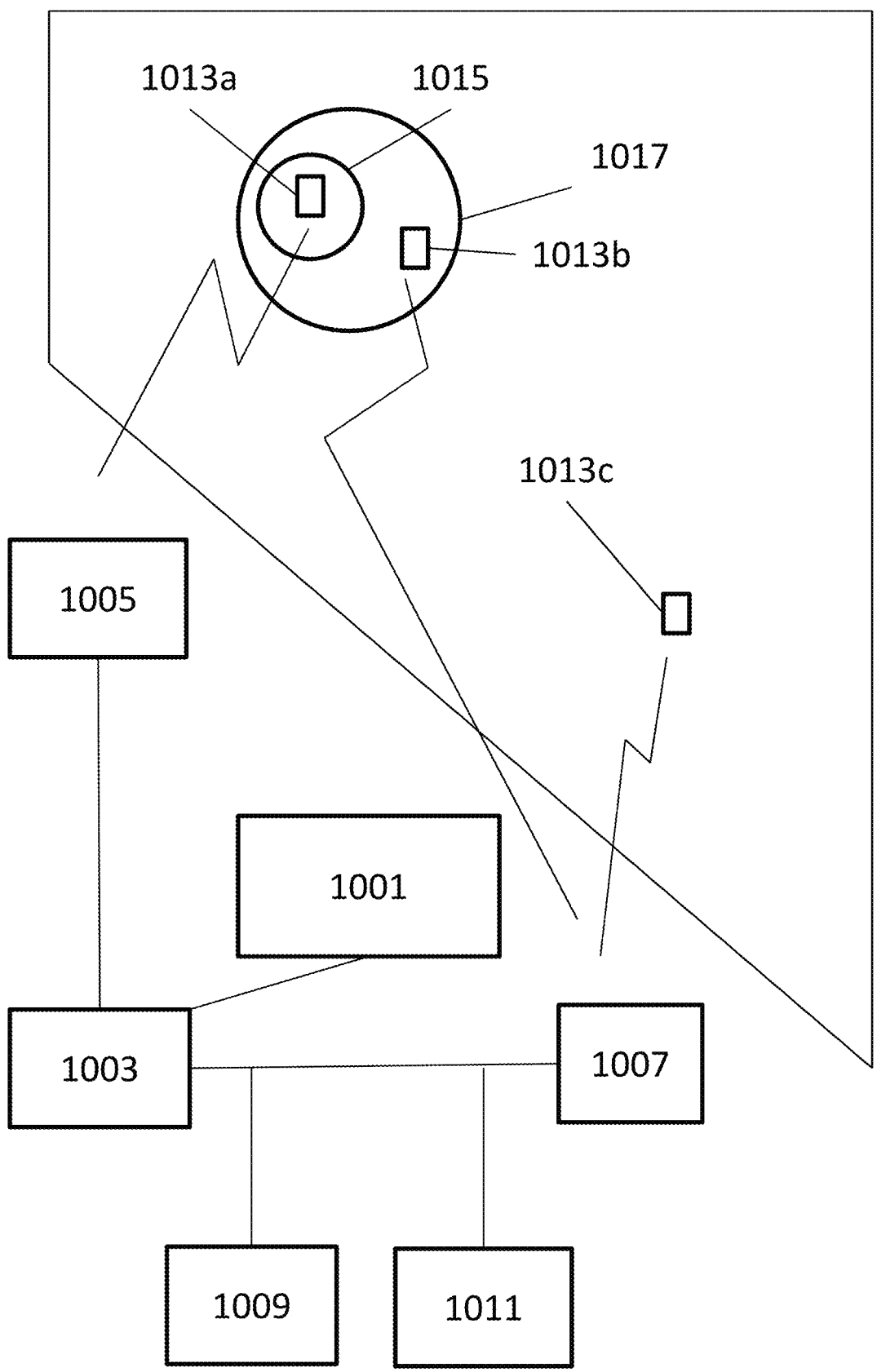
FIG. 10 shows an example according to some embodiments.

FIG. 10 illustrates an example of some embodiments. As illustrated in FIG. 10, some embodiments may include a component of a gaming service provider 1001 (e.g., a gaming server, an accounting server, etc.), a interface component 1003 (e.g., a gateway of a gaming service provider, one or more network interfaces of a gaming service provider, etc.), an authorized/trusted network 1005 (e.g., a network run by or registered with a gaming service provider in a known and/or controlled location, a wifi network, a wired network, etc.), a communication service provider 1007 (e.g., a cell phone provider, Sprint, etc.), one or more IP based location determination services 1009 (e.g., a system that allows a IP address to be correlated to a location in some manner that may be a third party or party of a gaming service provider) one or more geofencing or other location determination services 1011 (e.g., a service that maintains geofences and allows querying related to them by a gaming service provider that may be part of or separate from a gaming service provider), a set of devices 1013a, b, c (e.g., cellular telephones, mobile devices, stationary devices, laptops, desktops, kiosks, etc.), one or more areas 1015a, b that may be covered by an authorized network 1005 (e.g., an area in a casino, an area that a wifi network covers, a building in which jacks to access a wired network are located, etc.), and one or more geofences 1017 (e.g., geofences related to a geofence provider 1011). It should be recognized that the example of FIG. 10 is given as a non-limiting example only and that other embodiments may include any combination of elements that may work together in any manner. For example, in some embodiments, a gaming operator may provide IP based location determination locally, may perform geofencing calculations locally from location data received from a user device and/or network provider, and so on.

In some embodiments, gaming service provider 1001 may include any number of components arranged in any manner to provide gaming services (e.g., gambling, lottery, fantasy competitions) to one or more users. For example, a gaming service provider may include one or more computing devices (e.g., servers, blades, etc.) configured to perform one or more methods. A gaming service provider may perform a method such as that shown in FIG. 9 and/or provide any desired functionality such as functionality described herein in combination with any elements and/or alone.

In some embodiments, interface component 1003 may include any number of components arranged to allow a gaming service provider to interface with one or more networks and/or mobile devices. For example, such an interface component may include a gateway, a network interface card, and so on arranged to connect to one or more networks. In some embodiments, a separate such interface component may be included for each network (e.g., a proprietary network may include one, and a public network may include another one). An interface component may be part of a gaming service provider 1001 and/or a separate element. An interface component may perform a method such as that shown in FIG. 9 and/or provide any desired functionality such as functionality described herein in combination with any elements and/or alone.

In some embodiments, authorized network 1005 may include a wireless and/or wired network. Such a network may include a network authorized by a gaming service provider, run by a gaming service provider, connected to a particular network interface of a gaming service provider, and/or in any manner authorized to access a gaming service provider. Authorized network 1005 may include one or more network access points, routers, and so on that may allow a connection to a public network and/or private network that may include resources such as a connection to gaming service provider. For example, such a network may include a network or sub-net operated by a trusted internet service provider that assigns the network or sub-net to a particular area. As another example, such a network may include a network operated by a trusted establishment in a fixed location.

In some embodiments, communication service provider 1007 may include a service that provides communication services to one or more devices. For example, such a service provider may include a cellular telephone company such as Sprint. Such a service provider may allow a device using the service to access a gaming service provider and/or a public network such as the Internet.

In some embodiments, IP based location determination service 1009 may include one or more components that may facilitate location determination based on an IP address. Such a service may be part of a gaming service provider and/or a third party service provider. Such a service may respond to requests with location information, confidence of the location based on an IP address, and/or a network type of a device using the IP address. Such a service may include any number of computing devices and/or other elements.

In some embodiments, other location determination service 1011 may include one or more components that may facilitate location determination based on any desired method (e.g., geofencing, soft tagging, GPS querying, and so on). Such a service may be part of a gaming service provider and/or a third party service provider. Such a service may respond to requests with location information and/or confidence of the location based an identification of a device such as a telephone number. Such a service may include any number of computing devices and/or other elements.

In some embodiments, devices 1013 a, b, c may include any desired mobile and/or stationary devices in any combination. For example, devices may include cellular telephones, laptops, and so on. Such devices may be configured to communicate through one or more networks and/or services providers (e.g., 1007 and/or 1005). Such devices may be configured to execute one or more applications that may facilitate gaming services, methods and/or functionality described herein.

In some embodiments, area 1015 may include an area of a casino, a floor of a building, a merchant, a building that has jacks for wired connections, and so on. An area covered may be configured to only include a specific region of a casino, only cover the interior of a casino, only cover casino grounds, and so on. For examples, access points may be arranged and/or configured so that an entire first floor of a casino is covered, but other areas are not. It should be recognized that any area may be covered that is continuous and/or non continuous in any manner with any devices.

In some embodiments, geofence 1017 may include an area around which a geofence has been established. Various examples of geofences are given herein.

In some embodiments, as illustrated in FIG. 10, devices 1013a, b, c may operate in the state of Nevada. This is given as an illustrative example only.

In some embodiments, device 1013a may access a network 1005 while in area 1015 covered by the network 1005. Gateway 1003 and/or gaming service provider 1001 may determine that the device 1013a should have access to the gaming services based on the device accessing the gaming services through the network.

In some embodiments, device 1013b may access communication service 1007. Device 1013b may attempt to access gaming services through the communication service 1007. Gateway 1003 and/or gaming service provider 1001 may determine that the device is not accessing through a known network 1005. Gateway 1003 and/or gaming service provider 1001 may determine with reference to IP based location determination service 1009 that a confidence level that the IP address of device 1013b being in an approved location (e.g., the state of Nevada) is below some threshold level. In response to such a determination, gateway 1003 and/or gaming service provider 1001 may determine with reference to other location determination service 1011 that the device 1013b is in an approved location. For example, determination may be made that the device is in a geofence monitored by a geofencing service. In response to such a determination, gateway 1003 and/or gaming service provider 1001 may determine that the device 1013b should have access to the gaming services.

In some embodiments, device 1013c may access communication service 1007. Device 1013c may attempt to access gaming services through the communication service 1007. Gateway 1003 and/or gaming service provider 1001 may determine that the device is not accessing through a known network 1005.

In one example, Gateway 1003 and/or gaming service provider 1001 may determine with reference to IP based location determination service 1009 that a confidence level that the IP address of device 1013c being in an approved location (e.g., the state of Nevada) is above some threshold level. In response to such a determination, gateway 1003 and/or gaming service provider 1001 may determine that the device 1013c should have access to the gaming services.

In another example, Gateway 1003 and/or gaming service provider 1001 may determine with reference to IP based location determination service 1009 that a confidence level that the IP address of device 1013c being in an approved location (e.g., the state of Nevada) is below some threshold level. In response to such a determination, gateway 1003 and/or gaming service provider 1001 may determine with reference to other location determination service 1011 that the device 1013*b* is not in a geofence, does not have capabilities to use the other location service, and/or is otherwise in a location that cannot be verified. In response to such a determination, gateway 1003 and/or gaming service provider 1001 may determine that the device 1013*b* should not have access to the gaming services. In other embodiments, a tertiary level of location determination may be used (e.g., a GPS query), and based on such determination, a device may be allowed or denied access. In some embodiments, as described elsewhere, some embodiments may additionally and/or alternatively use a network type (e.g., mobile network may need a backup check) as an input to a location determination methodology.

In some embodiments, gaming services may include single player games, multiplayer games, tournaments, and so on. For example, in some embodiments users of devices 1013*a*, and 1013*b* may enter into a tournament against one another. Collusion detection may be used based on location information is some such examples.

It should be recognized that FIG. 10 is given as a non-limiting example only to illustrate some example functionality that may be included in some embodiments. Other embodiments may include different components that may interact in any manner to provide any desired functionality such as functionality described with respect to various embodiments herein in any combination.

Sign Up Examples

Some embodiments may include a sign up and/or registration process. Such a process, for example, may establish an account with a particular casino, an account with a gaming service provider, a verification of user information, a registration of a device, and/or any other information. Such a process may include a user providing information to a gaming provider and/or agent of a gaming provider (e.g., in person, through a computer interface, etc.). Such registration may be required before a user and/or device is allowed to access a gaming service and/or an account with a particular casino. Such a process may include establishing a link between a device and a player (e.g., an entry in a database that identifies that a particular player is associated with a particular device). Such a process may include establishing a gaming account for a player (e.g., establishing an account into which a player may place money and/or from which a player may play games). Such a process may allow a customer to sign up for a gaming service. After such a process is performed, a player and/or a device may be authorized to play games (e.g., over a communication network, using a signed up device, when in an authorized location, with a particular gaming operator that performs at least a part of the process, and so on).

Some embodiments may include a customer signing up for a mobile gaming service with a gaming operator. Such a signup process may be performed, at least in part, at a casino (e.g., by a casino employee, at a kiosk, in person, etc.), through a website (e.g., accessed by the mobile device, accessed by another device), in person (e.g., at a kiosk, at a casino), remotely (e.g., through a website, at a kiosk in a store).

In some embodiments, as explained in U.S. patent application Ser. No. 13/288,223 which has already been incorporated by reference, a gaming service provider may provide services for multiple venues and separate accounts may be established for gaming related to each venue. Similarly, separate accounts may be established for different activities that are allowed from each account (e.g., casino gaming account and sports gaming account). Accordingly, a single user may have multiple accounts through a single gaming service provider. In some embodiments, a sign up process may include establishing one or more accounts with one or more restrictions, affiliations, and or other characteristics for a user. In other embodiments, a single account may function as an account across multiple venues and/or gaming types.

In some embodiments, signing up for a mobile gaming service may include opening a gaming account, and/or associating an account with an ability to play games. For example, a new account may be established from which a user may place money into and from which a user may access money to play games. In some embodiments, such an account may include a bank account, a credit account, and/or any account that may be created or have already existed that may be associated with a gaming service.

In some embodiments, a sign up process may include a user providing information to a gaming service provider (e.g., through an interface of a computing device such as a kiosk or a mobile device, through an agent of the gaming service provider). For example, a user may approach an agent of a gaming service provider at a casino and provide a filled out form or fill out a digital form through a tablet device. The agent may save such information or enter such information into a computing device of the gaming service provider. Information provided may include name, SSN or tax ID, address, age, phone number, gender, race, income, and/or any desired information. Some information may be required (e.g., age) and/or allow additional functionality (e.g., SSN or tax ID for tax reporting, gender for targeted advertising). Such information may be received by a component of a gaming service (e.g., from the computing system, tablet, etc. through which it may be entered).

As another example, in some embodiments, a kiosk or other computing device may allow a user to enter such information. As yet another example, a mobile device itself may be used to enter such information. For example, a user may download and install an application onto a mobile device and then run the application. The application may connect to the gaming service provider and a user may be prompted to enter the information.

In some embodiments, a verification of one or more pieces of information may be requested and/or required. For example, an agent may scan or photocopy an identification (e.g., driver's license, passport) of a user to verify age, name and/or other required information. As another example, a user may be required to take a picture of an identification and transmit that information to the gaming service provider for verification. A gaming service provider may receive and/or store such information. Such information may allow a gaming service provider to prevent underage or otherwise illegal or fraudulent use. In some embodiments, a signup process may not be completed until verification of the identification is completed. Verification may include a third party inspection of a representation of an identification (e.g., by a human offsite, by a computing device, etc.). Such verification may be determined by a gaming operator and in response a signup may be allowed and/or completed.

In some embodiments, at least a part of a sign up process may be required to be completed in person at a location of a gaming operator and/or agent of a gaming operator. For example, in some embodiments, an entire sign up process may be required to be performed in person. As another example, a sign up of a person to verify eligibility to play a game (e.g., verify age) may be required to be performed in person. In some embodiments, an application to use a mobile gaming service may be required to be made in person and a customer may be required to provide a valid proof of identification, proof of residence, social security number, and/or any other desired proof of information to sign up for a service. In some embodiments, a customer may be denied an application to sign up for a mobile gaming service if they are under 21 years of age, do not meet a residency requirement, do not provide proper proof of identification, do not meet a sobriety requirement, and/or do not meet any other desired requirement.

In some embodiments, a sign up process may include establishing an ability for a user to access an account in the future. For example, a user name and password may be established. In some embodiments, a user name and mac address or phone number of a particular device may be used. In some embodiments, mac address or phone number of a device and password may be used. In some embodiments, a database may be established that includes entries for user information, device information, and/or any combination of user and/or device information that may be used to determine future access to a gaming service.

In some embodiments, a sign up may include a creation of a login. For example, a user may choose and/or be assigned a username and/or password/pin. Such information may be specific to a user and/or to a casino or other gaming venue and user combination. For example, a single user may have a single username and password combination to access all accounts that the user has with a gaming service provider. In such an example, a user may use username and password1 to access both a Venetian and an M Resort account through a gaming service provider. As another example, a single user may have separate usernames and/or passwords that may be used to access accounts with each casino and/or venue that the user has been associated with through the gaming service provider. For example, username1 and password1 may be usable by a user to access Venetian accounts through a gaming service provider and username2 and password2 may be usable by the user to access M Resort accounts through the gaming service provider.

When attempting to access a gaming service using a mobile device, the user may be prompted for login information (e.g., by a gaming service provider through a mobile device interface). Such prompt may include a selection of a casino, venue, and\or account. Such a prompt may be made before a user may enter login information (e.g., if login information is casino specific), and/or after a user may enter login information (e.g., if login information is not casino specific). Such account and\or login information entered and/or selected may be transmitted from a user device to a gaming service for verification before a user is able to use a gaming service with the device. Users may be requested to and/or required to enter such information during use of a device to verify that the user is the one still using the device. For example, a user may be periodically prompted for login information, prompted in response to a trigger (e.g., an attempted game play, a time passing, money being lost, money being won, a threshold amount of money change in a time period, a movement of a device, a lack of movement of a device, a change from a typical style of play such as an abnormally large wager or different type of game being played than normal for the user, etc.).

In some embodiments, a sign up may include a registration of a device. A device may be registered with a gaming service provider to allow access of gaming services by a user. The device may be registered for multiple users and/or limited to a single user. Registration may include identifying the device with the user such as by recording a MAC address, phone number and/or other identifying information of the device that may be used to determine that the device has been registered in the future. In some embodiments, a gaming service may limit access to gaming services to registered devices thereby adding an additional layer of identification verification in the form of a possessed item to a gaming service. For example, some embodiments may include recording a MAC address of a cellphone and associating it with a user. When the user logins in, a check may be made to determine that the user is accessing the gaming service from a registered device by comparing stored MAC address information with received MAC address information of the device attempting to access the gaming service. The user may be allowed to access the gaming service if such information matches, but may be prevented from accessing the gaming service if the information does not match.

In some embodiments, a registration of a device may include generating a device specific authentication. Such an authentication may include a pin, password, and/or other authentication mechanism. For example, in some embodiments, an agent, a user, a device, etc. May be provided with authentication information from a gaming provider (e.g., shown through a kiosk upon sign up). Such information may be required to be entered into the device being registered to verify that the device is present and identify to the gaming service provider which device is being registered. The gaming service provider may receive the entered information from the device (e.g., through an application running on the device into which the information is entered). In response to receipt, the gaming service provider may associate the device with the user. The user may be prompted to generate a chosen authentication information (e.g., a pin, password, and/or other authentication method such as a swipe pattern) that may be device specific and\or user specific. Accordingly, when the device is authenticated to the service, the service may prompt the user for the device and\or user specific authentication information.

Authentication information may include a password, a pin, a pattern (e.g., a pattern swiped on a touch screen of a device, a sentence, and so on.

A gaming service may request authentication of a device. Such request may include a request when access to a gaming service is requested, periodically, in response to a trigger, and so on. The request for authentication may include analyzing a device ID such as a MAC. Such analysis may occur periodically, continuously, and so on in an attempt to prevent unregistered devices from accessing a gaming service. Authentication may include requesting and/or analyzing other information such as authentication information entered by a used (e.g., password, pin, swipe pattern, etc.).

Accordingly, in some embodiments, a user may have established a username and/or password/pin combination that authenticates a user. A user may have also established some other authentication such as a swipe pattern that authenticates a device. It should be recognized that these examples are non-limiting and that any combination and/or arrangement of authentications may be used as desired. In some embodiments, a user may be asked for authentication. Examples of such authentication requests are given herein. Such requested authentication may include any established authentication whether username and password/pin, swipe pattern, or otherwise and examples are given as non-limiting only.

In some embodiments, a customer may be associated with a device for use with a gaming service. For example, if a customer signs up with a device and the device is verified, the verified device, and the customer may be linked so that the customer may use the device with the gaming service. For example, a database entry identifying such a link may be made (e.g., a user name of the customer and/or mac address/phone number of the device may be identified as linked). In some embodiments, the customer may be prevented from using other devices with the service (e.g., unless the customer signs those devices up and becomes associated therewith as well). In some embodiments other customers may be prevented from using the device with the gaming service (e.g., unless the other customers become associated with the device). A gaming service may check a database of authorized users and/or devices to determine whether to allow a user to play games from a particular device.

In some embodiments, a player may be able to access an account and/or play games through a gaming service using any device that has been activated. For example, a user may sign on to a gaming service using an established username and/or password using any device that has been verified for use with a gaming service by the user and/or any other user. In some embodiments, separate databases of approved devices and approved users may be kept and any combination may be allowed to use a gaming service.

In some embodiments, a gaming service may allow a user to authorize additional devices for use with the gaming service. For example, if a first device has been authorized to use a gaming service the authorization of that device may provide evidence that the user is in possession of that device. An authorization method assigned during the device authorization (e.g., a swipe pattern) may then act as proof of possession of a thing by a user. Accordingly, in some embodiments, rather than requiring another device to be authorized through a same process as a first authorized device, a user may, in some embodiments, use a same authorization method form a first device to authorize a second device. A gaming service may determine that a second device is not authorized for use with a gaming service and may request a device authorization from a user attempting to use the second device to access the gaming service. The user may enter a device authorization method established for a first device. The gaming service may then authorize the second device for use with the service based on the entry of the authorization method from the first device onto the second device. Other information about the second device may be required to fully register the second device (e.g., MAC address, telephone number, a check of a operating system file, etc.). Such information may be transmitted to a gaming service, requested from a user or API, and/or determined and/or verified in any manner.

Some embodiments may include determining one or more characteristics of a mobile device during a sign up process. For example, a phone number of a cell phone may be determined. Such a phone number may be verified by placing a call to the cell phone at a time of registration, determining that a location of a cellphone with the cell phone number is at the location of registration (e.g., querying a location service such as a geofencing service, etc.). Such phone number may be used in the future to determine location, contact a user, and so on. Other characteristics may include that software is properly installed on the phone that an operating system is properly running on the phone, that a phone has proper functionality to use a gaming service, a recording of a checksum of software on the phone, and so on.

Some embodiments may include verifying a mobile device for use with a gaming service. Such verification may include, for example, determining an authenticity of software, determining an operating system version, determining a communication network, and/or any other actions as desired. Such verification may be performed in person by an agent of a gaming operator, remotely by software (e.g., software on the mobile device, software on a kiosk such as a kiosk to which a mobile device may be attached through a USB port and/or other wired and/or wireless communication method).

In some embodiments, a customer may physically provide a mobile device to an agent of a gaming operator for verification. In some embodiments, software on the gaming device may be executed to perform verification. In some embodiments, a third party and/or second machine may perform verification.

An entity performing verification may determine that a device is running an approved operating system. One example of an operating system that may be approved may include Android OS 2.2. Such a determination may be made by reading a memory location, comparing files, comparing an operating system with a listing of approved operating systems, and so on.

An entity performing verification may determine that a device is running on an approved communication network. One example communication network that may be approved may include a Sprint network. Such a determination may be performed by reading a memory location, contacting Sprint to compare a device identifier, comparing a communication network with a listing of approved communication networks, and so on.

An entity performing the verification may determine that an operating system running on the device is an approved operating system for the communication network that the device is running on. For example, such a determination may include a determination that the device has not been rooted. Such a determination may include comparing a running operating system with a listing of approved operating systems for the communication network and device.

An entity performing verification may determine that a device is running and/or storing any desired programs and/or is not running and/or storing any undesired programs. For example, the entity may determine that the device is running an approved antivirus program. As another example, the entity may determine that the device is not running any undesired malware, and/or remote access technologies. Various examples of determining whether a device is remotely controlled are given elsewhere herein. Such a determination may include a search of a memory, a comparison of running and/or stored programs with a listing of approved and/or unapproved programs, and so on.

Some embodiments may include installing and/or enabling one or more services on a mobile device. Such installation and/or enabling may be performed in response to a verification of a device and/or a signing up of a user for a service. Such installing and/or enabling may be performed by an agent of a gaming operator, by a kiosk, by a gaming operator computing device, by a customer, by software running on the mobile device, and so on.

In some embodiments, an Android wrapper application and/or an AIR mobile gaming client may be installed on a mobile device. It should be recognized that such example programs are given as non-limiting examples only and that other embodiments may include any desired programs and/or no programs at all. For example, in some embodiments, rather than an Android wrapper application, a Win32 wrapper application may be installed, an Apple application may be installed, and so on. In some embodiments, a customer may be provided with information on how to reinstall any desired software if a problem arises.

Some embodiments may include verifying proper authentication and/or sign up. Such verification may be performed by any entity desired (e.g., a customer, a program, an agent of a gaming operator, a kiosk). Such verification may include comparing checksums and/or MD5 and/or SHA-2 hashes of files, program names, and so on. Such verification may include a verification by signing into an account and/or gaming service using the mobile device and/or performing any desired actions with the mobile device.

In some embodiments, after such a process (e.g., in response to successfully completing one or more actions of such a process), a customer may be and/or a device may be approved for gaming. A customer, for example, may be able to access a gaming account and/or play games through a gaming service using an approved device (e.g., the device and/or any approved device).

In some embodiments, a sign up component of a gaming service provider may maintain registration and/or account information. For example, a gaming service may maintain balance information for one or more accounts of a user with one or more casinos or other venues. A customer database may maintain such information so that users are properly associated with accounts. Such database information may be formed during and/or in response to a sign up process. In some embodiments, a database entry may be made for each user that associates the user with multiple accounts. A change to user information when accessing one account and/or through one venue may propagate through to other accounts through the database. For example, if a user enters a name change at one venue or account, that name change may apply to all accounts because the database entry for the user may be changed. In some embodiments, if a user attempts to form a new account at a new venue, the new account may be associated with the user through the database. Some steps of a sign up process may be skipped (e.g., age verification) because such step may have already occurred in a prior sign up. Some embodiments may include updated account information for one account based on a change in account information for a second account (e.g., when a user signs up with a different address t a second account, the different address may be reflected in the first account through such a universal database).

Some embodiments may include a minimum initial balance and/or deposit into a wagering account to sign up for a gaming service. In some embodiments, for example, a customer may be required to provide a minimum of $100.00 in cash to be placed in a new account established with the gaming operator in order to sing up for a mobile gaming service. It should be recognized that $100.00 is given as a non-limiting example and that other embodiments may include any minimum as desired (e.g., 1 cent, 10 dollars, 1 million dollars). It should be recognized that cash is given as a non-limiting example and that other embodiments may allow transactions to and/or from an account in a form of cash, personal checks, cashier's checks, wire transfers, money orders, debit cards, credit cards, electronic transfers of money at a casino cage, and/or any desired method. In some embodiments transfers to and/or from an account including initial and/or subsequent transfers may be made at a same location as a sign up process, through an agent of a gaming operator, on a website, and so on as desired.

It should be recognized that such a process is given as a non-limiting example only and that other embodiments may include different, same, more, fewer, none, and so on such processes. Such processes may include same, different, alternative, fewer, more, differently ordered, and so on actions. Various examples of elements that may be verified and/or installed are given as non-limiting examples only. Any combination and/or arrangement of actions may be used in a signup process as desired (e.g., to provide a desired level of security).

User Security Examples

Some embodiments may include security methods to ensure that a device is not lost or stolen and then used to access a gaming service. For example, in some embodiments, it is recognized that a human generally is moving when holding a mobile device (e.g., walking, slight hand tremble, hand movement when operating a device, and so on). Accordingly, an accelerometer in a device may be used to determine whether the device is being held or has been left somewhere. A type of movement may be analyzed to determine if the device is exhibiting human like movement (e.g., movement that is within a speed of natural human movement as opposed to a car movement, movement in a pocket, and or other movements that are not typical when held in a human hand).

For example, an application (and/or gaming operator) on a mobile device may query an accelerometer, gyroscope, gps, etc. of the device to determine if the device is moving and/or moving a manner characteristic of it being held in a human hand (e.g., moving with a set of desired parameters such as in a speed range, with a level of irregularity, etc.). In some embodiments, if the device is not moving or not moving is such a human-like manner, the application may prevent access. In some embodiments if a determination is made that the device is not moving, a timer may be started, so that if the device does not begin moving for some period of time, then the application may prevent access. In some embodiments, a combination of non-use and non-movement may be used to determine if access should be prevented (e.g., to allow a user to place a device on a table but still use it). For example, if a time period in which non-use and non-movement occurs reaches a threshold, access may be prevented. Preventing access may include requiring a login before access is allowed, preventing access forever from a device, preventing access until an agent is contacted, and so on. An application running on a device may track this movement information and use the information to cause a logout or recheck to be required. The device may report the movement information to a central server that may determine when a logout or recheck may be required.

In some embodiments, a movement of a device may trigger a location recheck. For example, a location listener process may be run in a mobile device. Such a process may determine whether a device has moved by a threshold amount or at all. For example, such a process may call a GPS API or other location API to have location information reported to the process. If a GPS or other appropriate location reporting source reports that a location has changed by a threshold amount or any amount, an application may trigger a location recheck (e.g., by notifying a gaming service of the move). The threshold amount may vary by distance from an edge of a boundary or geofence (e.g., greater threshold if a device is farther from a boarder of a state). Although a GPS itself may not be a trustworthy source of location information, it may be somewhat reliable in reporting general movement. So the movement may be used as a trigger for performing another location check such as querying a location providing geofence or other service. A device may report movement to a central service and based on that movement being received, the central server may perform some other location verification (e.g., if the movement is above some threshold amount that may or may not be based on a distance from a boarder of a jurisdiction, a confidence of a prior location check, a time since a prior location check, and/or any other information desired.

Proxy and Virtual Machine Detection

In some embodiments, a gaming provider may desire to prevent a proxy or virtual machine to be used. Such elements may be useable to circumvent security or location restrictions. Accordingly, steps may be taken to prevent the use of a proxy or virtual machine by a client using a gaming service.

For example, a proxy may be used to make it appear that a client device is located in a specific location when in fact the client device is located somewhere else. Data going to and from the client device is first routed through the proxy. If the proxy is in a location where gaming is allowed by a gaming service provider, then the gaming service provider may allow gaming even if the actual client is not located in the allowable location. This may allow illegal gaming to occur. To prevent such illegal gaming, a gaming provider may prevent the use of a proxy.

A client process, such as software used to access a gaming service, may perform a latency check to determine if traffic is going through a proxy. The use of a proxy may introduce an increase in latency because an extra hop through a communication network (e.g., the Internet) with greater distance is introduced into a route between a client and a gaming service. If a determination is made that the traffic is going through a proxy, the client may be prevented from connecting to a gaming service provider. A client application and/or gaming server may determine a latency involved between their communication (e.g., during a sign in process). If that latency is too great, then the client device or gaming server may prevent gaming.

Various methods of making a determination of a latency being too great to access a gaming service may be used. One example method may include a gaming application on a gaming client transmitting a ping or traceroute packet to a gaming service (or vice versa). A return of the packet may be used as the latency and compared to some threshold latency. In some embodiments, the ping or traceroute packet may be transmitted with a ttl (time to live) level set to some amount (e.g., 1, 2, 3). This may be done because a proxy may be expected to be an early or a first hop after leaving a local network. If those early hops, which may be expected to have a low latency (e.g., because they should be close to the client), instead may have a high latency (e.g., because they are actually a proxy that is far from the client), then the client may assume that a proxy is being used and prevent access.

A high latency may include a latency that is based on some standard threshold. For example, a latency for a hop may be limited to less than 20 ms, less than 10 ms, less than 100 ms, and so on. In some embodiments, a latency limit may be limited based on knowledge of standard latencies for an area. A latency may vary based on time of day, network congestion, network outages, and so on in a particular area or time. For example, latency of other user's may be used to determine a standard latency. Users that attempt to logon to the gaming service and have a latency that is more than some amount (e.g., 100% more, 50% more, etc.) greater than the standard amount (e.g., latency of other users accessing the gaming service, latency of other users in a similar location that are accessing the gaming service, etc.) may be prevented. A gaming service may monitor such standard latency and use it as a comparison when users sign in to the service and/or transmit it to a user device so that the user device may use it as a comparison during a sign in process.

A virtual machine may also be used to circumvent location or security restrictions. Any method of limiting and/or detecting the use of a virtual machine may be used as desired. If a gaming client and/or gaming service determines that a user is operating client software on a virtual machine, then the access to the gaming service may be prevented (e.g., the client may not allow a connection to occur, may not open, etc.). As an example of determining if client software is running in a virtual machine rather than an actual machine, client software may query an operating system for an architecture of a processor. If the operating system returns a known virtual machine architecture and/or an unknown physical machine architecture, then the client may determine that the client is in a virtual machine. As another example of determining if software is running in a virtual machine, a client may check identities of running processes against a list of known virtual machine processes. If a match is found, then a determination that the client is running in a virtual machine may be made.

A check of a virtual machine and/or proxy may occur when client software attempts to open, when a user attempts to login to a gaming service, periodically during use of a gaming software, and so on. A result may be reported to a central server that may use the information to prevent gaming and/or used locally to prevent gaming. In some embodiments, such a check may be made by a gaming service rather than and/or in addition to a client software.

It should be recognized that various examples of determinations regarding virtual machines and proxies are given as non-limiting examples. It should be recognized that various examples of preventing gaming based on virtual machines and/or proxies are given as non-limiting examples.

Authentication Examples

Some embodiments may include an authentication method. Such an authentication method may be designed to provide a desired level of confidence that a mobile device is not being accessed remotely, a mobile device has not been hacked, and/or a mobile device is at a location where gaming is allowed. Such a method may be used to provide a level of confidence that a user is actually present at a mobile device, that the user is actually using the mobile device, and/or that the user is located at the location.

Although many different methods may be used, one example method may include two example processes, for example: an initial sign up and/or device authorization (e.g., establish a link between a device and a player, and/or establish a wagering account), and an application security handshake and/or continuous validation (e.g., occasionally verify that software is unaltered and/or that a person associated with an account is still using a device). An example of such processes is given herein. Such processes may be independent, dependent, a same process, different processes, arranged in any manner and/or performed by any desired apparatus and/or people.

Security Handshake and/or Continuous Validation Examples

In some embodiments, an application security handshake may include a multisystem secure authentication protocol that may facilitate compliance with one or more regulatory requirements. For example, one or more actions and/or devices may provide reasonable assurances that a mobile device accessing a gaming service is at an approved gaming location at a time of a wager by utilizing a location service to retrieve the device's location (e.g., on a regular basis), validating a location of a device in response to one or more requests to a gaming service (e.g., every request). As another example, one or more actions and/or devices may provide reasonable assurances that a mobile device is being used in person and not being remotely controlled by, for example, validating on a polled interval that some (e.g., all except one) external interfaces to the device are disabled before allowing access to a gaming service. As another example, one or more actions and/or devices may provide reasonable assurances that a gaming application executed by a mobile device includes an authentic application by using a multistage hashing protocol to send application and OS signatures to the device authenticator service before allowing gaming. As another example, one or more actions and/or devices may provide reasonable assurances that approved client versions are authorized to be used to play games by storing approved application hashing values on an internal database which is not accessible outside a firewall. As another example, one or more actions and/or devices may provide reasonable assurances that follow best practices regarding failed login attempts, session timeouts, etc. by defining session timeouts for each system connection the device is. As yet another example, communications may be secure by using SSL HTTPS protocol for communications that go over the Internet, and/or using application signature validation between processes on a device.

Some embodiments may include one or more actions that may be designed to provide some level of confidence regarding location, security, authenticity and/or any desired characteristics at a beginning of a gaming session, throughout a gaming session, and/or at points during a gaming session. In some embodiments, such actions may include a security handshake and/or a continuous validation process. A continuous validation process may include a process that periodically validates something, that occasionally validates something, that continuously validates something, that validates something at least one time after a handshake, that validates something upon an action, and so on. An example of a multi-level location determination methodology that may be used in some embodiments is given herein. Such a methodology may be used in some instances when a location determination is desired. In some embodiments, a higher granularity of location may be desired and any methodology for such a determination may be used as desired (e.g., geofencing, GPS requests).

Initial Validity with Service Provider Examples

Some embodiments may include an initial security process. Such an initial security process may be referred to as a handshake herein. In some embodiments, a handshake may include a multisystem secure authentication protocol. Such a process may provide reasonable assurances that the mobile device is in a location where gaming is permitted at and/or near the time of gaming. Such a process may provide reasonable assurances that the mobile device is being used in person and not being remotely controlled at and/or near a time of gaming. Such a process may provide reasonable assurances that software running on a mobile device includes an authentic application of a gaming operator. Such a process may provide reasonable assurances that that only approved client versions are authorized to be used to play games through a gaming service. Such a process may provide reasonable assurances that some and/or all external interfaces (e.g., Bluetooth, non-gaming operator provided Wifi, USB/DOCK) on the devices may be disabled to prevent remote connections. Such a process may use multilayer authentication. Such a process may include use of a soft tag and/or other location determination to locate the device such as a multi-level location determination methodology, GPS, geofencing, etc. Such a process and/or part of such a process may be performed at a start of an application on a device, periodically by a device, upon installing of an application, in response to a game action (e.g., bet, entry into game) being requested and/or placed, occasionally, continually, when a connection to a gaming operator is established, before a game action, and/or whenever desired. For example, in some embodiments, an application may be programmed to perform at least a part of such a process when the application is started (e.g., selected to be executed on a mobile device). Examples of such processes given herein are non-limiting examples. Other embodiments may include no such process, a process with more, fewer, different, same, and/or differently ordered actions. One or more actions of such a process may be performed by a wrapper application, a main application, and/or any other component.

Some embodiments may include determining whether a device is approved for use with a gaming service. In some embodiments, determining that a device has been approved for use with a gaming service may include comparing information about the device with a listing of devices that have been approved (e.g., a database of approved phone numbers, mac addresses, etc.). In some embodiments, information identifying the device may be transmitted to a gaming service so that the gaming service may make such a comparison and/or determine in any desired way whether the device is approved. A gaming service may receive such identifying information and in response to such receipt, determine if the device is approved (e.g., if the device was previously registered, if the device information is in a database that identifies approved devices, etc.). In some embodiments, in response to a start of a gaming application, the gaming application may transmit a request to a gaming operator to verify that the device was previously approved for using the gaming service. In some embodiments, a wrapper application (e.g., an android wrapper application, a win32 wrapper application, a wrapper application that a main application communicates with, and so on) may transmit the request to a component of a gaming service (e.g., a device authenticator service). In some embodiments, the request may include a phone number, mac address and/or any other desired identifying information. In some embodiments, the component of the gaming service may receive the request, and in response to receiving the request verify that the device has been previously approved for gaming. In some embodiments, the component may transmit an indication of such verification to the mobile device. In some embodiments, a request from the mobile device may not be transmitted, but rather a communication from the mobile device may be interpreted as a request (e.g., an initial communication of a gaming session). In some embodiments, authentication information, such as a device specific password, pin, pattern, etc. may also be requested form a user and compared to device specific authentication information established during a sign up process to authenticate a device.

Some embodiments may include determining whether a device is/was located at a location where gaming is allowed. In some embodiments, determining that a device is/was located at a location where gaming is allowed may include comparing information about where a device is/was located to a list of approved gaming locations. Some embodiments may include transmitting a request from a mobile device to a gaming service to verify that a location is approved, may include performing a multi-level location determination method, may include using an IP address to determine a location, may include determining a network interface through which a gaming service is accessed to determine a location, may use GPS, may use a geofencing service, and/or any location determination technology such as those described herein.

A component of a gaming service may facilitate a determination of whether the location is approved. For example, a DAS (device authenticator service) may send a request to a mobile location service to track a device location. Examples of such device tracking and/or location determination are described elsewhere. Some embodiments may include determining that a device is/was an approved location. Such a determination may be sent back to the mobile device in some embodiments. Such a determination of a location may be made in response to receiving the determination that the device is authenticated.

Some embodiments may include determining that a user is approved to use a gaming service. In some embodiments, determining that a user is approved to use a gaming service may include requesting user information from the user and/or requesting verification of such user information. For example, a user may be prompted for a user name and password. Such user name and password may be authenticated by a gaming service. Such a determination may include determining that the user is approved to use a particular mobile device and/or the gaming service at large. Such a determination may be made in response to a user entering identification information, a determination that a device is approved, a determination that a device is in an approved location, and/or in response to any desired event.

Some embodiments may include determining that application software executed by a mobile device is approved for use with a gaming service. In some embodiments, determining that application software is approved for use with a gaming service may include verifying the application software verifying a version of the software, and/or verifying that the software is unmodified from an approved version.

One example method of determining that application software is approved may include a comparison of hashes and/or other characteristics of application software. For example, in some embodiments a wrapper application and/or other software component may determine an application signature hash (e.g., a hash of one or more application files and/or other files). In some embodiments, such a wrapper application and/or other software component may generate a random number. In some embodiments, such a wrapper application and/or other software component may determine a timestamp (e.g., the current time, a relatively recent time). In some embodiments, such a wrapper application may determine a hash, which may be referred to as the App Hash herein, of the timestamp, the random number, and the application signature hash. Some embodiments may include transmitting (e.g., by the wrapper and/or other software component) the timestamp, random number, and the App Hash to the gaming service (e.g., to a device authenticator service) from the mobile device. In some embodiments, a component of the gaming service (e.g., a device authenticator service) may validate that the timestamp is in a predetermined threshold of time (e.g., 5 minutes, 30 seconds, 1 hour) from another time (e.g., a current time, a time when information about the App Hash is received, a recent server time, and so on). In some embodiments, the gaming service component may validate the App Hash. Such validation may include creating a comparison hash of the received timestamp, the received random number, and an approved application signature hash. Multiple comparison hashes may be created for multiple approved applications. Such a validation may include comparing the App Hash with the comparison hash or hashes. If a comparison hash and the App Hash are equal, then the App Hash may be determined to be valid. If they are not equal, then the App Hash may be determined to be invalid. In some embodiments, a determination that the App Hash is valid may be a determination that the application software is approved for use with the gaming service. A determination that the App Hash is invalid may include a determination that the application software is not approved for use with the gaming service.

It should be recognized that such an example of hash comparison is given as a non-limiting example only. Other embodiments may include any desired method or no method of such validation. For example, checksums may be used, random numbers may not be used, time stamps may not be used, additional information may be used, and so on.

In some embodiments, in response to determining that the application software is approved for use with the gaming service, an indication of such approval may be transmitted to and/or received by the mobile device. In some embodiments, a gaming service component (e.g., device authenticator service) may determine a client key (e.g., a unique client key, a random number). Such a client key may be used for one or more future transactions. Such a client key may uniquely identify the mobile device and/or that the mobile device has passed one or more authentication steps. Such a client key may be transmitted to the mobile device in response to a determination that the application software is approved for use with the gaming service. Such a key may be stored in a database (e.g., a database that associated it with the mobile device).

Some embodiments may include determining that an operating system is approved for use with a gaming service. In some embodiments, determining that an operating system is approved for use with a gaming service may include verifying a version of an operating system, verifying that an operating system is unmodified, and/or any desired actions.

One example method of determining that the operating system is approved may include a comparison of hashes. For example, in some embodiments a wrapper application and/or other software component may determine a hash of one or more operating system files and/or components and the client key. The wrapper application and/or software component may transmit the hash, the previously determined timestamp, the previously determined random number, the client key, and device identifying information (e.g., a phone number, mac address) to a component of the gaming service (e.g., a device authenticator service). In some embodiments, a component of the gaming service (e.g., a device authenticator service) may validate that the timestamp is in a predetermined threshold of time (e.g., 5 minutes, 30 seconds, 1 hour) from another time (e.g., a current time, a time when information about the App Hash is received, a recent server time, and so on). In some embodiments, a component of the gaming service (e.g., a device authenticator service) may validate that the client key is the most recent one sent to the mobile device identified by the identifying information (e.g., by comparing the client key with a client key stored in a database keyed by the identifying information). In some embodiments, a component of the gaming service (e.g., a device authenticator service) may validate the received hash. Such validation may include creating a comparison hash of the client key and approved operating system files and/or components. Multiple comparison hashes may be created for multiple approved operating systems. Such a validation may include comparing the received hash with the comparison hash or hashes. If a comparison hash and the received hash are equal, then the comparison hash may be determined to be valid. If they are not equal, then the comparison hash may be determined to be invalid. In some embodiments, a determination that the received hash is valid may be a determination that the operating system is approved for use with the gaming service. A determination that the received has his invalid may be a determination that the operating system is not approved for use with the gaming service.

It should be recognized that such an example of hash comparison is given as a non-limiting example only. Other embodiments may include any desired method or no method of such validation. For example, checksums may be used, random numbers may not be used, time stamps may not be used, device information may not be used, client keys may not be used, device information may be obtained from another source, additional information may be used, and so on.

One further example of a determination that an operating system is approved for use with a gaming service may include another method of comparing one or more hashes. For example, in some embodiments, an application (e.g., a wrapper application) may generate a hash of one or more portions of one or more operating system files. Such a portion may include less than an entirety of a section. In some embodiments, generating such a hash may include generating a hash of the one or more portions along with a length of the one or more operating system files. For example, a hash of a beginning and end of a section (e.g., a file) of an operating system that manages control of communication interfaces along with a length of the section may be created. The beginning and end may include a first 128 bytes and last 128 bytes and/or any other desired size of a portion. In some embodiments, such a hash may be transmitted to a gaming service for comparison with one or more approved hashes. It should be recognized that any portion or portions of a section may be used in various embodiments, in addition to and/or as an alternative to a beginning and/or end.

In some embodiments, such hashing of portions and lengths rather than an entire file may provide reasonable assurances of an unaltered file. Such assurance may be provided because it may be unlikely that a file may be altered and yet result in a same hash result when a beginning, end and length are hashed. Such a method may allow for faster verification than a method that includes a hash of an entire section. It should be recognized that while hashing is given as an example, that other embodiments may include any desired transformation and/or no transformation at all (e.g., a comparison of actual files).

In some embodiments, a gaming service maybe updated to include newly approved comparison hashes as a gaming service determines that new operating systems and/or modified operating systems should be approved for use with the gaming service.

Some embodiments may include transmitting information from a component of a gaming service to a mobile device in response to a completion of such a process, to complete such a process, as part of such a process, in response to verifying the operating system, in response to another action of such a process, and so on. Some embodiments may include storing information identifying that such a process has succeeded. For example, some embodiments may include determining a device session identifier. Such an identifier may include a unique identifier that may be used to identify a gaming session between the gaming service and the mobile device. Such a device session identifier may be associated with the mobile device (e.g., stored in a database). Such a device session identifier may be time stamped (e.g., with the previously determined time stamp, with a time relative to the determination of the device session identifier, and so on). Such a device session identifier may include a random number. Such a device session identifier may be transmitted to a mobile device and/or stored in a location to identify a success of such a process. Such a device session identifier may be received by a wrapper application and/or other software component. Such a device session identifier may be stored by the mobile device (e.g., in an encrypted form, in local storage, in memory, in a location reserved for the mobile gaming application and/or a component thereof, in a location reserved for the wrapper application and/or other software component, in allocation only accessible by a desired application, and so on). Such a device session identifier may be transmitted with future requests from the device to identify that a process has completed successfully. When a future request is received by a component of a gaming service, a comparison of a received device session identifier may be made to ensure that a valid device session identifier is received with the request. Accordingly, such a check may ensure that only devices that have completed such a process can access a gaming service.

In some embodiments, if a part of this process fails, the device may be considered unauthorized by the server and requests (e.g., gaming related communications) may be refused. It should be recognized that such an example process is given as a non-limiting example only. Other embodiments may include differently ordered actions, different components, no actions, more actions, fewer actions, and so on. Any action may be taken in response to any other action being successful (e.g., a determination of application software being valid may cause a determination as to whether or not operating system software is valid to occur).

Device and/or User Security

In some embodiments, at least a part of such an initial validity and/or handshake may be performed by a wrapper application. If such an initial process is completed successfully, a main application may be executed (e.g., by the wrapper application). Such a main application may perform a device and/or user security process. In other embodiments, a wrapper application may perform any desired other actions (e.g., a below process), a single application may be used, any arrangement of programs may be used, and so on.

Some embodiments may include a process for providing a level of assurance as to a device and/or user security. In some embodiments, such a process may be performed at a start of a gaming application, throughout an execution of a gaming application, in response to a logging into a gaming service, in response to a completion of an initial handshake and/or other initial process, parallel to an initial handshake and/or initial process, before an initial handshake and/or initial process, as part of an initial handshake and/or initial process, and/or as otherwise desired. Such a device security process may include determining that a device is locally used and/or preventing a device from being remotely accessed.

Some embodiments may include establishing a connection between a main gaming application and a wrapper application. Such a connection may include a socket. Such a connection may include a shared memory space. Some embodiments may include a wrapper application opening a socket. Such a socket may only be accessible by software executed on the mobile device. In some embodiments, a main application may connect to the socket and/or memory space. The socket and/or memory space may be used for communication between the applications.

Some embodiments may include verifying that a connection between applications and/or shared identifiers are valid. For example, in an Android environment, a lock file may be written to a data store of a first application (e.g., a wrapper application). An Android operating system may prevent a second application (e.g., a main application) running on the mobile device from accessing the first application unless the application have been signed by a same application signature. A second application may attempt to delete the lock file form the first application's data store. In some embodiments, if the applications properly share the same signature, the deletion may occur. The first application may verify that the deletion has occurred. If the deletion has occurred, the first application may be confident that the second application shares a valid signature with the first application. As another example, some embodiments may verify that the only two applications running under a particular user identifier are the two applications and/or other gaming applications that are approved. In some embodiments a verification that the two and/or more applications are running under a same user identifier. The first application may share a device session identifier with the second application in response to one or more such determinations.

Some embodiments may include determining that a user is authorized to use a gaming service and/or that a device is authorized to use a gaming service. For example, some embodiments may include soliciting user information (e.g., login information, device authentication swipe pattern, etc.). Such a solicitation may be performed by a gaming application (e.g., a wrapper application, a main application, etc.) running on a mobile device. For example, a user may be solicited for a username and password. A user name and password may be received by a gaming application in response to a user entering such information into a mobile device. Some embodiments may include transmitting such information from a gaming application to a component of a gaming service. For example, in some embodiments, such information may be transmitted to a gateway device. In some embodiments, an account information (e.g., account number, username, password, pin, etc.) may be transmitted to such a gateway and/or other device. In some embodiments, such a transmission may include a transmission of a device session identifier and/or any other information that may be used to identify a device, a session, a previously authentication of information, and/or track any desired information. Various actions may be performed by a gaming application (e.g., a wrapper application, a main application, etc.) running on a mobile device.

In some embodiments, a gateway and/or other component of a gaming service (e.g., middleware, servers, etc.) may enable a communication session (e.g., HTTP session, HTIP session) for a mobile device. The gateway and/or other component may associate a device identifier with a communication session. For example, such a communication session may only be usable when it is accessed using the device identifier unless a different or other identifier is associated with the session. In some embodiments, a communication session may be defined by one or more variables (e.g., a port number, an id number). Such variables may be shared with a mobile device and future communications may include such variables.

Some embodiments may include determining that a mobile device is/was at a location that is approved for gaming. Such a determination may be made in response to receiving account information from a mobile device by a gaming service. In some embodiments, a device session identifier may be transmitted from a gateway and/or other component to a different component for verification (e.g., to a device authenticator service). Such a device authenticator service may verify the device session identifier and determine if the device session identifier is associated with an approved location. If the device session identifier is associated with an approved location, the device authenticator service may transit an indication of approval to the gateway. In some embodiments, a single device may perform such approval actions. It should be recognized that such a process of determining whether a device is/was at an approved location is given as an example only. For example, in some embodiments a device itself may determine whether it is in an approved location, a gateway and/or other component may determine whether the device is in an approved location, any device may determine whether the device is in an approved location, a current location may be determined, an old location may be used, and so on. Various examples of determining locations and/or storing location information are given herein. None of such examples are limiting.

In some embodiments, a gaming service may validate user information. Such a validation may occur in response to receiving the user information, in response to determining that the device is/was in an approved location, in response to another event, and so on. For example, in some embodiments, a gateway and/or other component may transmit user account information to another component of a gaming service (e.g., device authenticator service, mobile gaming service, etc.). Such another component may validate the account information (e.g., determine that username and password are accurate, compare information to information in a database, etc.).

In some embodiments, if the information is validated, such a component may transmit an indication of such validation to a gateway and/or other component. Such an indication may include a gaming session identifier. A gaming session identifier may be determined in response to a determination that the information is valid. Such a gaming session identifier may include a unique identifier. Such a gaming session identifier may include a random number. A gateway and/or other component may receive such an identifier. Such a gateway and/or other component may associate such an identifier with a communication session for the mobile device (e.g., further communication may require such a identifier unless it is changed). In some embodiments, a mobile device (e.g., a main application and/or wrapper application) may be notified of such an identifier and/or a success of an authentication of a user. Such a mobile device application may store such an identifier for use in future communication. Future requests from a mobile device may be required to include such an identifier.

In some embodiments, such validation may occur only if the device is/was at an approved location. If the device does not pass a location check, the device may be prevented from gaming and such a login may not be performed. In other embodiments, such a login may continue regardless of the location of the device. In some embodiments some features of a gaming service may be disabled if the location check does not pass.

It should be recognized that while some embodiments have been described as having separate processes (e.g., an initial handshake and/or a user/device security process) and/or separate applications (e.g., a wrapper application and a main application) that various embodiments may include a single process and/or a single applications, multiple processes, and/or applications, differently ordered and/or interacting applications and/or processes, and so on.

In some embodiments, after such an initial handshake process and/or a device and/or user security process, one or more variables may be defined. For example in the example methods, a gaming session identifier and/or communication session may be defined by the user and/or device security process, and/or a device session identifier may be defined by an initial handshake process. Such variables may be checked, updated, changed, tracked, and so on. Such variables may be required for further communication from the mobile device to be allowed to access gaming services. For example, if communication is received by the gaming service without such variables being valid, the communication may be ignored and/or not allowed to form a wager. Such variables are given as non-limiting examples only. Other embodiments may include different variables, additional variables, no variables, different applications, and so on as desired.

In some embodiments, a determination that a device has been registered to the user may be made in such a process. For example, after and/or before a user is authenticated, a user may be prompted for a device authentication information such as a pattern swipe assigned during a sign up process. Such information may be transmitted to a gaming service which may verify that the device has been resisted for use with a gaming service. Such verification may be in similar form to the verification of a username and/or password. Such verification may be required before gaming may occur and/or before a gaming session identifier is assigned.

It should be recognized that various security processes and/or applications are given as non-limiting examples only. Other embodiments may include any and/or no processes in any order, with any actions, and so on. Such processes may include additional, fewer, different, same, differently ordered, and so on actions.

On Going Validity Examples

Some embodiments may include one or more actions related to maintaining security, maintaining location information, and/or creating some level of assurances that some requirements are met. For example, some embodiments may include continuous, periodic, occasional, randomly, on demand, in response to action, and/or other actions. Such actions may include location checks, device checks, user checks, and so on.

Variable Maintenance Examples

In some embodiments, such actions may include maintaining one or more variables, expiring one or more variables, redefining one or more variables, and so on. Some embodiments may include actions related to variables defined in other security processes, such as those discussed above. For example, a device session identifier, a gaming session identifier, and a communication session may be used in some embodiments. Such variables may have limited valid lifetimes, may be redefined periodically, may expire after some time, may be required to occasionally redefined, and so on. For example, in some embodiments, a device session identifier may be valid for about 30 seconds, about 3 minutes, about 5 minutes, about 10 minutes, about 1 hour, and/or any desired time. As another example, a gaming session identifier may be valid for about 30 seconds, about 3 minutes, about 5 minutes, about 10 minutes, about 1 hour, and/or any desired time. As yet another example, a communication session may be valid for about 30 seconds, about 3 minutes, about 5 minutes, about 10 minutes, about 1 hour, and/or any desired time. New variables may be defined in a similar fashion to their original definitions (e.g., by a device authenticator service, by a mobile gaming service, by a gateway, by a server, by another component, using hash values, using checksums, using random numbers, using timestamps, and so on).

Various examples of defining such variables are given elsewhere, but it should be recognized that such examples are non-limiting and that similar, different, same, alternative, and so on methods may be used to redefine and/or define any same and/or different variables as desired. It should be recognized that variables, and time frame for validity are given as non-limiting examples only and that other methods may include no, other, same, different, and so on variables; no, different, same, and so on methods of maintaining security and/or other characteristics, my use different time frames, my use random time frames, may randomly require redefinition, may require definition upon and event (e.g., a wager request), and so on.

Characteristic Examples

In some embodiments, one or more actions may be related to validating one or more characteristics of a device and/or user of a device. Some embodiments may include actions related to such characteristics (e.g., location, user identity, lack of external control of device, etc.). For example, in some embodiments, a disabling of external access to a mobile device may be validated, a location of a device at an approved gaming location may be validated, a user identify information may be validated, one or more variables being valid may be determined, and so on. In some embodiments, such validation may occur periodically, randomly, on demand, in response to an action, as desired, and so on.

For example, some embodiments may include validating that some and/or all external communication (e.g., except communication used to access a gaming service such as a mobile phone network) are disabled. Some embodiments may include a gaming application executed by a mobile device querying an operating system of a mobile device. For example, a main application may transmit a query to a wrapper application. The wrapper application may query the operating system. In some embodiments, in response to such a query, the operating system may determine if any invalid interfaces are enabled and return such information to the wrapper application and/or main application. In response to such information the validation may fail (e.g., if unapproved interfaces are enables) and/or succeed (e.g., if no unapproved interfaces are enabled). Some examples of interfaces that may not be approved may include Bluetooth, Wi-Fi, docking port, and/or other interfaces. Such a validating may occur continuously, periodically (e.g., every 5 seconds, every 15 seconds, every minute, every 5 minutes, every hour, etc.), randomly, on demand, and so on.

As another example, some embodiments may include validating that a mobile device is/was at a location that is associated with allowed gaming. Some embodiments may include a component of a gaming system making such a check independent of actions on the mobile device. Some embodiments may include the mobile device checking such a status (e.g., by querying a gaming system and/or other location system). In some embodiments, a component of a gaming system (e.g., a device authenticator service) may run checks on the location of the mobile device. Such a component may update a database with the check results, may enable or disable communication with a mobile device, features of a gaming service in response to such results, may notify a mobile device (e.g., to disable a feature of the device and/or display in indicator) and/or user in response to such results. Such a check may be performed continuously, periodically (e.g., every 30 seconds, every 5 minutes, every 10 minutes, every 15 minutes, every hour, etc.), on demand, in response to an event, and so on.

In some embodiments that may use a multi-level location determination methodology, actions taken with respect to location verification may differ based on a level of location determination that is being used. For example, location rechecks may not be performed in some instances for as long as an IP address does not change if an IP location determination level and/or trusted network level is being used. Location rechecks may be performed less frequently as a confidence level of a location increases (e.g., in response to a confidence level received from a third party, as a level of a method is closer to a first level, and so on). For example, in some embodiments, a gaming service may accept a location as valid and acceptable unless the IP address or network changes if the device's location uses the example first level of a multilevel location determination methodology described above (e.g., trusted IP or network). As another example, in some embodiments, a gaming service may occasionally recheck a location if the device location is determined using another level (e.g., level 2 or level 3) or may not recheck in some other levels (e.g. level 2) but may in others (e.g., level 3) in any combination. Frequency of rechecking may increase as a level increases in some embodiments. Rechecking in a known IP level may include determining whether an IP address has changed, checking again to verify that an IP address is still known, and so on.

In some embodiments, such location checks may be made more frequent when a mobile device is near an edge of an approved area than when the device is far from an edge of an approved area. Some examples of actions that relate to locations near jurisdictional lines are that may be used in some embodiments are also described elsewhere. For example, in some embodiments, a check may be performed every 5 minutes if a device in a previous check was near a border of a state, every 10 minutes if a device was near an edge of an approved area but far from an edge of a state, and every 15 minutes if a device was not near a border of a state or a border of an approved area. Various examples of location determination are given elsewhere herein. It should be recognized that examples of location checking are given as non-limiting examples only and that other embodiments may include no, different, same, and so on methods.

As yet another example, some embodiments may include determining whether user information is valid and/or whether a session or another variable is valid. For example, some embodiments may include transmitting a request from a mobile device to a component of a gaming service (e.g., a gateway). Such a request may include user information for validation, and or a request to verify that some variable is valid. For example, a request may request that the gateway verify that a device authorization session is valid. Such request may be processed (e.g., by a device authenticator service) and a response may be transmitted to the mobile device. Such a check may be performed continuously, periodically (e.g., every 30 seconds, every 5 minutes, every 10 minutes, every 15 minutes, every hour, etc.), on demand, in response to an event, and so on.

Various examples of characteristics and methods validation should be recognized as non-limiting. Other embodiments may include no, similar, different, same, alternative, and so on methods and/or characteristics.

Event Examples

In some embodiments, one or more actions may be related to validating one or more characteristics of a device, user, and/or variable in response to an event. For example, in some embodiments, when a communication is received from a mobile device, a gaming service may perform such one or more actions. In some embodiments, such communication may include a request to take a game action (e.g., place a wager, join a game, pay an entry fee, risk an amount of money or points), a request to view available games or game actions, a request to view an account, and so on. For example, in some embodiments, in response to a request being made to and/or through a gateway and/or other component of a gaming service (e.g., after initial login) one or more actions may be taken.

Some embodiments may include transmitting a request from a mobile device to a gaming service. For example, a wrapper application and/or main application may transmit a request to a gateway, and/or other component of a gaming service. Such a request may identify any desired variables (e.g., a communication session, a device session identifier, a gaming session identifier, a client key, and so on). Such a request may include a request to take a gaming related action, such a request may include a polling of a gaming service to determine current information (e.g., current games, current scores, account history, current account values, etc.). Some embodiments may include periodic, random, constant, etc. polling. In some embodiments, such polling may not initiate such validation actions.

Some embodiments may include receiving such a request by a component of a gaming service. For example, such a request may be received by a gateway and/or other component of a gaming service. In some embodiments a determination may be made that such a request triggers one or more validation actions (e.g., all request may trigger such actions, every X request may trigger such actions, randomly some requests may triggers such actions, certain types of requests may triggers such actions, a determination may be made the request is not a polling request, a determination may be made that the request is a request take a game action, a request every Y minutes may trigger such actions, etc.).

A gateway or other device may perform any desired actions in response to receiving such a request and/or determining that such actions should be performed. For example, in some embodiments, a gateway or other component may determine that a communication session identified by a request is properly associated with the device from which it is received (e.g., by querying a database).

As another example, in some embodiments (e.g., if the communication session check passes) a gateway and/or other component may validate a device session and/or location information. For example, in some embodiments, a gateway and/or other component may transmit a request for validation of a device session and/or location to a device authenticator service. A database of information may be queried to determine if one or more variables are valid (e.g., if a device session identifier associated with the device is valid, have not expired). A database of information may be queried to determine if a mobile device was last determined to be at a location where gaming is allowed. In some embodiments, a new location of the device may be determined. If such checks pass, a timestamp of a last valid check may be updated. Such information may be returned to a gateway and/or other component. It should be recognized that such examples of validation are given as examples only and that other methods may include different components, characteristics, and/or actions.

As yet another example, in some embodiments, if a validation is made of one or more characteristics from a device authenticator, a gateway and/or other component may validate any desired characteristic and/or variable with any components. For example, a gaming session identifier may be validated with a component of a gaming service. Such a component (e.g., server, account based wagering service) may query a database to determine if a gaming session identifier is valid (e.g., correct, not expired). A timestamp of a last check may be updated, and a gateway and/or other component may be notified of a success or failure to validate the information.

In some embodiments, in response to a validation action taken in response to a received request, a request may be processed and/or information may be updated. For example, one or more timestamps of last actions may be updated, one or more game actions may be taken, one or more account transactions may be performed, requested information may be obtained, actions in a game may be taken (e.g., a hit in a blackjack game), and so on. Some embodiment may include returning a result to a mobile device (e.g., transmitting). Some embodiments may include presenting such a result to a user.

Various examples of characteristics and methods validation should be recognized as non-limiting. Other embodiments may include no, similar, different, same, alternative, and so on methods and/or characteristics.

In some embodiments, if one or more validation actions of any described method or other methods fails (e.g., if a variable is determined to be incorrect or expired, if a device is determined to be allowing external control, if a password is incorrect, if a location is not proper, etc.), one or more actions may be prevented and/or taken. For example, in some embodiments, a communication with a device may be prevented, wagering actions may be prevented, access to a gaming service may be halted, a user may be notified of an error, and so on.

Figure 3:
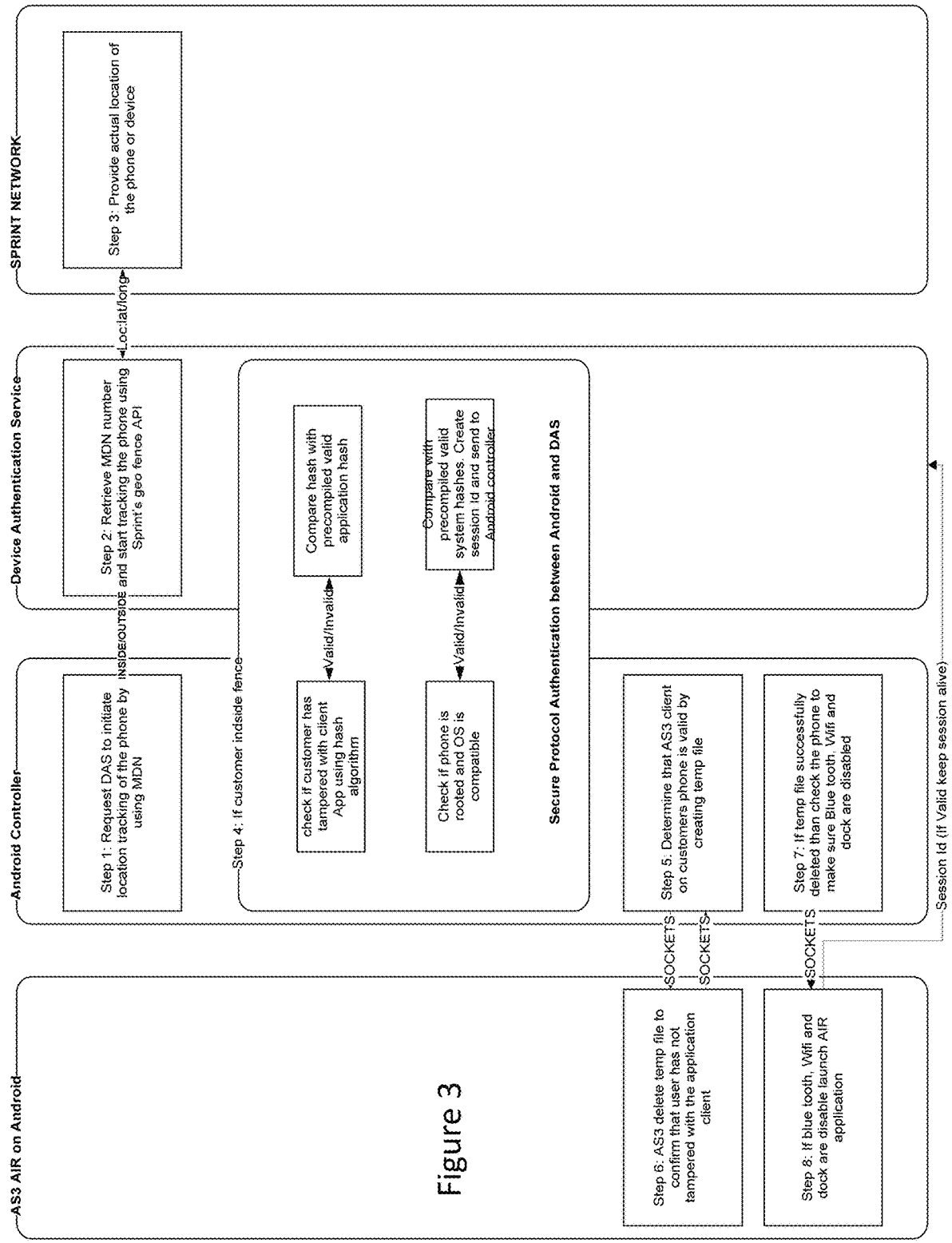
FIG. 3 shows an example process that may be used in some embodiments for validation and/or use of a mobile device.

FIG. 3 illustrates an example process that may be used in some embodiments for validation and/or use of a mobile device. Such a process may include actions performed by a mobile device, actions performed by a gaming application (e.g., a main application, a wrapper application, and so on), actions performed by a component of a gaming service and/or agent of a gaming service (e.g., a device authenticator service, a communication provider, a location service, and so on) and/or actions performed as desired by any entity. For example, some embodiments may include requesting an initiation of a location tracking of a mobile device, tracking a mobile device, providing location information about a mobile device, determining if a customer has tampered with a client and/or operating system, determining whether one or more communication interfaces are enabled and/or active, and so on. It should be recognized that such actions are given as non-limiting examples and that other embodiments may include performing any actions in any order as desired.

Figure 4:
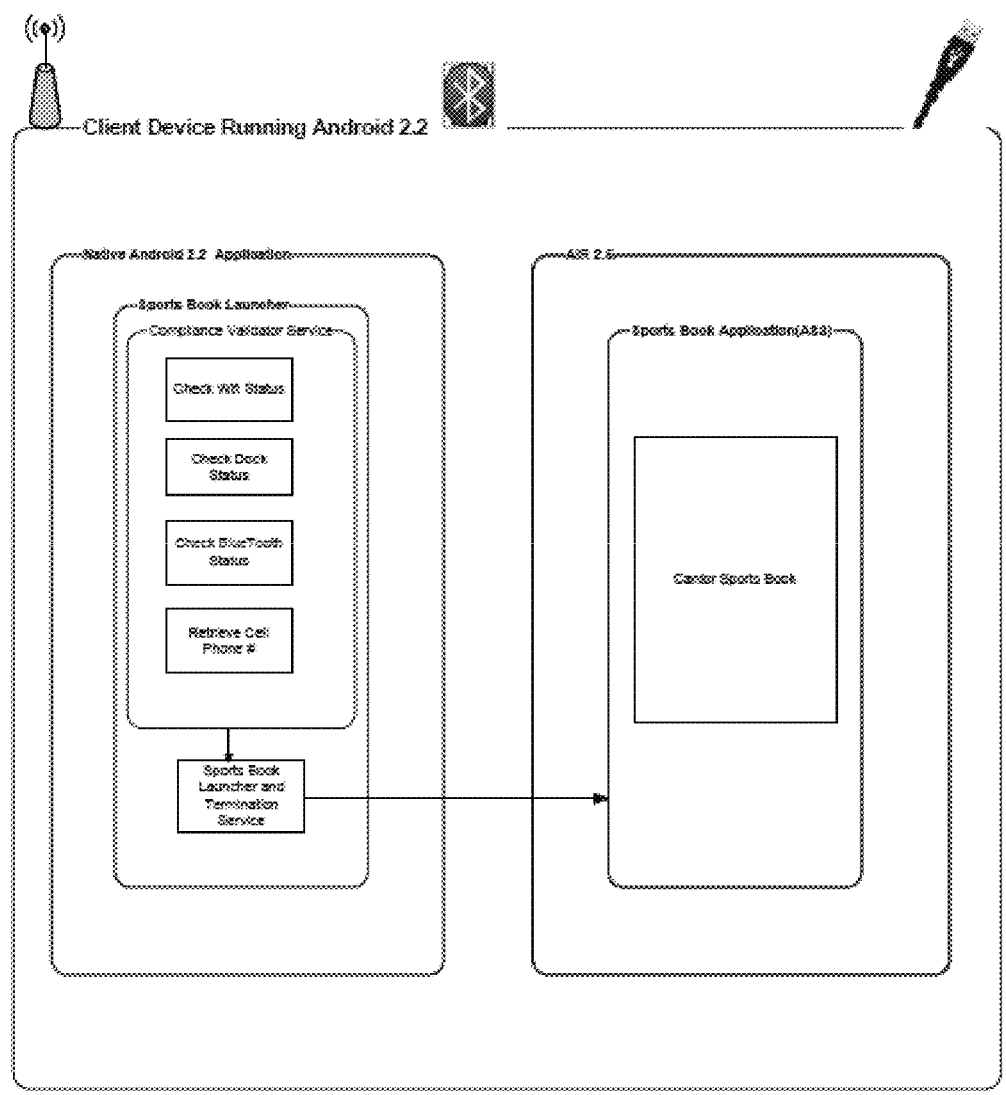
FIG. 4 an example set of application that may be executed by a mobile device to facilitate access to a mobile gaming service.

FIG. 4 illustrates an example set of applications that may be executed by a mobile device to facilitate access to a mobile gaming service. Such applications may include a wrapper application and a main application. A wrapper application may initiate execution of a main application and perform one or more security checks. A main application may perform gaming actions in connection with a gaming service. It should be recognized that this example process and applications are given as non-limiting examples only. Other embodiments may include different, same, additional, alternative, differently orders, and so on acts performed by same and/or different entities and/or devices as desired.

Further Location Examples

Some embodiment may include one or more location determination features and/or features that may be affected by a location of a mobile device. Such features may include determining an actual location, determining a relative location, determining whether a location is a valid location, disabling a feature based on a location, enabling a feature based on a location, adjusting a feature based on a location, and so on. Examples of a multi-level location determination methodology are described elsewhere and may be used in various embodiments. Additional and/or alternative methodologies may also be used to enhance and/or otherwise provide location information as desired.

Some embodiments may include one or more technologies that may be used to determine a location of a customer and/or mobile device. One example technology may include a geofencing technology. For example, a gaming operator may determine that the customer is playing in Nevada by using geofence capability (e.g., Sprint geofencing services). In some embodiments, to implement a geofencing technology, a gaming operator may perform geofencing calculations, work with Sprint, work with another geofencing provider, and/or work with a third party provider to ensure that desired locations are geofenced (e.g., the city of Las Vegas, Reno, Tahoe and/or other gaming locations within the state of Nevada and/or elsewhere). Customers may be allowed to engage in mobile gaming if they (e.g., a device they are using) are physically inside the approved boundaries. Customers may be prevented from engaging in gaming if they are not physically inside the approved boundaries. The service and/or information to enable the service may be offered to Sprint customers and/or customers of any desired cellular and/or other network service provider.

In some embodiments, a location of a device may be obtained from a location providing source (e.g., a cell phone provider may identify a location of a device to a gaming operator in response to the gaming operator asking the provider where a phone with a particular telephone number is located). The gaming operator may use the location of the phone to determine if the phone is in or out of one or more geofences (e.g., entering coordinates of a phone into a geofencing algorithm such as a winding or counting algorithm). In other embodiments, a third party may provide such geofencing services for the gaming operator.

Location Refinement Examples

Some embodiments may include determining a refinement of a location in some instances. For example, in some embodiments as discussed herein, a location may be determined using a multi-level determination methodology. Such a determination may result in a broad determination (e.g., in a state, in a jurisdiction, on a network, etc.).

In some instances, a more refined location may be desired. For example, in some instances, an advertisement campaign may be based on a location of a user with respect to a merchant. Accordingly, a distance from such a merchant may be desired and may be determined using an additional location determination method (e.g., GPS report from device, geofencing, etc.). As another example, a game may be offered to a group of people in a particular location, a tournament may be held in a particular location, collusion detection may use location of players in a multiplayer game as input, a refinement may be desired when an IP address of a device changes, and so on.

In response to a desire to use a more refined location as input, a gaming service may perform an action to obtain a location refinement (e.g., query a device, cause a gaming application on the device to transmit a GPS location, query a geofencing service, accessing a softtage system, and so on). A gaming service may receive such a refinement and determine whether the refined location qualifies and/or authenticates the device (e.g., if the device is in a location that qualifies for a tournament, advertisement, game play, etc.). If the device is qualified and/or authenticated based on the refinement, the device may be controlled to allow action and/or present information accordingly. If not, the device may be prevented from accessing functionality and/or not presented with information accordingly.

Collusion Examples

Some embodiments may include performing a refined location determination in response to a user playing a multiplayer game such as a tournament through a gaming service provider. Such location determination refinement may be used in response to a determination that a higher level location determination shows that more than one user playing a multiplayer game and/or tournament may be in a same area (e.g., an area covered by a known network). Such refined location determination may be used to detect and/or prevent collusion among and/or between users in a multiplayer game and/or tournament.

For example, in some embodiments, a determination may be made that two users are in a tournament and using a same network to access a gaming service (e.g., at a first level of a multi level gaming determination methodology). A determination may be made that the two users are associated with a tournament and/or multiplayer game (e.g., competing against each in a game, in a same leg of a tournament, etc.). In response to such determinations, a refined location determination may be made for the users. For example, a geofence may be used to determine a more refined location, a softtag may be used, and/or a GPS of a device may be queried to determine more refined locations.

Such refined levels of locations may be used to prevent and/or detect collusion. For example, the users may be prevented from playing in the tournament until they move further apart if they are in a same location. As another example, users may be identified that they should move in a particular direction to continue play. In yet another example, users may be warned that a continued movement in a direction may cause them to move too close to each other. In still a further example, a record may be stored to indicate that review may be warranted of play in this and/or other games and/or video future to determine if collusion may be occurring. It should be recognized that any desired actions may be taken with respect to collusion prevention based on location in any manner.

It should be recognized that although examples of location refinement are given in terms of a single level of refinement that any number of levels may be used. For example, a soft tag may be used in one level, if that does not result in a difference in location of users and/or a specific enough location, a geofence may be used. If a geofence does not result in a difference of locations and/or a specific enough location, a GPS may be queried. It should be recognized that any ordering of levels of refinement and/or number of levels may be used with any desired technology in any manner in various embodiments.

Location Based Adjustments Examples

Some embodiments may include making an adjustment to a service based on a location. For example, a gaming application executed by a mobile device may be adjusted based on a determined location of a device. In some embodiments, a device may be controlled to make such a change in response to the gaming service determining the location.

For example, an application may be branded according to a location (e.g., if a device is determined to be in the Venetian based on the device accessing the gaming service from a Venetian wifi network, the device may be branded with the Venetian logo). As another example, an application may prevent a user from selecting certain options and/or accounts based on a location (e.g., if a device is determined to be in the Venetian based on a geofence around the Venetian indicating that the device is within it, the device may be prevented from logging into non-Venetian accounts, the device may be able to access Venetian games, the device may be prevented from accessing games that are not approved for play in the Venetian, Las Vegas, and/or Nevada). An application on a device and/or a gaming service provider may control the device to restrict access to accounts and/or display branding based on the location.

In some embodiments, a device may be forced to access a gaming provider through a known network if that network is available. For example, in some embodiments, an application running on a mobile device may poll available wifi connections and compare those connections to a known list of wifi connections (e.g., based on an SSID list of known wifi connections). If a match is found, the mobile device may be automatically forced to connect to the wifi network in response and/or may be denied access to a gaming provider if a manual connection is not made. A user may be notified of the network so that they may make a manual connection. In some embodiments, an additional check on whether the network is the actual network may be made. For example, a location and a network SSID may be required to match before such a connection is forced upon a device. For example, because multiple networks may share a same SSID in different locations.

In some embodiments, as a device changes locations (e.g., in response to a gaming provider determining a location change), branding, options, and so on may be changed. For example, if a device is moved from a location covered by a wifi network of a casino into a location that is not covered by that wifi network, a location determination (e.g., performed in response to the device accessing the gaming provider from a new IP address and/or through a different interface) may reveal a new location of the device. In response to the new location, an option and/or branding may change (e.g., based on the new location, to a neutral branding based on the location being on a street, etc.).

In some embodiments, a gaming provider may facilitate branding and/or options for one or more entities. For example, a merchant such as a Starbucks may desire to have their own branding so that when a user accesses a gaming provider through the Starbucks network, some Starbucks branding appears. In some embodiments, such a merchant may partner with a casino or other venue so that accounts and/or options available when accessing a merchant's network may be the same or similar as to when the device accesses the casino or other venue's network. Accordingly, a application may be controlled (e.g., by a gaming operator) to display appropriate branding and/or options based being in a merchant location.

It should be recognized that although various examples of adjustments based on location are given that various embodiments may use location to make any type of adjustment and/or no adjustment as desired. For example, options, branding, software, functionality, and so on may be changed based on location. Such change may be facilitated by controlling software on a device from a gaming service, controlling information sent to a device from a gaming service, adjusting software on a device, and so on based on a location.

Location Affinity Examples

Some embodiments may include associating a particular location with one or more advertising elements, available games, user interfaces, skins, user accounts, and so on. For example, in some embodiments, a user that is in the M Resort may be allowed to play games (e.g., sports wagers, and/or casino games) that may be allowed by the M Resort. For example, the user may be limited to only games that are offered by the M, approved by the M, have an M skin, and/or are otherwise limited and/or customized based on being located within the M Resort. In some embodiments, a user may be limited to using an account at the M Resort when located in the M Resort. In some embodiments, a user may be limited to selecting an M Resort account from a list of accounts from which to place wagers, an M Resort App, an M Resort menu item from a menu of gaming items, and/or other elements related to the M Resort when in the M Resort. In some embodiments such restriction may apply to a particular type of gaming such as casino gaming but may not to another type of gaming, such as sports gaming.

For example, in some embodiments, if a user is in a geofence that is around the M Resort, the user may be determined to be in the M Resort. For example, one of the geofences described above may be around the M Resort and a query result from a location service may indicate whether the user is in or out of that particular geofence to be used by a gaming service to determine whether the user is in or out of the M Resort. In some embodiments, if a user is accessing a M Resort communication network for gaming (e.g., an M Resort wifi network), the user may be determined to be in the M Resort. In response to being determined to be in the M Resort, features may be enabled and/or disabled as desired (e.g., a user may be prevented from logging into a non-M Resort account.

In some embodiments, determining a location may be performed using geofencing such that a first geofence around a casino and a second geofence around a city may be used. For example, such a concentric geofencing may allow for a user in a casino to be limited to things approved by the casino, but a user outside of the casino to be allowed to use things approved outside the casino, which may include more, fewer, same, and/or different things than those approved in the casino. For example, more than one type of gaming may be allowed outside the casino, such as sports wagers from multiple books not just the M Resort and/or casino games using money from accounts not located at the M Resort. Other methods of location determination, such as a multilevel location determination methodology, a soft tagging system, and so on may be used.

In some embodiments, as an alternative and/or addition to determining location based on geofencing a determination of a location may be based on available communication networks. For example, one or more determinations may be made by a software application of a device as to whether one or more wireless networks or other communication networks from a set of pre-approved networks are available. Each such preapproved communication may be associated with a particular location. If a wireless network of the set of wireless networks is available, then the device may be required to establish a connection to that network in order to play a game. Access to gaming through any other network such as a cellular network that may also be available may be prohibited when one or more of the pre-approved networks are available. Accordingly, in some embodiments when inside of a casino such as the M Resort that may offer a wireless connection to an M Resort network that is associated with being in the M Resort, a device may determine that the pre-approved M Resort network is available. The device may stop access to a cellular network for gaming purposes in response to determining that the pre-approved network is available. The device may connect to the M Resort network in response to determining that the M Resort network is available. Limitations, abilities, restrictions and so on associated with being in the M Resort may be associated with gaming using the M Resort network, and therefore, the device. Such limitations may be imposed upon the device by the device, by a server to which the device connects, by a gateway through which the device connects, and/or in any other way. For example, in some embodiments, based on an SSID on the network, a gateway server may limit available accounts that may be signed into, based on the account signed into, a central server may limit available gaming options, based on the SSID of the network, a device may apply a skin and/or restrictions, based on an SSID a central server may apply limitations, and so on. As discussed above, some verification that the network SSID is of the actual network may be used, such as a location matching for the SSID (e.g., in response to detecting the SSID, a device may notify a gaming service and/or trigger a location determination and if the location matches a location that should have an affinity then that affinity may be applied).

Such information about networks and/or locations may be used to distribute winnings, direct advertising, prevent users from becoming angry or feel cheated by a casino in which they are located even though they are playing games that may be offered through another casino, and so on.

In some embodiments, to accomplish such network limited functionality, a device may be configured to check for an availability of one or more pre-approved communication networks, such as a Wi-Fi connection (e.g., by a gaming application, a wrapper application, etc.). Such checking may take place periodically, continually, randomly, on demand, and so on. When any one of those pre-approved communication networks is available, the device may connect to that instead of any other networks. If multiples are available then a strongest signal or otherwise preferred network may be used.

In some embodiments, to continue ensuring that no remote control is used through a Wi-Fi connection so that a player is physically present, when gaming through a cellular network, the Wi-Fi may be disabled for actual data receipt and/or connection unless and/or until such a pre-approved network is detect, a Wi-Fi connection may be turned on for short periods only to check if the network is available (in some embodiments, during which time the other gaming may be suspended), a Wi-Fi device may be on but unable to connect to any network accept the preapproved networks, a Wi-Fi device may be controlled by a proprietary software that limits access to any networks other than the preapproved networks, and so on.

When a pre-approved network is detected a cellular network may be no longer available for gambling through a gaming application (e.g., the application may be notified of the availability and disconnect from or otherwise limit access to a gaming server through the cellular network, a gaming server may be notified and limit access to games, and so on). The user may be prompted to login through the Wi-Fi network and/or may automatically be logged in through such a network instead. Similarly when the Wi-Fi network is no longer available, if the cellular network is available, the user may be prompted to login there and/or may be automatically logged in there instead. As discussed above, some verification that the network SSID is of the actual network may be used, such as a location matching for the SSID.

A start up process that may be performed before gaming is allowed on a mobile device in such an embodiment may require that Wi-Fi be enabled throughout the use of the device, may require that a Wi-Fi diagnostic be passed, may require that an approved application has control over a Wi-Fi device, and so on. If no approved Wi-Fi network is available, the cellular network may be used to gamble such as described elsewhere herein, for example.

It should be recognized that various examples of location service and/or location affinity are given as non-limiting examples only.

Geofencing Examples

One example location feature may include a geofencing service. Geofencing capability may be used to help ensure that a customer is/was at an approved area (e.g., when a location check is performed, when a wager request is received by a gateway, etc.). One example of a geofencing technology provider includes Sprint. In some embodiments, a gaming operator may perform geofencing calculations on its own and/or with input from another location service provider (e.g., a cell phone service provider that can provide coordinates of a cell phone when queried with the cell phones telephone number). In some embodiments, such geofencing technology may be used to determine whether a customer is/was at the city of Las Vegas, Reno, Tahoe and/or other gaming locations in the state of Nevada that are geofenced. In some embodiments, customers may play games if they (e.g., the device they are using) are/were physically in the boundaries of an approved geofence. In some embodiments customers may not play games if they are/were not in the boundaries. Another example geofence is provided by a company named Locaid. It should be recognized that any desired location providing service may be used in various embodiments and that examples given herein are non-limiting. For example, while some examples are given in terms of a geofencing service providing inside or outside results to a query, other embodiments may have a geofencing service provide a coordinates of a device and a gaming service may make a check to see if those coordinates are inside or outside one or more geofences. Accordingly, it should be recognized that a geofencing service need not necessarily apply the geofence to the coordinates but merely provides some information that enables geofencing to be applied.

A geofence may include a virtual perimeter of a real-world geographic area. Some example of parameters that may define a geofence around a major city like Las Vegas, Reno, etc. may include: latitude 89.2 deg., longitude 33.4 deg., radius 20 miles; and latitude 50.5 deg., longitude 76.9 deg., radius 22 miles.

It should be recognized that any number of geofences in any location with any parameters may be used as desired. Geofences may be added and/or removed at any time desired to increase, decrease, and/or change an area in which wagering is allow and/or not allow. For example, another set of example geofences may include: longitude 36° 05' 58.37"N, latitude 115° 12' 04.90"W, radius 20 miles; longitude 39° 38' 58.68"N, latitude 119° 34' 40.66"W, radius 20 miles; and longitude 39° 05' 08.69"N, latitude 119° 34' 10.61"W, radius 20 miles.

Figure 5:
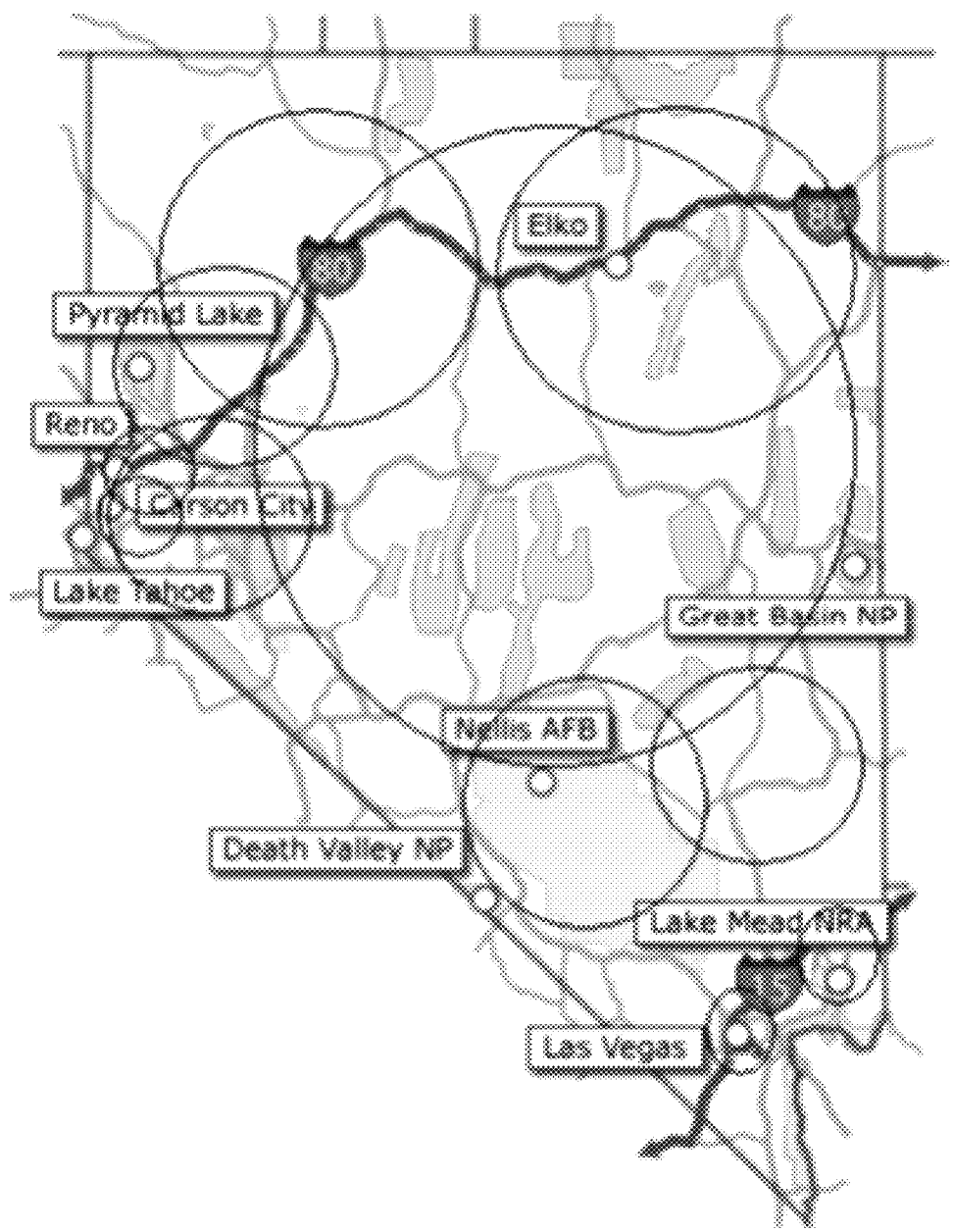
FIG. 5 shows an example of a series of geofences shown on a map of Nevada.

FIG. 5 illustrates an example of a series of geofences shown on a map of Nevada. The circles/discs in the map represent sample geofences. A gaming service may provide reasonable assurances that the customer is gaming in an approved area by using the capabilities that these geofences provide. In some embodiments, customers may be able to play games (some or all games) if and only if they are physically inside a geofence, if an only if a last updated location (e.g., by a device authenticator service) shows that the device was last at an approved location, and so on. In some embodiments, customers cannot play games if they are physically outside a geofence and/or were last determined to physically be outside of a geofence. It should be recognized that while examples are given in terms of circles that any desired geofence shape may be used (e.g., a geofence around a casino).

Some embodiments may include determining whether a device is in or out of one or more geofences. Such determination may include, for example, a determination by a geofencing provider (e.g., based on gps coordinates of the device and the geofence(s), based on triangulation through communication devices (e.g., cell towers), and so on). In some embodiments, such a determination may include a determination by a component of a gaming service (e.g., by querying a location service provider, by calculating a location, by receiving an indication, and so on). Geofencing may include telematics hardware and/or software.

In some embodiments, when a device (e.g., a mobile device using a gaming service, a location aware device, a device of a location-based service, etc.) enters or exits a geofence, the device and/or a component of a gaming service (e.g., a device authenticator service) may receive a generated notification (e.g., a provider of location services may transmit a notice to a device indicating such a change in location). This notification might contain information about the location of the device (e.g., a current gps coordinates, a name of a geofence, a city, an indication that the device is in or out of a geofence, etc.). Such a notification may be transmitted to a mobile device over a communication network, to a component of a gaming service over a communication network, to an email account, as a text message (e.g., SMS), and so on.

Some embodiments may include taking any desired action in response to a crossing and/or near crossing of a geofence border. For example, in response to a leaving and/or near leaving of a geofenced area, a vehicle may be stopped, a third party may be notified, a gaming service may be notified, a game may be stopped, a mobile device may be affected (e.g., shut down, an application may be halted, and so on), and so on. Such actions may be facilitated by a gaming service provider in response to determining such a change to a location and/or a location service provider.

As yet another example of a working of a location service, some embodiments may include a location service that may be queried as desired to determine a location. For example, a communication service provider (e.g., Sprint) may track a current location of a mobile device using a communication service (e.g., through gps coordinates, through cell towers or other communication access points being accessed, etc.). Such tracking may be performed continually and/or in response to a request.

In some embodiments, a gaming service may transmit a query to verify a location and/or perform a calculation to verify a location as desired. For example, a gaming service may transmit a query to a location service whenever a variable has expired, periodically, in response to a query, etc. In some embodiments, such a query may ask the location service if a mobile device is in a boundary of one or more geofences. In some embodiments, such a query may ask the location service for a location of a mobile device and a gaming service may determine if the mobile device is in the one or more geofences by comparing the location to the geofences.

In some embodiments, a gaming service may desire to minimize determinations and/or queries regarding locations. For example, such determinations may require processing time that is desired for other processes, and/or a location service may charge a fee for responding to such queries. Some embodiments may include a variable frequency and/or need for such queries and/or determinations. Some embodiments may include determining when to make a determination of a location based on a distance from boundary (e.g., a boundary of a geofence, a boundary of an allowed gaming area) of a prior location determination.

For example, in some embodiments, a time between determinations (e.g., periodic determinations, random determinations, occasional determinations, and so on) of a location (e.g., a frequency of a query) may be greater if a device is farther from a boundary of a geofence than if the device is closer to a boundary of the geofence. For example, a location variable may remain valid for longer if it is based on the location that is farther from the boundary. In some embodiments, a response to a query may indicate when a next query should be made based on such a distance. In some embodiments, a response to a query may indicate a distance from a boundary (e.g., an actual distance, a category of distance, and so on). A gaming service may determine when to make a next query based on such received information. Such querying may include for example, querying every 5 seconds for close to a boundary, every 15 second for far from a boundary, a sliding scale, and so on. In some embodiments, a query may be made for every transaction when close to a boundary, every other transaction when far from the boundary, and so on. A determination may be made that a request from a mobile device does not require a location determination based on a distance from a boundary.

Some embodiments may include concentric geofences that may be used to determine when a query of a location is to be made. For example, an inner geofence may correspond to a location far from an allowed boundary and may correspond to a longer time frame. An outer geofence may correspond to an actual and/or closer boundary of an approved area and may include a more frequent determination. Some embodiments may include determining whether a determination of a location of a mobile device should be made based on the mobile device being outside of at least one geofence and inside of at least one other geofence.

It should be recognized that such examples of a determination rate being related to a distance form an edge of an approved area are given as non-limiting and that other embodiments may include any methods and/or apparatus that may in any way relate determinations to distance may be used as desired.

Some embodiments may include determining such a determination rate based on a speed of a mobile device. For example, in some embodiments, a speed of a mobile device may be determined based on a current and prior location (e.g., the distance traveled between determinations divided by the time between determinations). In some embodiments, a faster traveling device may be associated with a faster rate and a slower speed may be associated with a slower rate.

In some embodiments, a speed and distance may be used to determine such a determination rate. For example, determination rate may be determined such that at a determined speed, a device is unable to travel a distance to a boundary in a determined time, is unable to travel half a distance to the boundary, is unable to travel any threshold percentage of a distance to a boundary, and so on.

Although some examples have been described as having a concentric set of geofences with the outer fence being the most restrictive because it may be closest to a boarder of an approved area, it should be recognized that this is a non-limiting example only. For example, some embodiments may include an inner geofence that is more restrictive that some or all outer geofences. It should be recognized that any arrangements of geofences may be used in various embodiments whether inner middle outer and so on are more or less restrictive than others.

For example, in some embodiments, a first set of licensing rules may apply to devices used on a property within a jurisdiction, a second set of licensing rules may apply outside of the property within the jurisdiction, and a third set of rules may apply outside of the jurisdiction. Accordingly, a geofence covering the property may be established to allow gaming on the property. In such an embodiment, if the on property activities are a superset of the off property activities, then the geofence may be a highly restrictive geofence (e.g., one that imposes high rate checks and/or high location checking policies) to keep the location verified so that unallowed activities are not performed off property. The geofence outside of the property may be a low restrictive geofence because the property may be located far from the jurisdiction boarder. Another geofence may be established near the border, to provide a highly restrictive outer layer to prevent unauthorized gaming outside of the jurisdiction. Accordingly, a device that is in all three geofences may be in a high check zone, a device that is in the outer and middle geofence may be in a low check zone, and a device that is in just the outer geofence may again be in a high check zone. Different security may be applied and/or different gaming options (e.g., different games) may be presented through a device based on the level of geofence that the device is located in. A determination of games available and security procedures may be made by a gaming service based on a determination of the geofences that the device is located in. A gaming service may facilitate play of the games and facilitate security checking according to a policy of the geofences that the device is located in.

Furthermore it should be recognized that while examples have been given in terms of a desire for a device to be in a geofence to provide gaming services that this is a non-limiting example. For example, in some embodiments, a zone within a geofence may be restricted from gaming services but a zone outside the geofence may allow gaming services.

In some embodiments, a direction may be used to determine a determination rate. For example, a direction may be determined based on prior two locations (e.g., traveling in the direction of the second location from the first location). In some embodiments, a distance to the boundary that may be used in determining a time period may be based on a distance to the boundary in the direction of travel, a shortest distance to the boundary in a range around the direction of travel (e.g., 20 degrees in either direction from the direction of travel, 90 degrees in either direction form the direction of travel, and so on).

In some embodiments, a maximum time period may not be exceed (e.g., 1 minute, 5 seconds, 1 hour, 10 minutes, etc.).

It should be recognized that any actions, processes, information, and so on may be used to determine a determination period as desired in any combination with any desired restrains.

Various other services may be offered by a location providing service. For example, Geofencing may be used with child location services to notify parents when a child leaves a designated area. A location-based service (LBS) may include an information and/or entertainment service, such as a mobile gaming service that may be accessible with mobile devices through a mobile network. Such a service may make use of the geographical position of a mobile device. LBS services can be used in a variety of contexts, such as health, work, personal life, etc. LBS services may include services to identify a location of a person or object, such as discovering the nearest banking cash machine or the whereabouts of a friend or employee. LBS services may include parcel tracking and vehicle tracking services. LBS can include mobile commerce when taking the form of coupons or advertising directed at customers based on their current location. They may include personalized weather services and even location-based games.

In some embodiments, technology may allow the creation of standalone and/or overlapping geofences. Technology may allow creation of a geofence/circle of any given radius and/or shape. In some embodiments, this technology may prevent anyone outside of a fence from placing wagers. Geofencing may allow users of a system to draw zones around places of work, customer's sites and/or secure areas.

As an example, some embodiments may use a sandbox service for geofencing provided by Sprint and/or may perform similar functionality. Such a service is given as a non-limiting example only. This service may include one or more geographical locations where each single position can be plotted with a geographic coordinate. A user may be able to build a perimeter around this location—a fence, based on those coordinates. Users of such a system may have the ability to build fences, add devices related to those fences and be notified when a device is entering or leaving (or both). In some embodiments, to alleviate privacy concerns, only devices having explicitly granted access to an application may be able to interact with a geofence. A gaming service may provide such functionality to customers to build and/or manage geofences as they desire (e.g., a casino may establish its own geofence within which some branding is applied by interacting with an API of a gaming operator to enter the geofence).

In some embodiments, one or more services may be available as part of a geofencing API to facilitate generating, eliminating, maintaining, querying, connecting, and so on regarding geofences. Some services may be used to maintain devices being tracked in relation to a specific geofence. Some services may be used with respect to managing, and/or receiving notifications for one or more geofences. Some embodiments may include one or more errors occurring with respect to a geofence. Some embodiments may include one or more services, functions, processes, APIs and so on performed, used, and/or offered by a device, and/or system that may interface and/or otherwise use a geofencing technology. For example, one or more of the services described and/or available through Sprint's geofencing services may be available and/or used to provide such gaming services in some embodiments.

Figure 6:
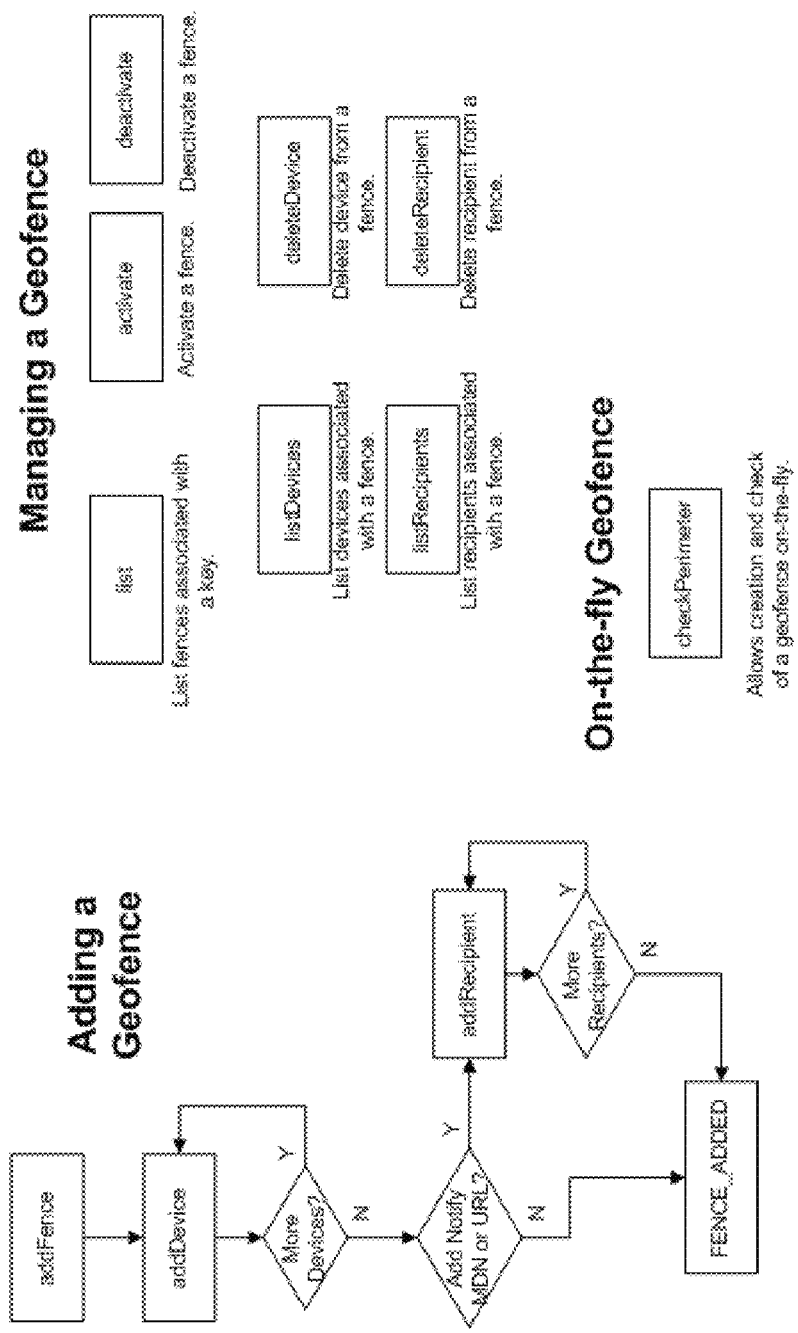
FIG. 6 shows some example processes that may be performed in some embodiments with respect to a geofence.
Figure 7:
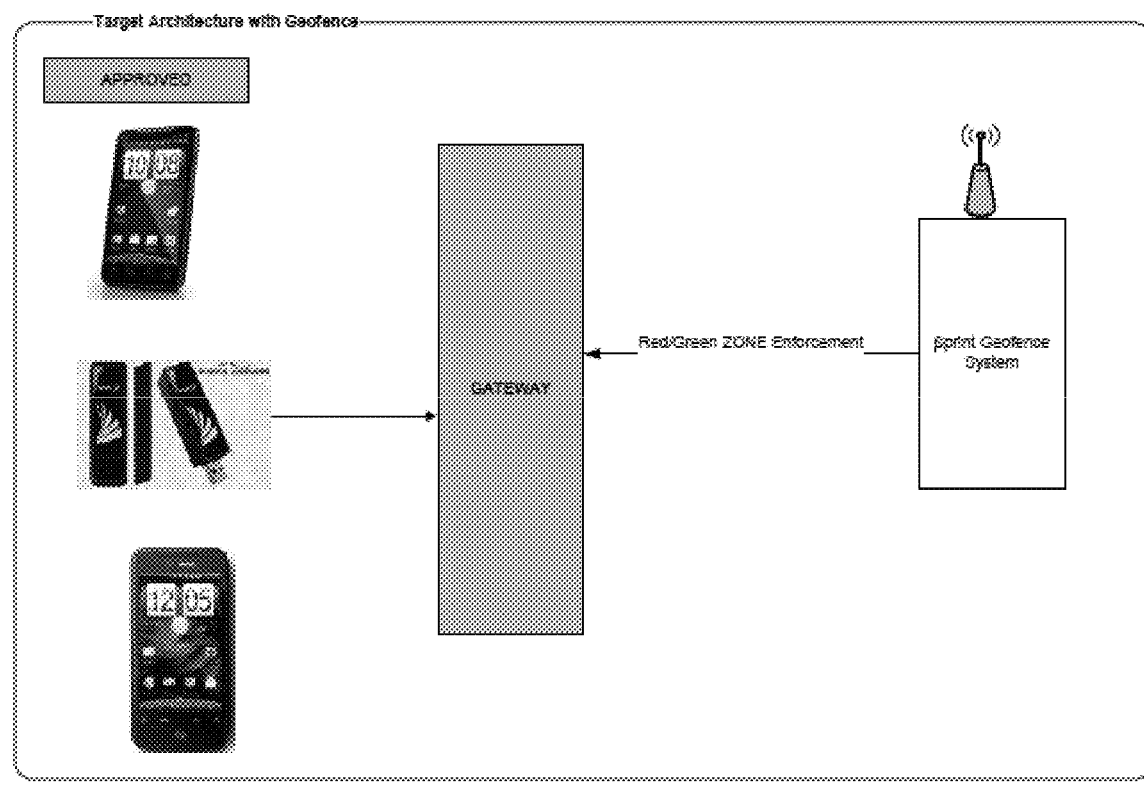
FIG. 7 some example processes that may be performed in some embodiments with respect to a geofence.

FIG. 6 illustrates some example processes that may be performed in some embodiments with respect to a geofence. It should be recognized that this is given as an example only and that other embodiments may include other processes, other actions in any order performed by any device as desired. It should be recognized that various examples of services and/or functions are given as non-limiting examples only. Some such example processes may include creating a geofence, adding a device to be tracked by the geofence, subtracting a device, eliminating a geofence, changing a geofence, querying regarding a device and/or geofence, listing active and/or inactive geofences, activating a geofence, deactivating a geofence, and so on. Other embodiments may include other such features with different parameters, authentication requirements, arguments, responses, names, and so on FIG. 7 illustrates an example architecture that may be used in some embodiments for location determination. As illustrated, one or more mobile device may communicate with a gateway. Such a gateway may communicate with a location determination service. In some embodiments, the gateway may determine whether a location determination is desire d (e.g., in response to a wager, periodically, in response to a variable becoming invalid, etc.). The gateway may query the location service in response to determining that the location determination should take place. The location service may determine a location (e.g., a gps coordinate, a physical location, whether a device is in or out of a geofence, a distance to an edge of a boundary, etc.). The location service may transmit such location information to a gateway. The gateway may enable and/or disable a service as desired, store information about the location, and/or perform any desired actions in response to receiving the location information. It should be recognized that such an architecture and process are given as non-limiting examples only and that other embodiments may include any desired components of a gaming service, location service, communication service, and so on as desired in any combination performing any functions.

It should be recognized that examples of determining whether a device is in or out of a geofence are given as non-limiting examples only. Some embodiments may include any number of services to provide such features. For example, a third party may provide location services, a communication service provider may provide location services, a gaming service may provide location services, any aspect of a location determination may be performed in part or in whole by any entity desired.

Moving Access Point Example

In some embodiments, a group of devices may access a gaming service through a single access point. That access point may be a mobile access point. Accordingly, a determination of the location of the access point may be indicative of the location of the devices. For example, a boat may include a Wi-Fi access point that allows devices to communicate with a gaming provider. If the Wi-Fi access point is in an allowed jurisdiction, then the devices that access the gaming service through the access point are likely to also be in an allowed jurisdiction.

Some embodiments may include a gps, geofencing, or other location determination method for a portable access point. A gaming service may determine the location of the mobile access point, for example, by making a gps query to the device and enable or disable gaming services for devices that access a network of the mobile access point. In some embodiments, the access point itself may determine its location and enable or disable gaming services for devices that access a network of the mobile access point.

In some embodiments, a network of such an access point may become a trusted network when it is in a gaming location that allows gaming, so a single level of IP based location determination may be used. The same network may be a known unapproved network when the access point is determined to be in an unapproved location, so further location determination may not be used if an IP address of a device is known to be on that network when the access point is not in an approved location.

In some embodiments, a gaming operator may determine that users are accessing the gaming service through the trusted network that is also a moving network. In response, rather than simply allowing access as may be done when a stationary trusted network is detected, a check of the location of the moving network may be performed. Access may be allowed if the network is in a allowed location. In some embodiments, when a check of a device location would normally be performed, instead a check of the access point location may be performed. In some embodiments, an access point may report when it enters and/or nears an unallowed location. Because the access point may be trusted, a gaming operator may rely upon such self reporting rather than require independent location checks of the mobile access point. Accordingly, in such an embodiment, a location check of a device may not be reperfomed while the device is accessing the network through the mobile access point until the mobile access point identifies to the gaming operator that the mobile access point's location is no longer and/or soon to be no longer in an allowed area.

Other Geofencing Examples

As discussed, according to some embodiments, geofencing may be used to determine if a customer/user (e.g., the device he is using) is within the boundaries of some predefined location and features and/or services etc. may be enabled, disabled and/or modified etc. based on that determination. For example, a gaming service provider/gaming service may use geofencing to limit access to gaming activities (e.g., casino gaming/wagering, peer-to-peer gaming, card games, poker, sports wagering (e.g., football, basketball, baseball, soccer), lottery, horse/dog/auto wagering, video gaming, play-for-fun, contest, sports lottery, bingo, keno, fantasy gaming, and/or various other forms of gaming and/or wagering on events including those discussed herein) to customers/devices that are within the boundaries of a particular/predefined/permitted location(s) as defined by the geofence(s). A gaming service provider may determine the location of a device when a customer initially accesses the gaming activities (e.g., as the customer logs into an account) and once provided access, may re-determine the location (e.g., periodic determinations, random determinations, occasional determinations, continuous determinations, and so on) of the device to ensure the device is still in a permitted location.

In some embodiments, a query to a geofencing service and/or calculation of a geofence may result in simply a yes or no indication that the device is in or out of the geofence. Such a service may allow a gaming service to generate geofences and may maintain the geofences for the gaming service. In some embodiments, a query to a location service may return a location (e.g., gps coordinates) of a device. The gaming service may then apply the geofences to the coordinates to determine if the device is in or out of one or more geofences. It should be recognized that the use of the term geofence service does not indicate that geofencing is actually applied at that level or that the service is a separate service from the gaming provider. For example, a gaming provider itself may provide local geofencing capabilities just as it may provide local IP location capabilities.

As discussed, a geofence may be any shape including a circle or any other shape, including a polygon. For a non-circular geofence, the geofence may be defined by a series of ordered coordinates (e.g., longitude and latitude) and the lines, for example, between consecutive coordinates. Different methods may be used to determine whether a device is located within a geofence including, for a polygonal geofence, the winding method and/or the counting method, although other methods may be used. As an example, a geofence may track the contours/borders of a state, city, town, casino property, etc. An example of using the counting method may include a computing device receiving coordinates (e.g., longitude and latitude) of a device. The computing device may cast an infinite ray (and/or perform some calculations as if such a ray had been cast) from those coordinates. The computing device may count the number of times the ray intersects with the boundary defined by the lines between the series of coordinates, for example, of a geofence. An odd number of crossings or intersections may indicate that the device is in the geofence while an even number may indicate that the device is outside of the geofence.

A gaming service provider, for example, may determine the location of a device through geofencing (i.e., determine whether a device is within the boundaries of a predefined geofence) in different manners including, for example, communicating a customer ID and/or device ID (e.g., a phone number), for example, to a communication service provider (e.g., a cell phone provider, Sprint, Verizon, AT&T, T-Mobile, etc.), which in return may provide an indication to the gaming service provider of whether a device is within the boundaries of a defined geofence. As another example, a gaming service provider may communicate a customer ID and/or device ID (e.g., a phone number), for example, to a third party which in turn may provide an indication of whether a device is within the boundaries of a defined geofence. For example, the third party may obtain from a communication service provider the coordinates (e.g., longitude and latitude) of a device, may determine from those coordinates whether a device is within the boundaries of a defined geofence, and may then provide an indication to the gaming service provider of whether the device is within the boundaries of the defined geofence. As a further example, the gaming service provider may communicate a customer ID and/or device ID (e.g., a phone number), for example, to a communication service provider, possibly indirectly through a third party, and in return obtain coordinates (e.g., longitude and latitude) of a device. The gaming service provider may then determine from the coordinates whether the device is within the boundaries of a defined geofence.

As mentioned, a gaming service provider, once a user is provided access to gaming activities, for example, may re-determine the location of a device to ensure the device is still in a permitted location. For various reasons, the gaming service provider may desire to minimize determinations and/or queries to a third party and/or communication service provider regarding device locations. For example, such determinations may require processing time that is desired for other processes, and/or a third party and/or communication service provider may charge a fee for responding to such queries. According to some embodiment, the gaming service provider may register a listener application on a device. Such an application may be registered when a customer initially accesses gaming activities (e.g., as the customer logs into an account). Such an application may monitor the location and changes therein of the device (e.g., through the use of GPS) and alert and/or report to the gaming service provider when a change in location has occurred. The application may report any change in location and/or may report a change in location when the change has met some predetermined amount or threshold (e.g., some predefined number of inches, feet, meters, yards, miles, some deviation thereof, etc). The predetermined amount may be pre-configured in the listener application, may be set by the gaming service provider upon registering the application, and/or may be updated dynamically by the gaming service provider as the customer accesses gaming activities. As another example, the application may report the location of a device and/or any change therein at some time interval (e.g., periodic, random, and so on) regardless if there is actually a change in location. Again, the time interval may be pre-configured in the listener application, may be set by the gaming service provider upon registering the application, and/or may be updated dynamically by the gaming service provider as the customer accesses gaming activities. Regardless, the alert/report from the listener application may include any one or more of the location of the device (or approximation thereof) (e.g., longitude and latitude), the distance the device has moved, the direction the device has moved, an indication that the device has moved a predefined amount, an indication that the device has changed location (but not how much), etc. According to some embodiments, the listener application, having been notified by the gaming service provider, for example, of the boundaries of a geofence, may determine if the device is within the geofence, some defined distance from the boundaries of the geofence, and/or has moved outside the geofence, and report any of such events to the gaming service provider.

According to some embodiment, a gaming service provider for example (without communicating with a communication service provider and/or third party, for example) may respond to an alert/report from a listener application by determining that the device is still within the boundaries of a geofence, is possibly moving towards and/or has moved towards the boundaries of the geofence, and/or has moved beyond/outside the boundaries of the geofence and therefore may be in a location in which gaming activities, and/or any other features, are not permitted and/or are not to be provided and/or need to be modified/altered. For example, the gaming service provider may make such determinations by knowing the previous coordinates of the device (e.g., as provided by a communication service provider and/or third party, for example) and the coordinates of the device and/or the distance the device has moved as reported by the listener application. According to some embodiment, the gaming service provider for example, in response to making a determination as to where the device may be located as a result of the report from the listener application, may do nothing, may log the customer out of an account, may prevent and/or suspend further wagering from the device, may enable, disable, and/or modify features and/or services and/or activities provided to the customer, may communicate with the listener application to update when the listener application provides reports, and/or may communicate with a communication service provider and/or third party to re-determine the location of the device through geofencing using methods discussed herein. For example, the gaming service provider may determine, in response to the report from the listener application, that the device is still within the boundaries of a geofence and do nothing. As another example, the gaming service provider may determine, in response to the report from the listener application that the device has possibly moved close to the boundaries of the geofence and may communicate with a communication service provider and/or third party to re-determine the location of the device through geofencing using methods discussed herein.

In some embodiments, a listener application may be one of a plurality of location determination triggers. For example, as a result of a reported movement by the listener application, a gaming service provider may perform a location determination of a device (after some time period from a prior location determination) in response to and at a time a customer subsequently initiates wagering actions through the device.

In some embodiments, even though a reported new location by a listener application may appear to a gaming service provider to be within a geofence, the gaming service provider may not trust the new location. For example, such listener application may have the potential for hacking because it may be operated on the customer's device. Accordingly, a report from such a listener application that movement has occurred may trigger some other location determination to be performed (e.g., a check of a geofence location).

One skilled in the art will recognize that registering a listener application on a device to determine when a device may be moving towards the boundaries of a geofence and/or has moved beyond such boundaries may be used for other features, services, activities, and applications, such as those described herein, in addition to deciding if gaming activities should be enable, disable and/or modified on a device.

According to some embodiment and as discussed herein, a gaming service provider for example may also use concentric/consecutive geofences (including two or more concentric geofences) to minimize, for example, determinations and/or queries to a third party and/or communication service provider regarding locations of a device. Such concentric/consecutive geofences may be used, for example, to determine when a query of a location is to be made to a third party and/or communication service provider. As an example, an outer most geofence may correspond to an actual boundary of an approved area in which gaming activities are permitted. This geofence may include therein a second geofence, which may have included therein a third geofence, etc. The concentric/consecutive geofences may each be a circle, may each be a polygon (with one or more polygons being the same and/or a different shape from the others), a combination thereof, etc. According to some embodiments, such a series of consecutive geofences, while one may lie within another, etc, may not be concentric in that one or more of the geofences may not share a common center point. Similarly, one or more of the geofences may or may not touch another geofence and/or may or may not overlap another geofence. Similarly, a given geofence may have therein two or more geofences that don't overlap at all. One skilled in the art will recognize that other formations/configurations of geofences may be used.

Figure 11:
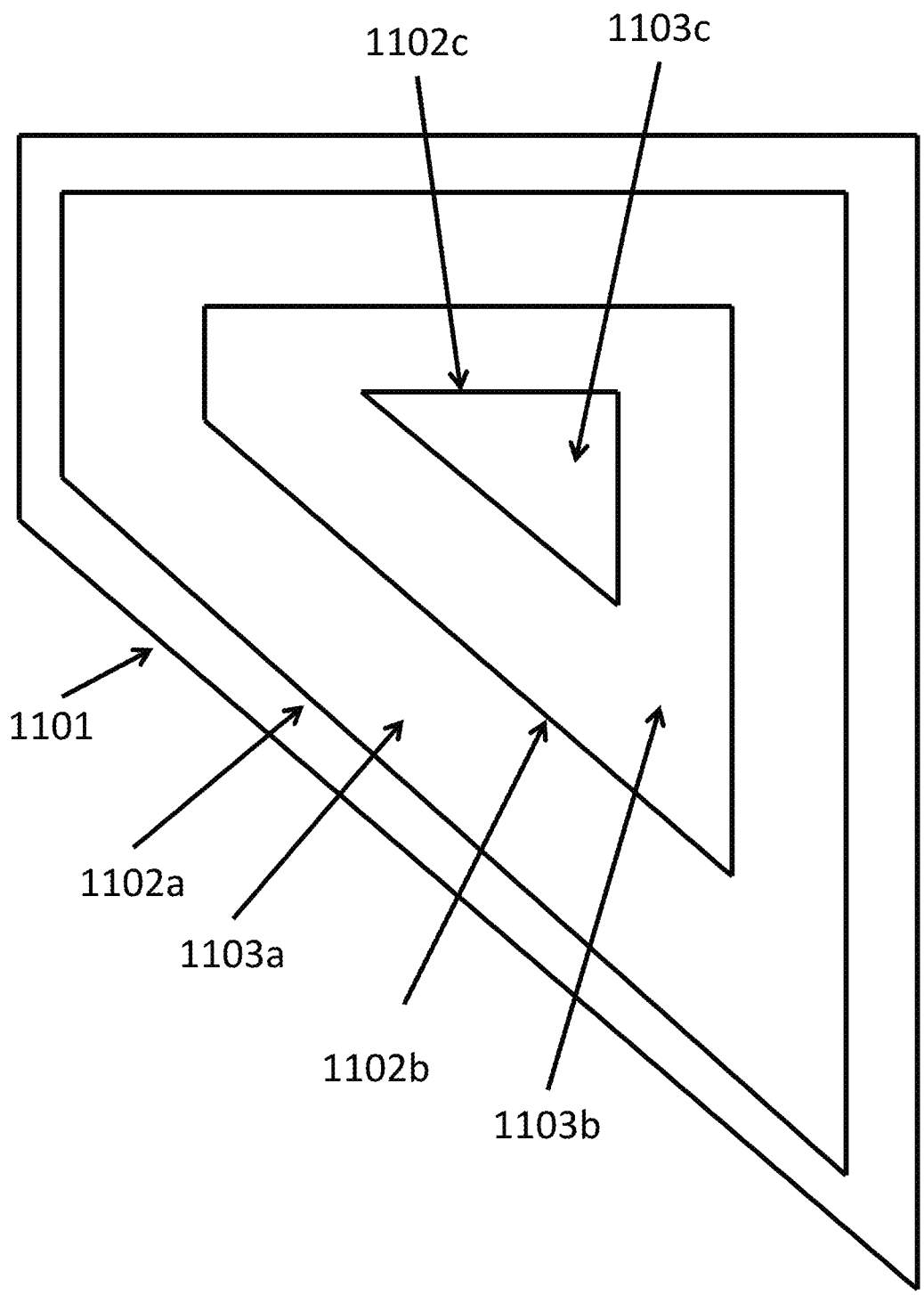
FIG. 11 shows an example of a series of geofences shown on a map of a state.

According to some embodiments, the rate or time at which a gaming service provider, for example, re-determines the location of a device (to ensure the device is still in a permitted location—for example is still within the boundary of the outermost geofence) may be based upon which geofence the device was last in. For example, FIG. 11 shows a state 1101 (e.g., Nevada) for example, with three geofences therein, 1102a, 1102b, and 1102c, for example. The frequency of location determination of a device may be one rate (e.g., every 5 minutes or approximately every 5 minutes) when a device is within the outer most geofence 1102a but outside geofences 1102b and 1102c (i.e., is located in region 1103a), may be a second rate (e.g., every 10 minutes or approximately every 10 minutes) when a device is within geofences 1102a and 1102b but outside of geofence 1102c (i.e., is located in region 1103b), and may be a third rate (e.g., every 30 minutes or approximately every 30 minutes) when a device is within geofences 1102a, 1102b, and 1102 (i.e., is located in region 1103c), etc. For example, the rates may get longer as the device is located further from the outer most geofence or, in other words, is located within the more inner geofences. One skilled in the art will recognize that other rate configurations are possible, including, seconds, minutes, and hours. Accordingly, a gaming service provider may use a communication service provider and/or third party, as discussed herein, to determine which geofence a device is in. Based on which geofence the device is in, the gaming service provider may then determine the next time a determination and/or query to a third party and/or communication service provider will be made, with the rate being less frequent, for example, when a device is within an inner geofence.

According to some embodiments, a gaming service provider for example may register a listening application on a device in addition to using multiple concentric/consecutive geofences. As an example, a gaming service provider may determination and/or query to a third party and/or communication service provider regarding a device's location at time/rate based on which geofence a device was last is located in. However, if the listening application reports a change in location as discussed herein, for example, the gaming service provider may reduce the time/rate at which the next location determination/query is made, including reducing the time to zero such that a location determination is made immediately. According to some embodiments, the gaming service provider may configure/reconfigure the listening application to report location changes based on which of the geofences the device is located in. For example, the listener application may be configured to report location changes of one length when a device is located in region 1103a, and may be configured to report location changes of a second length when a device is located in region 1103b, where the one length is shorter than the second length. In other words, the listener application may be configured to report shorter location changes the closer the device is to the outer most geofence. As another example, the listener application may be configured to report location changes more frequently (regardless of the length of the movement) the closer the device is to the outer most geofence.

In some embodiments, in addition to or as an alternative to rate or time, some other functionality may depend upon which geofence a device/customer is located in. For example, when a device is determined to be located in an outer boundary geofence (e.g., region 1103a), a gaming service provider may use some second location determination method to ensure a device is within a permitted location, while the gaming service provider may not use some second location determination method when a device is determined to be located in an internal geofence (e.g., region 1103b and/or 1103c). As still another example, functionality of the customer device itself may be altered to prevent some actions from being performed or data from being accessed when in boundary geofences as compared to when in internal geofences (e.g., a customer may not be able to wager is some game types, a customer may not be able to play games for more than an amount of money, a customer may be delayed in play games so that consecutive location determinations may take place before a game action is accepted, a customer may not be able to access more than a maximum amount of gaming data between location determinations, etc.). As still another example, a customer may be warned about leaving an approved area when in a boundary geofence.

Some embodiments may include a gaming service provider performing a location determination of a customer device in response to a recognized cached result being reported to the gaming service provider. For example, a communication service provider and/or third party and/or location reporting service may only refresh device locations every so often (e.g., re-determine longitude and latitude coordinates of a device). If a gaming service provider requests a location at a quicker rate than the location reporting service updates its location information, the gaming service provider may be provided with out of date cached location information. If a gaming service provider recognizes that two consecutive location reports are identical, the gaming service provider may suspect that a cached result has been used. If a device is located in a boundary geofence (e.g., region 1103a), this may cause the gaming service provider to behave differently than when a device is located in an internal geofence (e.g., region 1103b and/or 1103c) (e.g., because the gaming service provider may be concerned that a customer has left the boundary to a non-permitted gaming location between updates but would not be so concerned about the internal geofence). So, such determination of cached results, may, in some embodiments, only be relevant to a boundary geofence. Such suspicion of a cached result may be increased if a listener application has reported that movement has occurred. In some embodiments a determination of a cached result may depend on the listener application reporting such movement. In response to a determination of a relevant cached result being reported, the gaming service provider may determine location in some other manner using a secondary location determination, re-request location from the same location reporting service, request that the location reporting service specifically refresh the customer's/device's location information, and/or perform any other action (e.g., prevent gaming until a non-cached result is reported).

As discussed herein, actions performed by a gaming service provider, communication service provider, third party, location reporting service, and/or device, etc. may include actions performed by an entity/person and/or actions performed electronically by one or more computers, computing devices, servers, processors, etc. performing/executing software, firmware, etc. over one or more communication networks.

Soft Tag Examples

In some embodiments, in addition to and/or as an alternative to geofencing and/or other location determination methodologies, a softtag system may be used. Such a system may be used to determine whether a device is in an approved and/or an unapproved location for gaming. In some embodiments, such a system may be provided by Ekahau to determine approved and/or unapproved (e.g., red/green) zones.

In some embodiments, such a softtag may include a gaming positioning client software. Such software may be used, e.g., by a server, workstation, network, mobile device and/or processor, to facilitate determining information about a location or position of a mobile device. In some embodiments, such software may be used to identify a location of a user of a mobile and/or handheld device (e.g., a moveable processor, such as a handheld computer, mobile phone or smartphone, laptop, other portable electronic device, etc.). For example, software running on a mobile device may cause the device to transmit or otherwise provide information (e.g., to a server or other processor, a unique identifier, a set of signal strengths, etc.) that can be used to determine the position of the client mobile device.

In some embodiments, a gaming application (e.g., a main application, a wrapper application, a softtag application, etc.) may perform one or more actions to facilitate such features. For example, such an application may be assigned a unique identifier (e.g., as part of a sign up process). As another example, such an application may be provided with a list of allowed access points and/or a reference to where such a list may be obtained (e.g., from a gaming service). In some embodiments, such a gaming application may determine one or more signal strengths form one or more wireless access points and/or one or more access point identifiers that may be accessed from a current location.). In some embodiments, an application may determine a network to which the mobile device is accessing a gaming service (e.g., a wifi network at a casino, a wifi network at a Starbucks in Las Vegas, and so on).

In some embodiments, one or more identifiers and/or signal strengths may be transmitted to a gaming service and/or other location (e.g., with a request to gamble). In some embodiments, an identifier of such a network may be used to determine that the network is approved. For example, the network identifier may be compared with a listing of allowed networks (e.g., by a gaming service, by a mobile device, by the application). If the network is in the list, then the network may be in an approved location and gaming may be allowed. In some embodiments, a request to a gaming service may include an identification of the network so that such a determination may be made by the gaming service. In some embodiments, a set of signal strengths and/or access point identifiers may be used to determine if a location is approved. For example, a set of signal strengths and/or access points may be compared to a set of approved signal strengths and/or access points. Some example embodiments of such comparisons are described in U.S. patent application Ser. No. 12/197,809, which is hereby incorporated herein by reference.

Some embodiments may include determining that a network is in an allowed location and/or identifying allowed signal strengths and/or access points. For example, some embodiments may include an agent identifying that a network, access points, and/or signal strengths are in a allowed location to a gaming service (e.g., an agent may observe a boundary of a network and determine that the network is within a boundary of an allowed location, the agent may send a message to a gaming service identifying that communication network and that it is in an allowed location, the agent may determine that signal strengths and/or access points at various locations are valid and/or invalid based on the location compared to legal requirements). In response to receiving such information, a gaming service may associate the communication network, signal strengths, and/or access points with being in an allowed location.

Such an application may run on any supported operating system or systems. Such operating systems may include any operating systems for computers, servers, handheld devices, and/or other devices. Such supported operating systems may include Windows operating systems such as Mobile 5 PocketPC, Windows Mobile 6 Classic, Windows Mobile 6 Professional, Windows 8, various versions of Android, Mac operating systems, Linux, and other systems.

In some embodiments, the software may be capable of accomplishing various functions and have various features, including (but not limited to) one or more (or all) of the following, e.g., in some embodiments: support client maintenance, e.g., from a Positioning Engine (e.g., a position engine provided by the company Ekahau); adjust scan settings, e.g., for multiple devices, e.g., at the same time (or at multiple different times); display battery level status (e.g., from Ekahau Engine); does not require Ekahau Client Connector; Supports Ekahau RTLS 4.x Location and Maintenance Protocols (ELP, EMP); includes a new user interface in the PPC Client: PPC Client settings are maintained using Ekahau Positioning Engine; Laptop Client may not have a UI: settings are set in the installer or settings are maintained using Ekahau Positioning Engine; and/or may or may not affect association/authentication.

Various examples of determining a time period for rechecking a location are given elsewhere with respect to a geofencing and/or multilevel location determination methodologies embodiments. Such feature may apply to a softtagging or other embodiment. For example, particular networks, access point and/or signal strength sets may be associated with different time periods between location checks based on a distance form an edge of a boundary of an approved area, a state, a reliability, and so on. Similarly, speed of movement may be used to determine such time periods in some embodiments.

It should be recognized that various examples of softtagging are given as non-limiting examples only and that other methods and/or apparatus may be used as desired. Any desire location services may be used in combination and/or exclusively. For examiner, some embodiments may include determining that a device is both using an approved network and in a geofence.

Limiting Remote Control of Mobile Device Examples

In some embodiments, an ability to remotely access a device may be controlled. Such an ability may be restricted, prevented, and/or not available, for example. In some embodiments, one or more methods and/or devices may be used to prevent remote connections to a mobile device while a customer is performing gaming related activities using the mobile device and/or if the mobile device is authorized to perform gaming activities.

Some example mobile devices may include any number of communication interfaces (e.g., 4) that may be controlled to prevent remove access of the mobile device. It should be recognized that some embodiment may include more, fewer, different such interfaces and that the example interfaces are given as non-limiting examples only. Such example interfaces may include 1. Wi-Fi, 2. Dock/USB, 3. Blue tooth, 4. Cellular Network (may not support incoming connections).

In some embodiments, incoming remote connections to a mobile device may be disabled, may not be possible and/or my otherwise may be prevented over a cellular network connection. In some embodiments, one or more communication interfaces may be disabled at a time relative to when a player performs wagering related activities (e.g. places a wager). In some embodiments, such disabling may include preventing a customer from remotely controlling a phone so that the customer may be at the location of the phone when the wagering activity takes place. In some embodiments, if while in the sports betting application, the customer enables a disabled communication interface, and/or a remote connection is made through such an interface, in response to determining that such an enabling occurs and/or such a connection being made, a customer's sports betting session may be terminated and/or disabled (e.g., with a warning message, without a warning message, a sports wagering application may be terminated, a communication session may be terminated, a gaming service may be notified, and so on).

In some embodiments, a mobile gaming application may make check to determine whether a communication interface is enabled and/or whether a communication session through such an interface is active. For example, an application may occasionally, in response to an action, periodically, and so on check if a communication interface is enabled and/or if a communication session is active. Such a checking may be made by calling one or more APIs. For example, an Android OS API may be used with UiModeManager, WifiMaanger and BlueToothAdapter classes.

In some embodiments, a wagering application on a client device may include one or more programs. A first application may include, for example, an AIR 2.5 application built on Android 2.2 platform using Flash AS3. A second application may include, for example an Android wrapper application that launches and monitors the current device status. In some embodiments, a customer facing application may include a launcher that may launch the AIR 2.5 application after checking the status of remote connection access points such as Wi-Fi, Bluetooth and dock. The application may be launched if all external connection methods are disabled. Once successfully launched, if the customer enables one or more of these access points, the application may terminate. If the compliance validator service terminates and cannot provide status to the application, the application may terminate.

Some embodiments may prevent a user from making and/or accepting phone calls. For example, an application may be closed if a phone call is made and/or received during a gaming session and/or while a gaming application is being executed. In some embodiments, a user may be prevented from changing a focus, running multiple applications, running other applications, and so on while a gaming application is executed. It should be recognized that any desired set of actions may be made to prevent remote access as desired.

It should be recognized that various examples of application are non-limiting and that other embodiments may include a single application, any number of applications, no applications, any language, any technology, any devices, any operating systems, and so on.

Further Example Components

Some embodiments may include one or more actors, programs, devices, servers, components, entities, architectures, and so on. Some examples may include:

A customer and/or mobile device user, a customer service agent associated with a gaming operator that may be located at a gaming related property, a customer service help desk that may be accessible via a toll-free number for assistance to mobile customers (e.g., help desk information may be displayed to customer whenever any validation fails), an Android Wrapper Application (e.g., an application written in the Android OS language and/or other language used to authenticate device and monitor phone status), an AIR Mobile gaming Client (e.g., a NGCB approved Adobe Flash application installed on the phone that may be the current user interface to allow customers to sign-in, play mobile gaming, and view account history), a Device Authenticator Service (e.g., an SSL secured service that provides the mechanism for the Android Wrapper application to authorize the phone, a provider of an internal (i.e. only accessible inside the firewall) interface to validate requests made to systems from approved devices), a gateway (e.g., an SSL secured NGCB approved middleware communication service that proxies requests to DAS and the account based mobile gaming system), a Win32 Wrapper Application (e.g., an Application written in the Win32 language used to authenticate device and monitor PC status. It should be recognized that Win32 language and PCs are given as non-limiting examples only and that that any technology may be used as desired. In some embodiments, a mobile device may include a data adapter, a mobile phone, a smart phone, a laptop, a pda, and so on.

Figure 8:
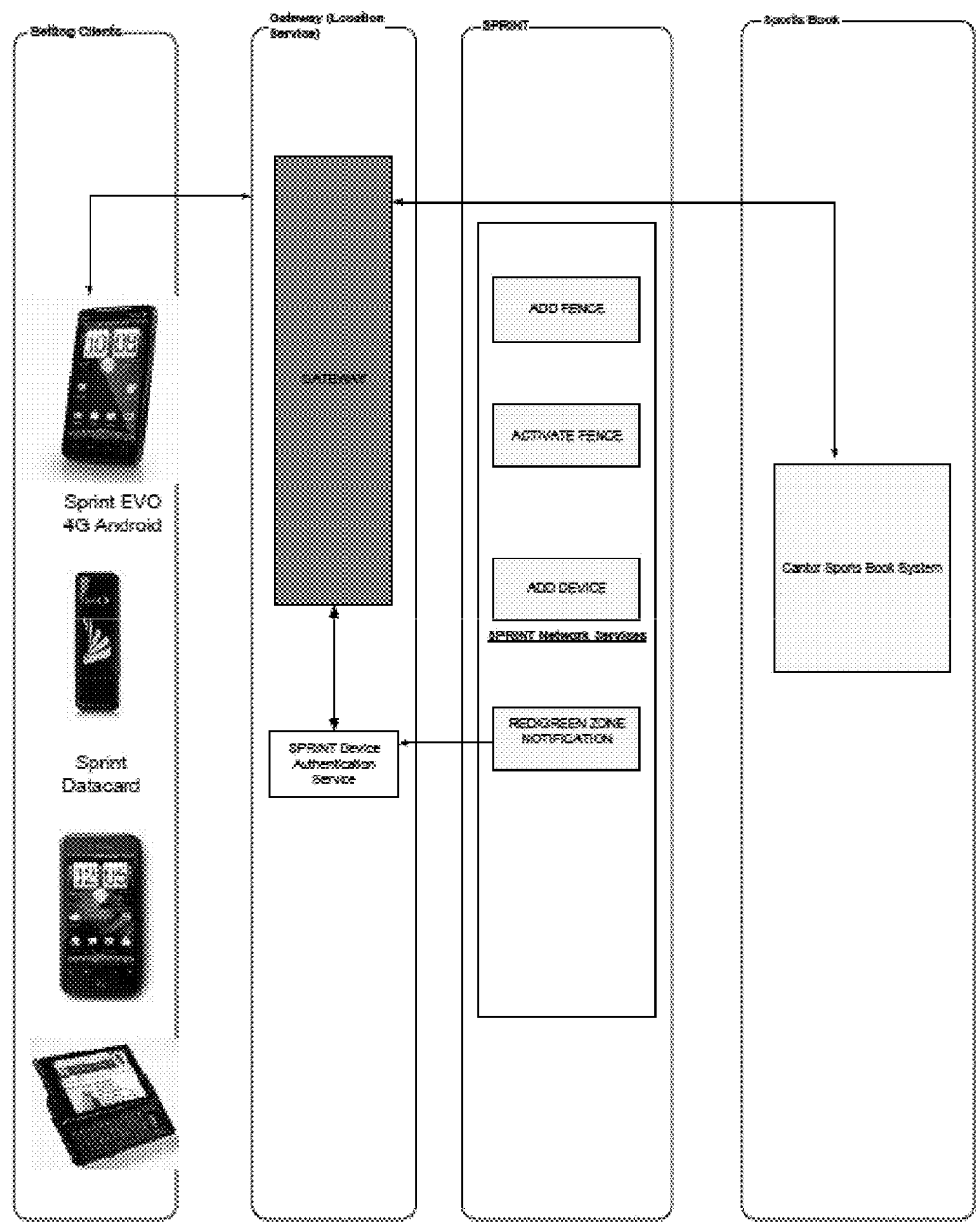
FIG. 8 shows an example architecture that may be used in some embodiments for location determination.

FIG. 8 illustrate example architectures that may be used in some embodiments. Some embodiments may include a mobile device as indicated. Such a device may communicate with a gaming service (e.g., a gateway). Such a device may be used by a customer to enter gaming actions, select games to play, choose decisions in a game, log into an account, and so on. Some embodiment may include such a gateway and/or any desired components of a gaming service and/or third party services that may be in communication with a mobile device. Such a component may perform any desired actions (e.g., authentication, location, and so on). Some embodiments may include a location service. Such a location service may provide any desired actions related to determining if a mobile device is in an approved location. Such a location service may communicate with a mobile device and/or gaming service. Such a location service may include a communication provider for the mobile device, a gaming service itself, a third party, and so on. Some embodiments may include a gaming component. Such a gaming component may be used to place bets, determine wager results, track accounts, and so on. Such a wager component may be part of a gaming service provider. Such a gaming component may receive wagers, determine wager results, receive actions to take in a game, facilitate play of a game, transmit indications of a result of an action, facilitate adjustments to an account in response to such results, and so on.

The figures illustrate that some actions may be performed by some devices. It should be recognized that any desired actions may be performed by any devices in other embodiments. It should be recognized that any desired computing devices in any combination may be used in other embodiments.

Some embodiments may use MD5 hashing and/or any desired encoding scheme to encode information, such as system parameters. Information about MD5 hashing may be found at http://en.wikipedia.org/wiki/MD5. MD5 may include a message digest algorithm for encoding data. MD5 may help to ensure that 1) Once encoded, the data cannot be retrieved via forms of decoding (i.e. the original data is lost) 2) MD5 Hashing two different pieces of data (even if they're quite similar) produces different results and/or 3) MD5 Hashing identical data will produce the same result.

Some embodiments may use an SSL HTTPS protocol to facilitate secure communication between entities. In some embodiments, communication between client devices and DAS, gateway, and/or a component of a gaming service may be performed using via the SSL HTTPS protocol. This may ensure data integrity and/or security. Information about the HTTPS protocol may be found at http://en.wikipedia.org/wiki/Https.

Some embodiments, such as those that may use an Android OS, may use private key signing to secure applications. For example, the OS may ensure: 1) two applications signed with different private keys cannot write to the data store of the other and/or 2) two applications signed with the same private key can write to the data store of the other. Information about such security may be found at http://developer.android.com/guide/topics/security/security.html.

Some embodiments, such as those that us Win32, may use process ids to secure applications. For example, a Win32 wrapper application may ensure: 1) two applications are running under the same user id and/or 2) Two applications are the only two processes running under the same user id.

Such examples are given as non-limiting only. It should be recognized that various embodiments may include any desired actors, programs, devices, servers, components, entities, architectures, and so on in any desired combination.

Examples of Gaming Rules

Some embodiments may operate in compliance with one or more rules. It should be recognized that any rules and/or no rules may be used as desired. Any number of mechanisms, punishments, validations, and so on may be used to ensure that any one or more of the rules are followed. Some examples rules may include:

1. Wagers are accepted within the approved locations within the state of Nevada per Regulation 22.140 and Regulation 266.160. Nevada law prohibits wagers originating from outside the State of Nevada so such wagers may not be permitted. Accountholders may understand that it is illegal to place a wager originating outside the State of Nevada.

2. Applications for wagering may be made in person at a race and/or sports book. Applicants may complete the approved account based wagering application and provide acceptable valid proof of identification, and/or social security number, per Regulation 22 and 26c.

3. Account applicants may be twenty-one (21) years or older.

4. Account transactions may be made by the account holder. Accounts may be limited to the use of the individual named on the application. Account deposits and withdrawals may be made in person. Agents or other representatives may not be permitted.

5. A minimum $100.00 deposit may be made to open an account. Deposits to the accounts may be made in cash. Wire transfers may be made to a patron's account in accordance with Nevada Gaming regulations.

6. Account deposits and withdrawals may be signed and authorized by the guest at the race and sports book during normal business hours. No agents or representatives may be allowed.

7. Account withdrawals and subsequent deposits may be made at the location where the funds were initially placed on deposit.

8. Account patrons may be required to provide their account number and acceptable valid identification when conducting account transactions in person.

9. Wagers may not be accepted if they exceed the account balance.

10. Wagers may be subject to established wagering limits.

11. Rules, upon regulatory review, may be subject to change at any time.

12. Minimum deposit may include $100, and minimum wager may include $5.

13. Any desired house rules and/or regulations may apply to wagering accounts.

14. Patrons may be provided, within a reasonable amount of time, a statement of their account showing wagering account deposits, wagering account withdrawals, credits to a wagering account, and/or debits to the wagering account made during the time period reported by the account statement. The request for such information may be done in writing and be signed by the patron whose signature on the request will be verified. Within the request, the patron may furnish details on the dispensing of the requested information. All postal mailing may be done via regular mail to the address requested by the patron. If the request by the patron is to personally receive the information, the information may be given to the patron, who may provide valid identification when receiving the information. The information may not be personally released to anyone but the patron who holds the account unless required by law or court order.

15. Patrons may dispute any transaction according to Nevada Gaming Commission Regulation 7A.

16. Casinos may make a print, electronic or other approved record of each sports transaction and may not accept any such wager or transaction if the recording system is inoperable. Recorded wagering transactions may be maintained for 60 days, per Regulation 22 and 26c. The record of the patron's confirmation of all wagering information may be deemed to be the transaction of record, regardless of what was recorded by the computerized bookmaking or pari-mutuel system. The records may be made available to the Nevada Gaming Control Board upon request.

17. Guests may acknowledge that a wager placed using the system is binding on both parties only when the BET IS APPROVED on the system or the message "BET HAS BEEN ACCEPTED" is displayed.

Multiple Accounts Examples

Some embodiments may include a plurality of accounts related to a plurality of respective casinos and\or other venues. In some embodiments, each such account may allow for gaming at a particular casino, sports book, and so on. In some embodiments, for example, a user may have a respective monetary account for casino gaming associated with each of a plurality of gaming operators (e.g., casinos, sports books, mobile gaming providers, internet wagering sites) and a respective monetary account for sports betting associated with one or more of the plurality of gaming operators (e.g., casinos, sports books, mobile gaming providers, internet wagering sites). A gaming provider may operate such accounts and/or allow gaming related to such accounts.

Some embodiments may include preventing funds in one gaming account from being used within a casino or at a location not associated with that gaming account. Some embodiments may include preventing funds in one gaming account from being used to game and/or perform activities (e.g., making purchases, play casinos games, play sports games) that are not approved for the account. A location determination may be made as may be described herein to determine such functionality.

Some embodiments may include a feature that allows fund transferring from one gaming account to another gaming account. Such funds may be transferred between accounts associated with a same gaming operator and/or between accounts associated with different gaming operators.

In some embodiments, a transfer may include an adjustment to an electronic record that identifies an amount of money in an account. For example, a single gaming operator may reduce one account and may increase another account a same amount (e.g., intra property transfer between casino wagering and sport betting accounts). In some embodiments, multiple parties may be involved in a transfer. For example, a first gaming operator may reduce an account and a second gaming operator may increase an account by a same amount. In some embodiments, an intermediary (e.g., a mobile gaming operator or account operator) may provide accounting services on behalf on the one or more entities (e.g., may maintain accounts for multiple entities and so may make the adjustments on their behalf).

In some embodiments, such an account transfer feature may allow a user to grant permission for a transfer of an amount of money from one account. Some amount of money that is permissioned (or less) may be moved to another account. Accordingly, such money may be used from the other account to take gaming actions and/or perform activities even if the money may not be used from the account to place take the gaming action and/or perform the same activities.

In some embodiments, a first account that is related to a first gaming provider may be established. For example, a first account may be related to a first casino (e.g., The M Resort) or first gaming service provider (e.g., mobile gaming provider such as Cantor Gaming). Such an account may be established by the first gaming provider, a user, and/or a financial institution (e.g., by signing up for an account and/or placing money in an account). A user may place money in and/or take money from such an account. Such an account may be used to take gaming actions in one or more games with money placed in the account. Such an account may be used to place play games at the casino or first gaming provider and/or otherwise through the first gaming provider (e.g., using an app provided by the first gaming provider, when the first gaming provider takes gaming actions). In some embodiments, such an account may be associated with one or more activities (e.g., sports gaming and/or casino gaming). In some embodiments multiple accounts associated with different activities may be established in relation to the first gaming provider (e.g., one for sports gaming and one for casino gaming).

In some embodiments, a second account that is related to a second gaming provider may be established. For example, a second account may be related to a second casino (e.g., The Hard Rock Casino) or second gaming service provider (e.g., mobile gaming provider such as The Venetian Pocket Casino Service). Such an account may be established by the second gaming provider, a user, and/or a financial institution (e.g., by signing up for an account and/or placing money in an account). A user may place money in and/or take money from such an account. Such an account may be used to take gaming actions in one or more games with money placed in the account. Such an account may be used to play games at the second gaming provider and/or otherwise through the second gaming provider (e.g., using an app provided by the second gaming provider, when the second gaming provider takes gaming actions). In some embodiments, such an account may be associated with one or more activities (e.g., casino gaming and/or sports gaming). In some embodiments multiple accounts associated with different activities may be established in relation to the second gaming provider (e.g., one for sports gaming and one for casino gaming).

In some embodiments, a third account that is related to a first activity may be established. For example, a third account may be related to play casino games (e.g., slots, blackjack, poker). Such an account may be established by a gaming provider, a user, and/or financial institution (e.g., by signing up for an account and/or placing money in an account). A user may place money in and/or take money from such an account. Such an account may be used to take gaming actions in one or more casino games with money placed in the account. Such an account may be limited to the first activity and/or may be excluded from being used for some second activity (e.g., sports and/or race gaming). In some embodiments, such an account may be associated with one or more gaming providers.

In some embodiments, a fourth account that is related to a second activity (e.g., a second activity that the third account maybe excluded from being used for) may be established. Such an account may be established by a gaming provider, a user, and/or financial institution (e.g., by signing up for an account and/or placing money in an account). A user may place money in and/or take money from such an account. Such an account may be used to place take gaming actions in one or more sports, racing, and/or other events with money placed in the account. Such an account may be limited to the second activity and/or may be excluded from being used for some first activity (e.g., casino gaming). In some embodiments, such an account may be associated with one or more gaming providers (e.g., a same and/or different gaming provider as the third account).

In some embodiments, establishing an account may include receiving information by a gaming operator from a user, receiving money from a user, verifying information about the user, storing money in an account, storing information in a database, and so on. For example, in some embodiments, a user may provide identifying information to a gaming provider (e.g., name, age, address, social security number, driver's license number, etc.) to establish an account. The gaming provider may store such information in a database. The gaming provider may verify one or more portions of the information (e.g., by asking for a photo ID to verify age). Information establishing such verification may be stored in a database (e.g., a copy of an ID). Login information may be established for an account. In some embodiments, such information may be established in person at a gaming operator, through the Internet, through fax, over the phone, and so on as desired. In some embodiments, money may be placed in the account. For example, physical cash may be handed to a gaming operator and in response a database entry may be adjusted to show that the money is in the account. In some embodiments, electronic transfers into the account may be made (e.g., from another account) and a database entry may be made to identify that transfer.

In some embodiments, a single intermediary may maintain information related to multiple accounts related to multiple gaming operators (e.g., a mobile gaming provider may operate at multiple casinos and maintain accounts related to each casino). In some embodiments, such an intermediary may maintain a customer database in which account information for such multiple accounts may be stored. Some embodiments may include maintaining account consistency in such a database. For example, if a player changes their name or address associated with one account, such changes may be propagated through the customer database to affect all account. In some embodiments, the change may not affect other account. In some embodiments, the player may be given an option through a user interface to have the change propagated to other accounts (e.g., to choose which account to affect).

In some embodiments, when a player establishes a new account, the new account may be linked in the customer database with other accounts established by the player. Such establishment and/or linking may be part of a sign up process. For example, a database may be searched for identifiers entered by the player upon establishing the account to find if the player has already registered an account (e.g. the player may be asked for login information from a prior account establishment, social security numbers, driver's license number, other unique identifiers may be searched for). If a match to a player establishing a new account is found in a customer database, the new account may be associated in response with the previous customer entry and all accounts that have previously been associated with that customer. Such association may ease a process maintaining an orderly customer profile, accounting for a customer, transferring money among customer accounts, monitoring for fraud (e.g., monitoring for multiple account usage simultaneously and taking anti-fraud action in response), and so on.

Some embodiments may relate to gaming at casinos and/or in legal gaming jurisdictions. Such gaming may be performed using money in one or more established account. Databases may be adjusted in response to risked money, lost money, won money, transferred money, and so on. In some embodiments gaming jurisdictions and/or providers may require and/or desire to keep some money segregated from other money. Such treatment of money may improve accountability, tracking, assurance of credit worthiness, monitoring of activity, age verification, identity confirmation, and so on. For example, in some embodiments, each gaming provider (e.g., house, casino, mobile gaming provider) may require its own account (e.g., an account setup for wagering with each provider) to be setup to place wagers through the provider. As another example, racing and/or sports accounts may be required to be separate from casino gaming accounts. For example, a gaming provider that offers both sports/racing and casino gaming may require a user to establish both a sports/racing account and a casino account it that user desires to place account based gaming on both sports/racing and casino games through the gaming provider. In some embodiments, a separate account maybe required for shopping and/or otherwise spending money. For example, gaming accounts may be prevented from being used to spend money to buy products. In some embodiments, a single account may be used for more than one activity, through more than one gaming provider and/or at more than one location.

It should be recognized that any combination of location, gaming provider, intermediary, activity, and/or other characteristics being associated with wagering and/or non-wagering accounts may be used in various embodiments as desired. Various examples of embodiments are given as non-limiting examples that may be combined together in any manner as desired. For example, some embodiments may include three separate accounts being associated with three respective activities for each of four separate locations. In some embodiments, as an example of some account types and/or associations, one account may be associated with sports gaming casino A, another account maybe associated with playing casino games at casino B, a third account may be associated with shopping at store C, and a fourth account may be associated with investing at financial institute D.

Some embodiments may include facilitating a transfer of money from one account (e.g., first account, third account) to another account (e.g., second account, fourth account). Such money may include money that was deposited in an account, money that was transferred into an account, money that was won through wagering activities, and so on. In some embodiments, an account to which money may be transferred may include an account associated with a gaming provider that the user is participating with (e.g., a casino in which a user is located) at a time relative to the transfer and/or an account from which money may be withdrawn may include a gaming provider that the user is not participating with (e.g., a casino in which the user is not located) at the time relative to the transfer.

In some embodiments, facilitating a transfer may include withdrawing money from one account and depositing the money into another account. Some embodiments may include taking a fee for such a service (e.g., for each transaction, a sign up fee, etc.). In some embodiments, such a transfer may be facilitated by making one or more database changes. In some embodiments, accounting, auditing, and/or reporting may be performed regarding one or more transfers as desired by a regulatory body.

In some embodiments, facilitating may include pre-permissioning a transfer, requiring a transfer to be pre-permissioning, transferring a pre-permissioned amount of money, allow a user to pre-permissioning a transfer from an account, and so on. In some embodiments, facilitating may include automatically making a transfer, making a transfer from one account to another account in response to a wager being placed form the one account, transferring money to fulfill a wager, and so on.

Other Embodiments

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the claims herein.

Example Combined Embodiments

It should be recognized that some embodiments may combine various aspects. For example, a gaming server may allow a variety of clients to engage in gaming. The variety of clients may run different operating systems (e.g., iPhones, android devices, laptops, etc.), have different capabilities (e.g., gps), and/or may access the gaming service through different means (e.g., Wi-Fi, mobile network, Ethernet). A gaming service and/or gaming client on a client device may take appropriate actions to ensure security based on such considerations. Such actions may combine one or more methods discussed herein that are available for a particular client device.

For example, an android phone using a mobile network to access a gaming service may run a client program that interacts with the device and the gaming service. The client software may perform hash checking of at least a portion of the client program and/or operating system or transmit such information to a gaming service for checking. The client software may obtain a phone number of the phone by querying the android OS and transmit that number to the gaming services. The client software and/or gaming service may alter routing tables to route traffic through a VPN established between the laptop and gaming service. A VM and/or proxy check may be performed by the client software and any desired access methods may be disabled (e.g., Bluetooth, Wi-Fi) by the client software. The client software may obtain login credentials from a user (e.g., login, password, swipe pattern) and transmit that information to a gaming server for validation or validate one or more pieces of it locally. A gaming service may verify obtained login information and use the phone number to check a location of the phone through a geofencing location check, for example.

As another example, an iOS phone using a mobile network to access a gaming service may run a client program that interacts with the device and the gaming service. The client software may perform hash checking of at least a portion of the client program and/or operating system or transmit such information to a gaming service for verification. The client software or gaming service may obtain a phone number from the user upon signup or login. The client software and/or gaming service may alter routing tables to route traffic through a VPN established between the laptop and gaming service. A VM and/or proxy check may be performed by the client software and any desired access methods may be disabled (e.g., Bluetooth, Wi-Fi) by the client software. The phone number may be transmitted to the gaming service during login or as part of a sign up process.

The client software may obtain login credentials from a user (e.g., login, password, swipe pattern) and transmit that information to a gaming server for validation or validate one or more pieces of it locally. A gaming service may verify obtained login information and use the phone number to check a location of the phone through a geofencing location check, for example. A client software may also check a gps coordinates of the phone and transmit such coordinates to the gaming service. The gaming service may use the gps coordinates as a check that the device phone number is the real phone number by verifying that the geofencing service location check matches the gps location report.

An yet another example, a windows laptop using a Wi-Fi network to access a gaming service may run a client program that interacts with the device and the gaming service. The client software may perform hash checking of at least a portion of the client program and/or operating system or transmit such information to a gaming service for verification. An IP address of the laptop may be determined by the client device and transmitted to the gaming service and/or determined by the gaming service from packets received by the gaming service. The client software and/or gaming service may alter routing tables to route traffic through a VPN established between the laptop and gaming service. A VM and/or proxy check may be performed by the client software and any desired access methods may be disabled (e.g., Bluetooth) by the client software. The client software may obtain login credentials from a user (e.g., login, password, swipe pattern) and transmit that information to a gaming server for validation or validate one or more pieces of it locally. A gaming service may verify obtained login information and use the IP address to check a location of the laptop through an IP location checking service.

Cloud Service Examples

One or more functions described herein may be available as a cloud service. For example, a gaming operator may be a cloud service provider, a location service may be a cloud service provider, a authentication service may be a cloud service provider, a account manager may be a cloud service provider, a branding service may be a cloud service provider, and so on. Various cloud service providers may interact with one another through a network to provide a coherent set of services to a user. Individual services may be used for multiple purposes. For example, a authentication cloud service may authenticate any device for any gaming operator, an account manager may provide account services for any account user, a gaming service provider may provide gaming services for any cloud participant.

A cloud may be accessed through some access point. For example, a casino may provide a portal to access a cloud (e.g., a kiosk, a mobile application on a phone, etc.). services that are available to the cloud may be provided by cloud service providers that are connected to the cloud.

An account may be maintained elsewhere in such a cloud and/or may be maintained specifically for a gaming operator. Accordingly, a user accessing the cloud may use funds from an account provider in the cloud with a gaming operator in the cloud. A gaming operator in the cloud may use authentication and/or location services of a authentication and/or location service provider in the cloud. Funds in the account provider for example may be funds associated with a portal through which the user accesses the cloud (e.g., a casino) that may make the funds available to a plurality of gaming services that are attached to the cloud. In some embodiments a gaming operator may be limited to using services that it provides (e.g., its own account services and/or its own authentication services). Some embodiments may include one or more components of such a cloud service that may operate to provide gaming functionality and/or provide services to an entity that provides gaming services.

The following sections provide a guide to interpreting the present application.

Terms

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The terms "a", "an" and "the" mean "one or more", unless expressly specified otherwise.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category. An enumerated list of items (which may or may not be numbered) does not imply that any or all of the items are equivalent to each other or readily substituted for each other.

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

A description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

Apparatus for Playing Over a Communications System

FIG. 1 shows a block diagram of components for a hand-reading system on a table 4 of some embodiments, a smart card-reading delivery shoe 8 with output 14 and a smart card-reading discard rack 12 with output 18. Player positions 6 are shown, as is a dealer's hand position sensor 10 without output port 16.

Figure 2:
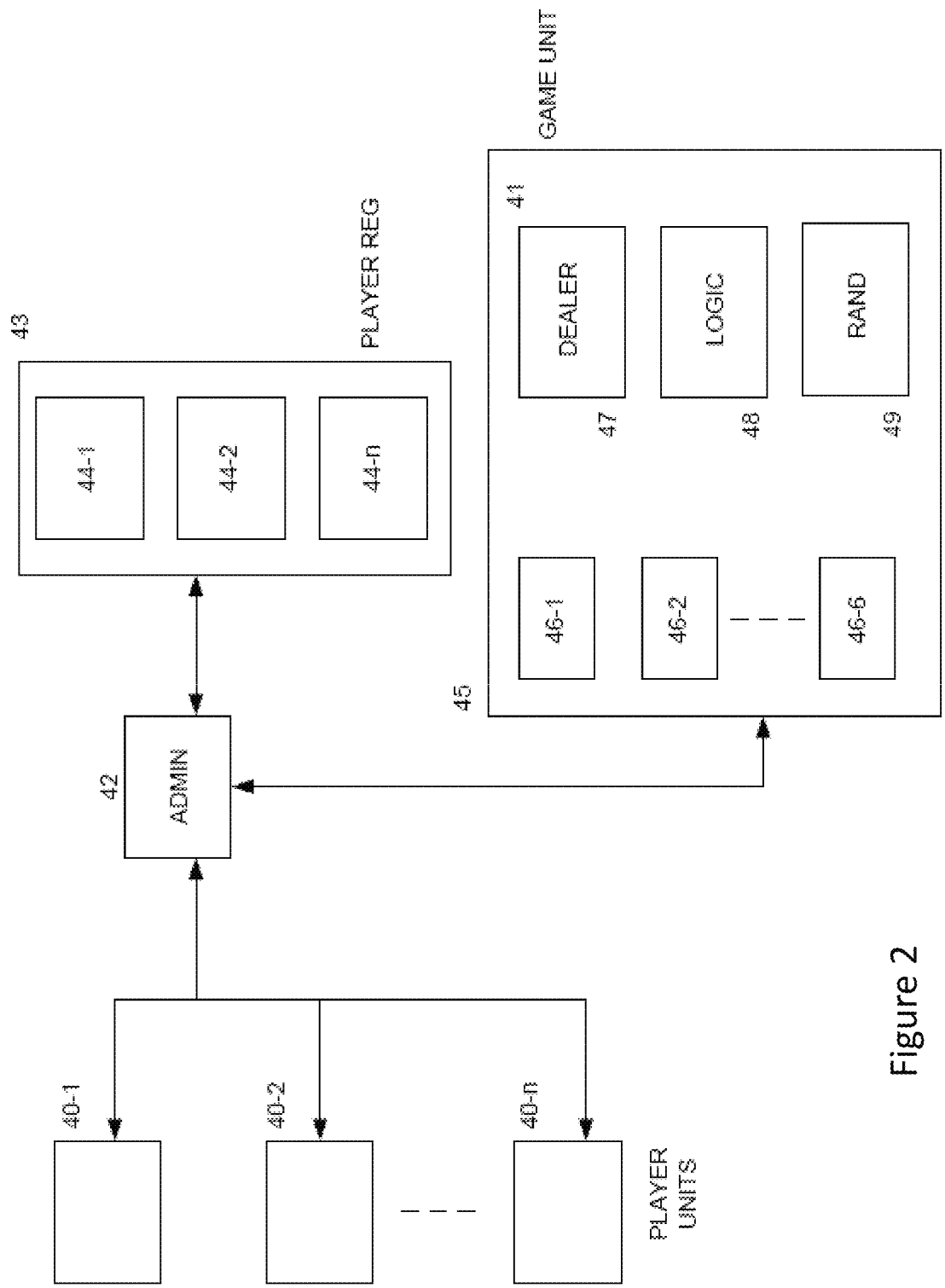
FIG. 2 shows apparatus for playing a game in some embodiments.

FIG. 2 shows apparatus for playing the game. There is a plurality of player units 40-1 to 40-*n* which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-*n* for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

What is claimed is:

1. An apparatus comprising:
    at least one processor configured to:
    determine that at least one cellular telephone is accessing a gaming service through a single access point;
    receive an indication that a current location of the single access point is within a first geofence, the first geofence being within an area that is approved for access to the gaming service;
    detect a movement of the single access point from the first geofence to a second geofence that is also within the approved area;
    determine a distance between the second geofence and the boundary of the approved area;
    identify a distance between the second geofence and a boundary of the approved area;
    determine a time when the current location of the single access point is to be reevaluated, the time being based on the distance between the second geofence and the boundary of the approved area; and
    allow the at least one cellular telephone to access the gaming service through the single access point, in response to determining that the single access point is within the first geofence or the second geofence.

2. The apparatus of claim 1, in which the at least one processor is configured to:
    register an application on the at least one cellular telephone, and wherein the application is at least configured to determine that the single access point has changed location, and/or determine a distance the single access point has moved;
    receive from the application a report wherein the report includes at least one of an indication that the single access point has moved, and an indication of a distance the single access point has moved; and
    in response to the report identify whether the single access point cellular telephone is within the first geofence.

3. The apparatus of claim 1, in which the at least one processor is configured to:
    register an application on the at least one cellular telephone, wherein the application is at least configured to determine that the single access point has changed location and/or determine a distance the single access point has moved;
    receive from the application a report wherein the report includes at least one of an indication that the single access point has moved and an indication of a distance the single access point has moved; and
    in response to the report, query a remote location determination service to determine a location of the single access point.

4. The apparatus of claim 1, wherein the at least one processor is further configured to reset the time when the current location of the single access point is to be reevaluated, in response to detecting the movement of the single access point from the second geofence to a third geofence, the reset of the time being based on a distance between the third geofence and the boundary of the approved area.

5. The apparatus of claim 1, wherein the distance between the first geofence and the boundary of the approved area is longer than that of the second geofence.

6. The apparatus of claim 1, wherein the distance between the first geofence and the boundary of the approved area is shorter than that of the second geofence.

7. The apparatus of claim 1, wherein the second geofence is located within the first geofence.

8. The apparatus of claim 1, wherein the first geofence and the second geofence are concentric.

9. The apparatus of claim 1, wherein the first geofence is located within the second geofence.

* * * * *